United States Patent
Iyer et al.

(10) Patent No.: US 10,367,620 B2
(45) Date of Patent: Jul. 30, 2019

(54) UPLOAD CONTROL SIGNALING FOR NEW RADIO

(71) Applicant: Convida Wireless, LLC, Wilmington, DE (US)

(72) Inventors: Lakshmi R. Iyer, King of Prussia, PA (US); Guodong Zhang, Syosset, NY (US); Qian Zhang, Basking Ridge, NJ (US); Allan Y. Tsai, Boonton, NJ (US); Joseph M. Murray, Schwenksville, PA (US); Pascal M. Adjakple, Great Neck, NY (US); Qing Li, Princeton Junction, NJ (US); Tianyi Xu, San Diego, CA (US); Wei Chen, San Diego, CA (US); Ahmed ElSamadouny, Conshohocken, PA (US); Salman Khan, West Babylon, NY (US); Yifan Li, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/624,378

(22) Filed: Jun. 15, 2017

(65) Prior Publication Data
US 2017/0366311 A1    Dec. 21, 2017

Related U.S. Application Data

(60) Provisional application No. 62/350,437, filed on Jun. 15, 2016, provisional application No. 62/373,850, (Continued)

(51) Int. Cl.
*H04L 27/28* (2006.01)
*H04L 5/00* (2006.01)
(Continued)

(52) U.S. Cl.
CPC ........... *H04L 5/005* (2013.01); *H04B 7/0482* (2013.01); *H04B 7/0617* (2013.01);
(Continued)

(58) Field of Classification Search
CPC .............. H04L 27/2647; H04L 5/0007; H04L 27/2657; H04L 1/0618; H04L 5/0005;
(Continued)

(56) References Cited

U.S. PATENT DOCUMENTS

| 8,902,773 B2 | 12/2014 | Anderson et al. |
| 9,198,181 B2 | 11/2015 | Blankenship et al. |

(Continued)

FOREIGN PATENT DOCUMENTS

| EP | 2464076 A2 | 6/2012 |
| EP | 2882110 A1 | 6/2015 |

(Continued)

OTHER PUBLICATIONS

3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.

(Continued)

*Primary Examiner* — Khai Tran
(74) *Attorney, Agent, or Firm* — BakerHostetler

(57) ABSTRACT

Flexibly configured containers consisting of resources within time-frequency blocks may be used to support multiple numerologies in new radio architectures. Uplink control may be defined in resources within a container, or in dedicated resources, by various nodes.
Sounding reference signal resources may be dynamically configured for each numerology. The sequence length may be adapted, as well as the time domain location of symbols. Time, frequency, and orthogonal resources may be allocated via a downlink control channel or a radio resource control.
(Continued)

Sounding reference signals may be pre-coded, and pre-coding weights may be based on a codebook or non-codebook approaches, e.g., via a radio resource control or a downlink RRC or DL control channel. Pre-coded sounding reference signals may be adapted to user equipment antenna configuration. Further, NR-SRS may be used as UL demodulation RS (DM-RS).

20 Claims, 74 Drawing Sheets

Related U.S. Application Data filed on Aug. 11, 2016, provisional application No. 62/399,921, filed on Sep. 26, 2016, provisional application No. 62/401,062, filed on Sep. 28, 2016.

(51) Int. Cl.
*H04B 7/0456* (2017.01)
*H04B 7/06* (2006.01)
*H04L 1/00* (2006.01)
*H04L 1/18* (2006.01)

(52) U.S. Cl.
CPC .......... *H04L 1/0026* (2013.01); *H04L 1/1861* (2013.01); *H04L 1/1893* (2013.01); *H04L 5/0007* (2013.01)

(58) Field of Classification Search
CPC .. H04L 1/854; H04B 7/0417; H04W 72/0413; H04W 72/042; H04W 74/006; H04W 52/146
USPC .................................. 375/260, 267; 370/329
See application file for complete search history.

(56) References Cited

U.S. PATENT DOCUMENTS

| | | | |
|---|---|---|---|
| 9,413,451 | B2 | 8/2016 | Park et al. |
| 2009/0323607 | A1 | 12/2009 | Park et al. |
| 2010/0027466 | A1 | 2/2010 | Mustapha |
| 2010/0061361 | A1 | 3/2010 | Wu |
| 2011/0222428 | A1 | 9/2011 | Charbit et al. |
| 2011/0242997 | A1* | 10/2011 | Yin ........................ H04L 1/0031 370/252 |
| 2012/0009963 | A1 | 1/2012 | Kim et al. |
| 2013/0155847 | A1 | 6/2013 | Li et al. |
| 2013/0225184 | A1 | 8/2013 | Liu et al. |
| 2014/0036806 | A1 | 2/2014 | Chen et al. |
| 2014/0204854 | A1 | 7/2014 | Freda et al. |
| 2014/0254544 | A1 | 9/2014 | Kar et al. |
| 2014/0315593 | A1 | 10/2014 | Vrzic et al. |
| 2014/0321375 | A1 | 10/2014 | Agiwal et al. |
| 2014/0369201 | A1 | 12/2014 | Gupta et al. |
| 2015/0103725 | A1 | 4/2015 | Sun et al. |
| 2016/0020877 | A1 | 1/2016 | Koutsimanis et al. |
| 2016/0073302 | A1 | 3/2016 | Yang et al. |
| 2016/0113039 | A1 | 4/2016 | Hole et al. |
| 2016/0135153 | A1* | 5/2016 | Suzuki .................. H04L 5/0051 370/329 |
| 2016/0234759 | A1 | 8/2016 | Kubota et al. |
| 2016/0353343 | A1 | 12/2016 | Rahman et al. |
| 2017/0201980 | A1 | 7/2017 | Hakola et al. |
| 2017/0230985 | A1* | 8/2017 | Yamada .............. H04W 72/082 |
| 2017/0289791 | A1 | 10/2017 | Yoo et al. |
| 2017/0290052 | A1 | 10/2017 | Zhang et al. |
| 2017/0331670 | A1 | 11/2017 | Parkvall et al. |
| 2017/0331785 | A1 | 11/2017 | Xu et al. |
| 2017/0359731 | A1 | 12/2017 | Soldati et al. |
| 2018/0123763 | A1 | 5/2018 | Yu |
| 2018/0124598 | A1 | 5/2018 | Zeng |
| 2018/0139656 | A1 | 5/2018 | Xu et al. |
| 2018/0167938 | A1 | 6/2018 | Stephenne et al. |
| 2018/0198504 | A1 | 7/2018 | Li et al. |
| 2018/0199361 | A1 | 7/2018 | Zhang et al. |
| 2018/0242304 | A1 | 8/2018 | Rong et al. |

FOREIGN PATENT DOCUMENTS

| | | |
|---|---|---|
| EP | 3051906 A1 | 8/2016 |
| EP | 3082362 A1 | 10/2016 |
| EP | 3101971 A1 | 12/2016 |
| WO | 2014/090200 A1 | 6/2014 |
| WO | 2014/090208 | 6/2014 |
| WO | 2015/045658 A1 | 4/2015 |
| WO | 2015/080646 A1 | 6/2015 |
| WO | 2015/100533 A1 | 7/2015 |
| WO | 2015/113205 A1 | 8/2015 |
| WO | 2015/141982 A1 | 9/2015 |

OTHER PUBLICATIONS

3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) S2-162982 was S2-162717-MDD and Slice Selection in core and RAN V1, 3rd vol. SA WG2 Nokia et al., No. Nanjing, P.R. China; May 27, 2016, 13 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) RP-161214 TSG RAN Meeting #72, Revision of SI: Study on New Radio Access Technology, NH DOCOMO, Busan, Korea, Jun. 13-16, 2016, 8 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

(56) References Cited

OTHER PUBLICATIONS

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
Sesia et al., "LTE—The UMTS Long Term Evolution", Chapter 9.3.3., LTE—The UMTS Long Term Evolution : from theory to Practice; Jul. 20, 2011, pp. 198-200.
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, No. Lisbon, Portugal; Oct. 1, 2016 O-Oct. 14, 2016 Sep. 30, 2016.
Qualcomm Incorporated: "Frame structure requirements", 3GPP Draft; vol. RAN WG1, No. Nanjing, China; May 14, 2016.
NGMN 5G Initiative White Paper v1.0, Feb. 17, 2015, 125 pages.
International Telecommunication Union (ITU-R), "IMT Vision—Framework and overall objectives of the future development of IMT for 2020 and beyond", Recommendation ITU-R M.2083-0, Sep. 2015, 21 pages.
IEEE P80211, Wireless LANs, Proposed TGax draft specification, Comment Resolutions on UL MU Operation, Jul. 25, 2016, 27 pages.
Chu, David, "Polyphase Codes With Good Periodic Correlation Properties", IEEE Transactions on Information Theory, Jul. 1972, 531-532.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG RAN WG1 Meeting #85, R1-165174, Uplink Multiple Access Schemes for NR, May 23-27, 2016, 4 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #84bis, R1-162379, Overview of New Radio Access Technology Requirements and Designs, Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.

(56) References Cited

OTHER PUBLICATIONS

3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.

3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.

3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.

3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.

3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.

3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.

3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.

3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.

3rd Generation Partnership Project (3GPP) TR 36.881 V14.0.0, Technical Specification Group Radio Access Network, Evolved Universal Ten-estrial Radio Access (E-UTRA), Study on Latency Reduction Techniques for LTE (Release 14), Jun. 2016, 249 pages.

3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.

3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.

* cited by examiner (a) - DL and UL subframes as building blocks for NR frame (b) - DL transmission and corresponding A/N transmission in TDD using the building blocks (c) - DL transmission and corresponding A/N transmission in FDD using the building blocks Container with contiguous UL allocation Container with dis-contiguous UL allocation $B_{DL} > B_{UL}$ or $B_{DL} = B_{UL}$ or $B_{DL} < B_{UL}$ UL resources for UE-1      DL resources for UE-1 or blank Guard period      UL resources for UE-2 or blank (a) Separate RS and DCIs (b) Interleaved RS and DCIs (a) Separate RS and DCIs

UPLOAD CONTROL SIGNALING FOR NEW RADIO

CROSS REFERENCE TO RELATED APPLICATIONS

This application claims the benefit of priority to U.S. Provisional Patent Application No. 62/350,437, filed Jun. 15, 2016, U.S. Provisional Patent Application No. 62/373,850 filed Aug. 11, 2016, U.S. Provisional Patent Application No. 62/399,921 filed Sep. 26, 2016 and U.S. Provisional Patent Application No. 62/401,062 filed Sep. 28, 2016, the disclosures of which are incorporated by reference in their entireties.

BACKGROUND

Existing and proposed telecommunications networks and subnetwork, may operate in accordance with various standards, such as LTE, 4G, 5G, and 3GPP, to support diverse applications, such as live communication, entertainment media transmission, computer data transfer, and Internet-of-things (IoT), Web-of-things, and machine-to-machine (M2M) operations. Various standards include mechanisms for group operations such as multicast. See, e.g., 3GPP TR 22.891 Feasibility Study on New Services and Markets Technology Enablers (SMARTER); Stage 1 (Release 14) V-1.1.0; Recommendation ITU-R M.2083: IMT Vision—"Framework and overall objectives of the future development of IMT for 2020 and beyond" (September 2015); 3GPP TS 36.331 Radio Resource Control (RRC); Protocol specification (Release 13), V13.0.0; 3GPP TR 38.913 Study on Scenarios and Requirements for Next Generation Access Technologies; (Release 14), V0.2.0; 3GPP TS 36.304 User Equipment (UE) Procedures in Idle Mode (Release 13), V13.0.0; 3GPP 36.881 Study on Latency reduction techniques for LTE, V13.0.0; 3GPP R1-164694 Frame Structure Requirements, Qualcomm, May 2016; 3GPP R1-164628 Frame Structure for NR, Ericsson, May 2016; 3GPP R1-165363 On HARQ functionality for 5G, Nokia, May 2016; and 3GPP R1-164014 Discussion on RS for beamformed access, Samsung, May 2016.

In Long Term Evolution (LTE), multi-antenna techniques may be used to achieve improved system performance, including improved system capacity (more users per cell) and improved coverage (possibility for larger cells), as well as improved service provisioning (e.g. higher per-user data rates). The availability of multiple antennas at the transmitter and/or the receiver can be utilized in different ways to achieve different aims, for example via antenna diversity, antenna beamforming, and antenna spatial multiplexing.

In antenna diversity, multiple antennas at the transmitter and/or the receiver can be used to provide additional diversity against fading on the radio channel.

In antenna beamforming, multiple antennas at the transmitter and/or the receiver can be used to "shape" the overall antenna beam in a certain way—for example, to maximize the overall antenna gain in the direction of the target receiver or to suppress specific dominant interfering signals.

In antenna spatial multiplexing, the simultaneous availability of multiple antennas at the transmitter and receiver can be used to create multiple parallel communication "channels" over the radio interface. This provides high data rates within a limited bandwidth, which is referred to as Multiple-Input and Multiple-Output (MIMO) antenna processing.

SUMMARY

Containers consisting of flexibly configurable DL, UL and blank resources within time-frequency blocks may be used to support multiple numerologies in NR. UL control may be defined in resources within a container or in dedicated resources, by various nodes such as the UE and eNB nodes of 3GPP, terminal, and RAN systems at the physical, data link, and network layers through the modification, extension, or addition of NR, UL Control, DL HARQ, UL Data, A/N, sTTI, and numerology features, methods, and functions.

SRS resources may be either dynamically or semistatically configured for each numerology supported in the NR. The wideband and narrowband SRS sequence length is adaptive to each supported numerology, and the configuration of wideband SRS is signaled via higher layer signaling (for example, RRC signaling) for each supported numerology. The time domain location of SRS symbols is not limited to the last symbol of a time interval X (or equivalent time unit of a TTI/subframe) and can be adaptive based on either aperiodic or periodic transmission. Time, frequency, and orthogonal resources for SRS can be allocated by using either a DL control channel or RRC configuration. For a self-contained time structure, the number of transmitted SRS symbols and allocated frequency bandwidth can be dynamically or semistatically configured by either using a DL control channel or RRC configuration. The transmission of an SRS in a self-contained frame structure (e.g. time interval X) can be triggered by the DL control channel in the same or previous time interval X.

Alternatively or additionally, a method of channel sounding with or without the full channel knowledge is described. The SRS can be pre-coded in FDD, TDD systems or in flexible frame structure. The pre-coding weights for SRS can be based on a codebook or non-codebook based approach. Pre-coded SRS can be adaptive to UE antenna configuration. The pre-coding configuration of SRS can be done by either RRC or DL control channel. Pre-coded SRS can be dynamically or semistatically configured by eNB to support multiple numerologies. Further, NR-SRS may be used as UL demodulation RS (DM-RS).

DETAILED DESCRIPTION

Figure 1:
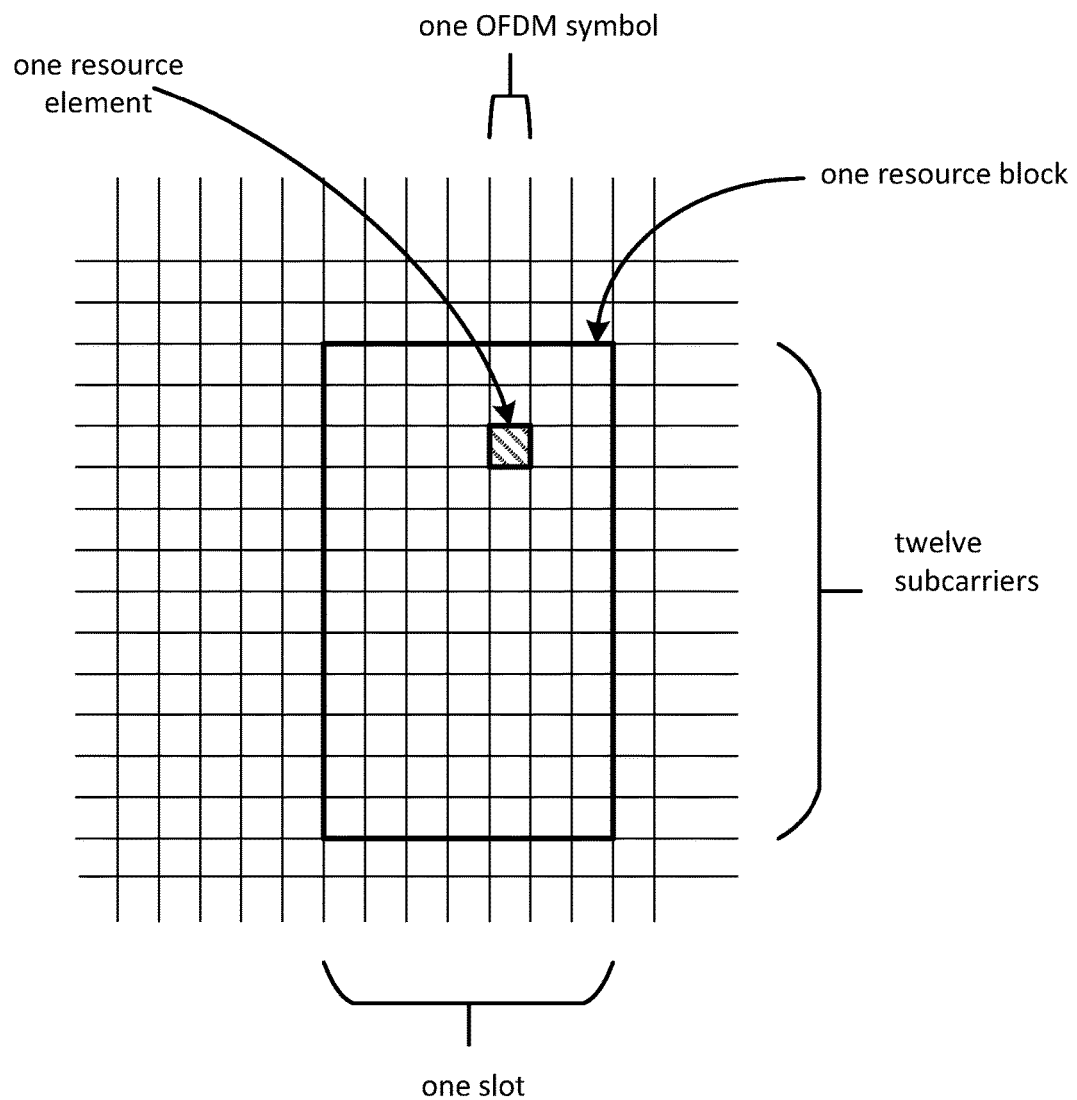
FIG. 1 illustrates an example PRB in LTE.

Containers consisting of flexibly configurable DL, UL and blank resources within time-frequency blocks may be used to support multiple numerologies in NR. UL control may be defined in resources within a container or in dedicated resources, by various nodes such as the UE and eNB nodes of 3GPP, terminal, and RAN systems at the physical, data link, and network layers through the modification, extension, or addition of NR, UL Control, DL HARQ, UL Data, A/N, sTTI, and Numerology features, methods, and functions.

SRS resources may be either dynamically or semistatically configured for each numerology supported in the NR. The wideband and narrowband SRS sequence length is adaptive to each supported numerology, and the configuration of wideband SRS is signaled via higher layer signaling (for example, RRC signaling) for each supported numerology. The time domain location of SRS symbols is not limited to the last symbol of a time interval X (or equivalent time unit of a TTI/subframe) and can be adaptive based on either aperiodic or periodic transmission. Time, frequency, and orthogonal resources for SRS can be allocated by using either a DL control channel or RRC configuration. For a self-contained time structure, the number of transmitted SRS symbols and allocated frequency bandwidth can be dynamically or semistatically configured by either using a DL control channel or RRC configuration. The transmission of an SRS in a self-contained frame structure (e.g. time interval X) can be triggered by the DL control channel in the same or previous time interval X.

Alternatively or additionally, a method of channel sounding with or without the full channel knowledge is described. The SRS can be pre-coded in FDD, TDD systems or in flexible frame structure. The pre-coding weights for SRS can be based on a codebook or non-codebook based approach. Pre-coded SRS can be adaptive to UE antenna configuration. The pre-coding configuration of SRS can be done by either RRC or DL control channel. Pre-coded SRS can be dynamically or semistatically configured by eNB to support multiple numerologies. Further, NR-SRS may be used as UL demodulation RS (DM-RS).

Table 1 is a list of acronyms used herein. Unless otherwise specified, the acronyms used herein refer to the corresponding term listed in Table 1.

TABLE 1

| Acronyms | |
|---|---|
| 2D | Two-Dimensional |
| 3D | Three-Dimensional |
| A/N | Ack/Nack |
| AAS | Active Antenna System |
| AoA | Angle or Arrival |
| AoD | Angle of Departure |
| API | Application Program Interface |
| AS | Access Stratum |
| BCCH | Broadcast Control Channel |
| BCH | Broadcast Channel |
| BF | Beamforming |
| BL | Bandwidth reduced Low complexity |
| BRS | Beam Reference Signal |
| CAZAC | Constant Amplitude Zero auto-correlation |
| CE | Control Element |
| CMAS | Commercial Mobile Alert System |
| CN | Core Network |
| CoMP | Coordinated Multi Point |
| CP | Cyclic Prefix |
| CQI | Channel Quality Indication |

TABLE 1-continued

| Acronyms | |
|---|---|
| C-RNTI | Cell Radio-Network Temporary Identifier |
| CRS | Cell-specific Reference Signals |
| CSG | Closed Subscriber Group |
| CSI | Channel State Information |
| CSI-RS | Channel State Information Reference Signals |
| DCI | Downlink Control Information |
| DFT | Discrete Foutier Transform |
| DL | Downlink |
| DL-SCH | Downlink Shared Channel |
| DM-RS | Demodulation Reference Signals |
| DoA | Direction-of-Arrival |
| DoD | Direction-of-Departure |
| DRX | Discontinuous Reception |
| E2E | End to End |
| EAB | Extended Access Barring |
| eCell | Extended Cell |
| eDRX | Extended Discontinuous Reception |
| eMBB | enhanced Mobile Broadband |
| ENB | Evolved Node B |
| EPDCCH | Enhanced Physical Downlink Control Channel |
| ETWS | Earthquake and Tsunami Warning System |
| E-UTRA | Evolved Universal Terrestrial Radio Access |
| E-UTRAN | Evolved Universal Terrestrial Radio Access Network |
| FD | Full-Dimension |
| FDD | Frequency Division Duplex |
| FFS | For Further Study |
| FH | Frequency Hopping |
| GP | Guard Period |
| GUI | Graphical User Interface |
| HARQ | Hybrid Automatic Repeat Request |
| HD | High Definition |
| ID | Identification |
| IE | Information element |
| IMT | International Mobile Telecommunications |
| IOT | Internet of Things |
| KP | Kronecker-Product |
| KPI | Key Performance Indicators |
| LC-MTC | Low Cost or Low Complexity Machine-Type Communications |
| LTE | Long term Evolution |
| MAC | Medium Access Control |
| MBB | Mobile Broadband |
| MBSFN | Multicast-Broadcast Single-Frequency Network |
| MCL | Maximum Coupling Loss |
| MCS | Modulation and Coding Scheme |
| MIB | Master Information Block |
| MIMO | Multiple-Input and Multiple-Output |
| MME | Mobility Management Entity |
| mMTC | massive Machine Type Communication |
| MTC | Machine-Type Communications |
| MVNO | Mobile Virtual Network Operator |
| NAS | Non-access Stratum |
| NB | Narrow Beam |
| NB-IOT | Narrow band IoT |
| NIDI | New Data Indicator |
| NEO | NEtwork Operation |
| NGMN | Next Generation Mobile Networks |
| NR | New Radio |
| NR-A/N | A/N in NR |
| NR-BID | Beam Index in NR |
| NR-CQI | Channel Quality Indicator in NR |
| NR-DCI | Downlink control information in NR |
| NR-DD | Downlink data in NR |
| NR-DRS | Reference signal in Downlink in NR (typically used for channel estimation) |
| NR-PMI | Pre-coder Matrix Index in NR |
| NR-RI | Rank indicator in NR |
| NR-SIR | Soft information on Reliability in NR |
| NR-SR | Scheduling Request in NR |
| NR-UCI | Uplink control information in NR |
| NR-UD | Uplink data in NR |
| NR-URS | Reference signal in NR (typically used for channel estimation) |
| OCC | Orthogonal Cover Codes |

TABLE 1-continued

Acronyms

| | |
|---|---|
| OFDM | Orthogonal frequency division multiplexing |
| PBCH | Physical Broadcast Channel |
| PCFICH | Physical Control Format Indicator Channel |
| PDCCH | Physical Downlink Control Channel |
| PDNICH | Physical Downlink Numerology Indication Channel |
| PDSCH | Physical Downlink Shared Data Channel |
| PHICH | Physical Hybrid ARQ Indicator Channel |
| PLMN | Public Land Mobile Network |
| PMCH | Physical Multicast Channel |
| PMI | Pre-coder Matrix Indication |
| PRACH | Physical Random Access Channel |
| PRB | Physical Resource Block |
| PRS | Positioning Reference Signals |
| PUCCH | Physical Uplink Control Channel |
| PUSCH | Physical Uplink Shared Channel |
| RAN | Radio Access Network |
| RAT | Radio Access Technology |
| RB | Resource block |
| RE | Resource Element |
| RI | Rank Indication |
| RNTI | Radio Network Temporary Identifier |
| R-PDCCH | Relay-Physical Downlink Control Channel |
| RRC | Radio Resource Control |
| RRC | Radio Resource Control |
| RS | Reference Signal |
| RSRP | Reference Signal Received Power |
| RSRQ | Reference Signal Received Quality |
| RS SI | Received Signal Strength Indicator |
| RV | Redundancy Version |
| SC-FDMA | Single carrier frequency division multiple access |
| SDMA | Spatial Division Multiple Access |
| SFN | System Frame Number |
| SI | System Information |
| SIB | System Information Block |
| SIBe | SIB Essential |
| SIPF | SI Provisioning Function |
| SI-RNTI | System Information RNTI |
| SISO | Single-Input and Single-Output |
| SMARTER | Feasibility Study on New Services and Markets Technology |
| SPS-RNTI | Semi persistent scheduling RNTI |
| SR | Scheduling Request |
| SRS | Sounding Reference Signal |
| sTTI | Short TTI |
| TAU | Tracking Area Update |
| TBS | Transport Block Size |
| TDD | Time Division Duplex |
| TPC | Transmit Power Control |
| TRP | Transmission and Reception Point |
| TTI | Transmission Time Interval |
| UE | User Equipment |
| UHD | Ultra high definition |
| UL | Uplink |
| UR/LL | Ultra Reliable-Low Latency |
| URLLC | Ultra-Reliable and Low Latency Communications |
| vTTI | Transmission time interval of variable duration |
| WB | Wide Beam |
| WLAN | Wireless Local Area Network |
| WRC | Wireless Planning Coordination |

Regarding frame structure, LTE defines the UL and DL Transmission Time Interval (TTI) to be 1 ms. Also referred to as a 'subframe' in LTE, the TTI corresponds to duration in which up to two transport blocks of dynamic size are delivered to the physical layer and transmitted over the radio interface for each component carrier. The number of transport blocks transmitted within a TTI depends on the configuration of the multi-antenna transmission scheme. In the case of no spatial multiplexing there is at most a single transport block in a TTI. In the case of spatial multiplexing, with transmission on multiple layers in parallel, there are two transport blocks within a TTI In LTE, each 0.5 ms of the TTI is called a 'slot'. A 'physical resource block' (PRB) is defined as a block of resources corresponding to 180K in the frequency domain and 0.5 ms in time. PRBs are allocated in pairs in the time domain by the scheduler in the UL and DL. So an UL or DL grant is in such a scheme at least one TTI long.

FIG. 1 shows the resource structure for 1 PRB in LTE. Each slot contains 6 or 7 OFDM (in DL) or SC-FDMA (in UL) symbols depending on whether the configuration uses extended or normal CP. A frame in LTE consists of 10 subframes and is therefore 10 ms long.

Figure 2:
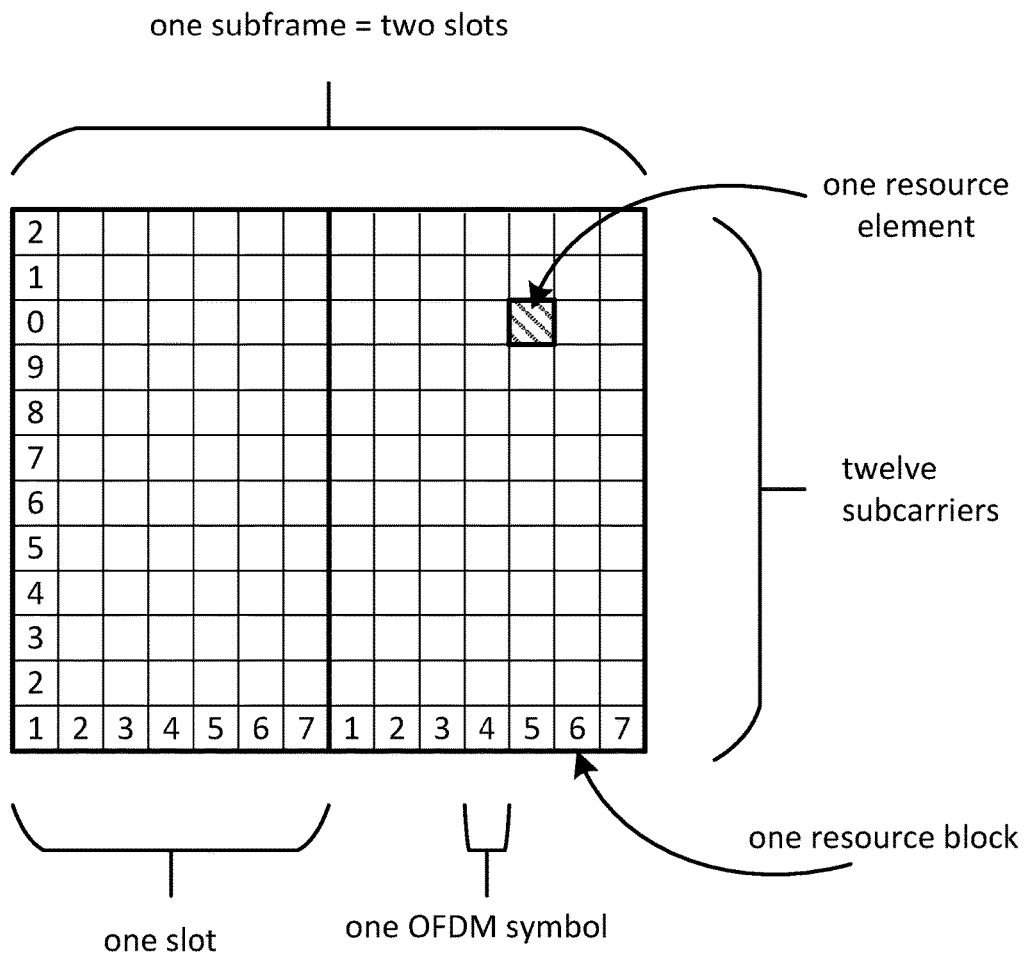
FIG. 2 illustrates an example resource grid for one subframe or TTI in LTE with normal CP.
Figure 3:
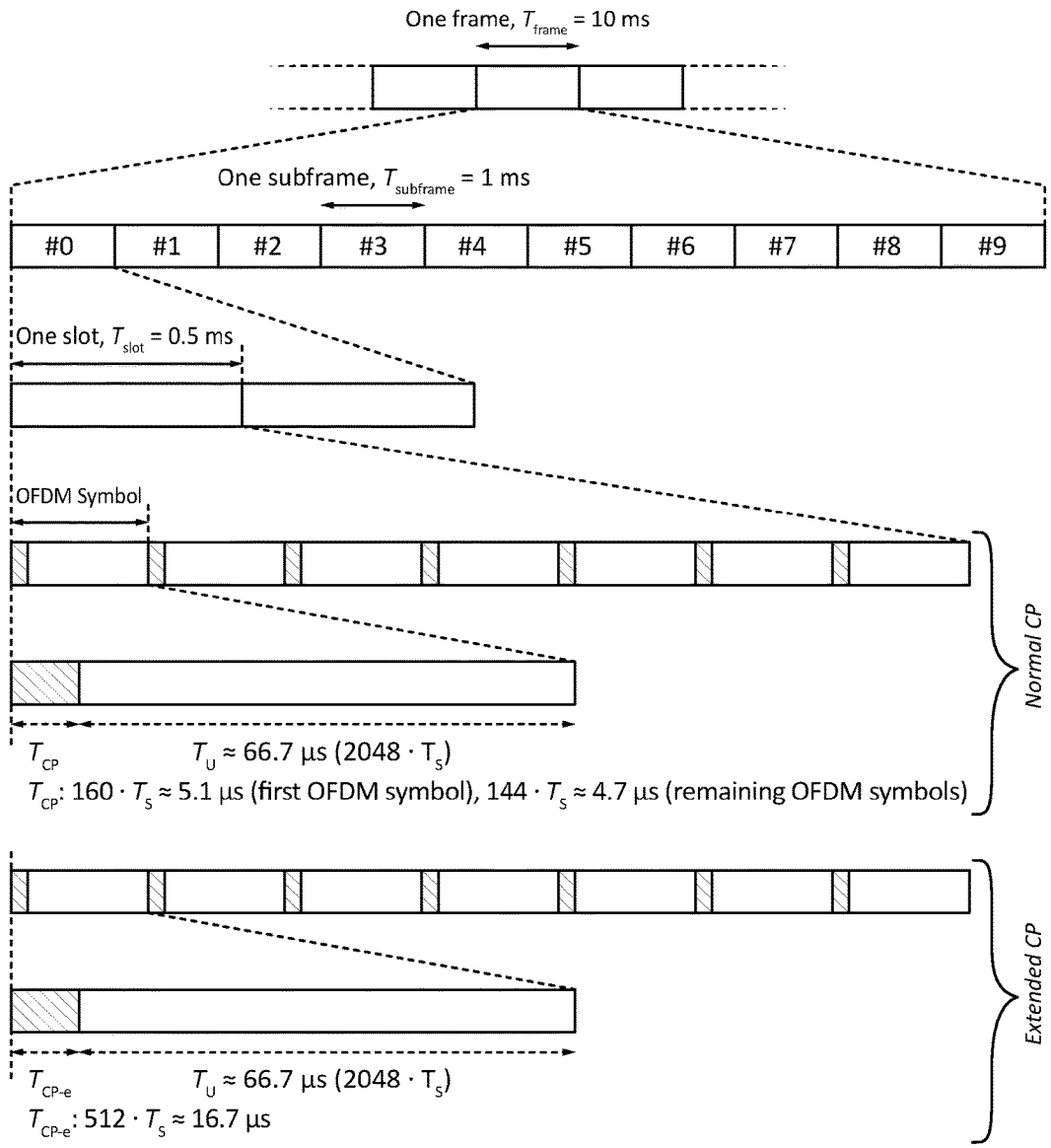
FIG. 3 illustrates an example time domain structure in LTE.

FIG. 2 shows the resource grid structure for 1 TTI assuming normal CP for the symbols. 10 subframes constitute a frame in LTE. FIG. 3 shows the time domain structure of the LTE frame. Various physical channels are multiplexed into the resource elements of the TTI.

In the UL the physical layer transmissions of the LTE uplink consists of several PHY channels, including: PRACH—Physical Random Access Channel; PUSCH—Physical Uplink Shared Channel carrying data and piggy-backed control information including Ack/Nack response to DL grant (A/N), channel state information (CSI), pre-coder matric index (PMI), rank indicator (RI) and scheduling request (SR) for the DL channel; and PUCCH—Physical Uplink Control Channel carrying A/N, CSI, PI, RI and SR.

Figure 4:
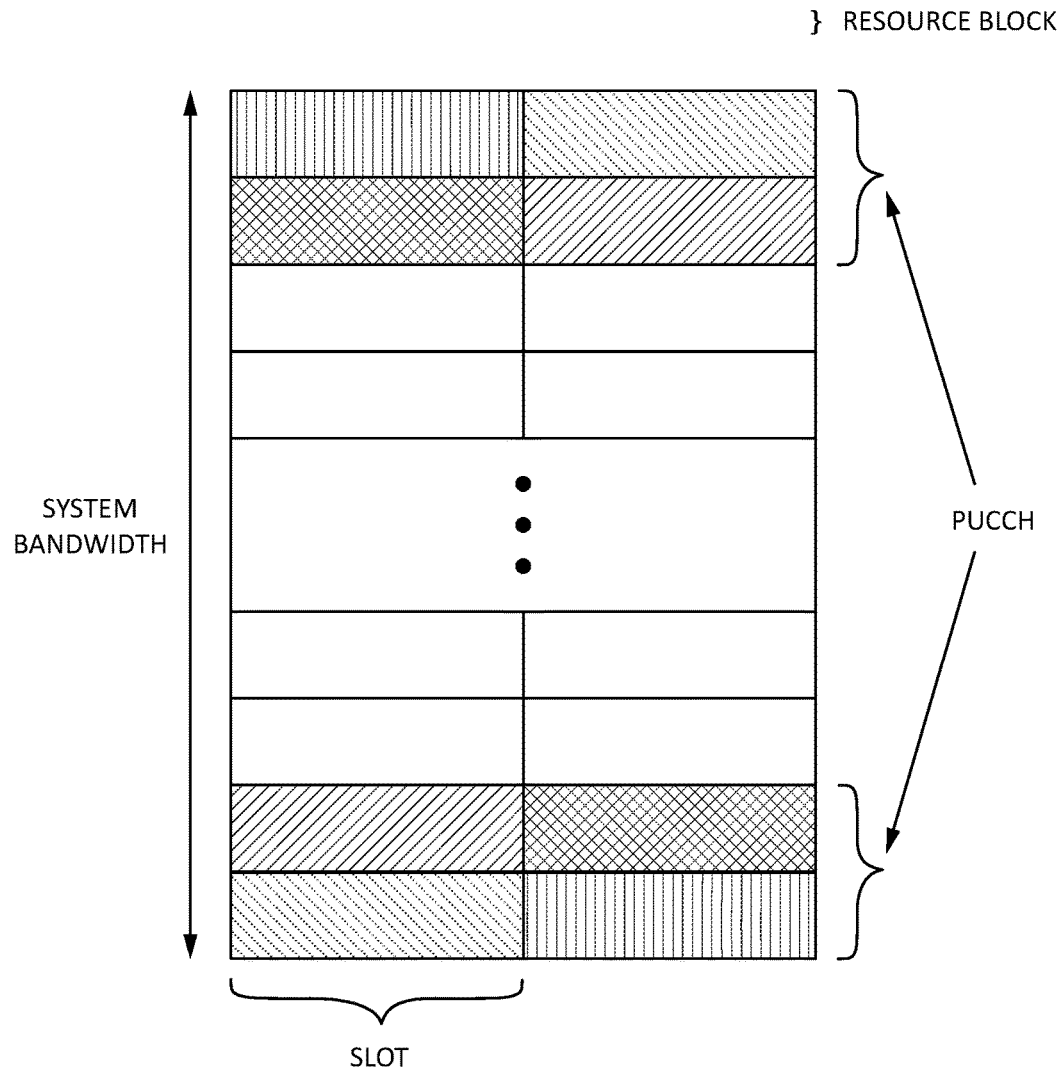
FIG. 4 illustrates an example of UL resources in LTE.

PUCCH resources are allocated at the outer edge of the band which PUSCH resources occupy the remaining portion in the middle as shown in FIG. 4. In addition, reference signals are also used in the UL, including: DM-RS—DeModulation Reference Signal to estimate the UL channel; and SRS—Sounding Reference Signal to obtain UL channel quality estimates Many physical-channel types are defined for LTE. The Physical Downlink Shared Channel (PDSCH) is the main physical channel used for unicast data transmission, but also for transmission of paging information. The Physical Broadcast Channel (PBCH) carries part of the system information, required by the terminal in order to access the network. The Physical Multicast Channel (PMCH) is used for MBSFN transmission. The Physical Downlink Control Channel (PDCCH) is used for downlink control information, mainly scheduling decisions, required for reception of PDSCH, and for scheduling grants enabling transmission on the PUSCH. The Enhanced Physical Downlink Control Channel (EPDCCH) was introduced in release 11. It essentially serves the same purpose as the PDCCH, but allows for transmission of the control information in a more flexible way. The Relay Physical Downlink Control Channel (R-PDCCH) was introduced in release 10 and is used to carry L1/L2 control signaling on the donor-eNodeB-to-relay link. The Physical Hybrid-ARQ Indicator Channel (PHICH) carries the hybrid-ARQ acknowledgement to indicate to the terminal whether a transport block should be retransmitted or not. The Physical Control Format Indicator Channel (PCFICH) is a channel providing the terminals with information necessary to decode the set of PDCCHs. There is one PCFICH per component carrier.

In DL L1/L2 control signaling PCFICH, PHICH and PDCCH are located in the control region (at the start of a subframe) while EPDCCH and R-PDCCH are located in the data region of a subframe.

Additionally various reference signals such as C-RS, CSI-RS and DMRS are multiplexed on to the PRBs to enable channel estimation and channel quality estimation.

Figure 5:
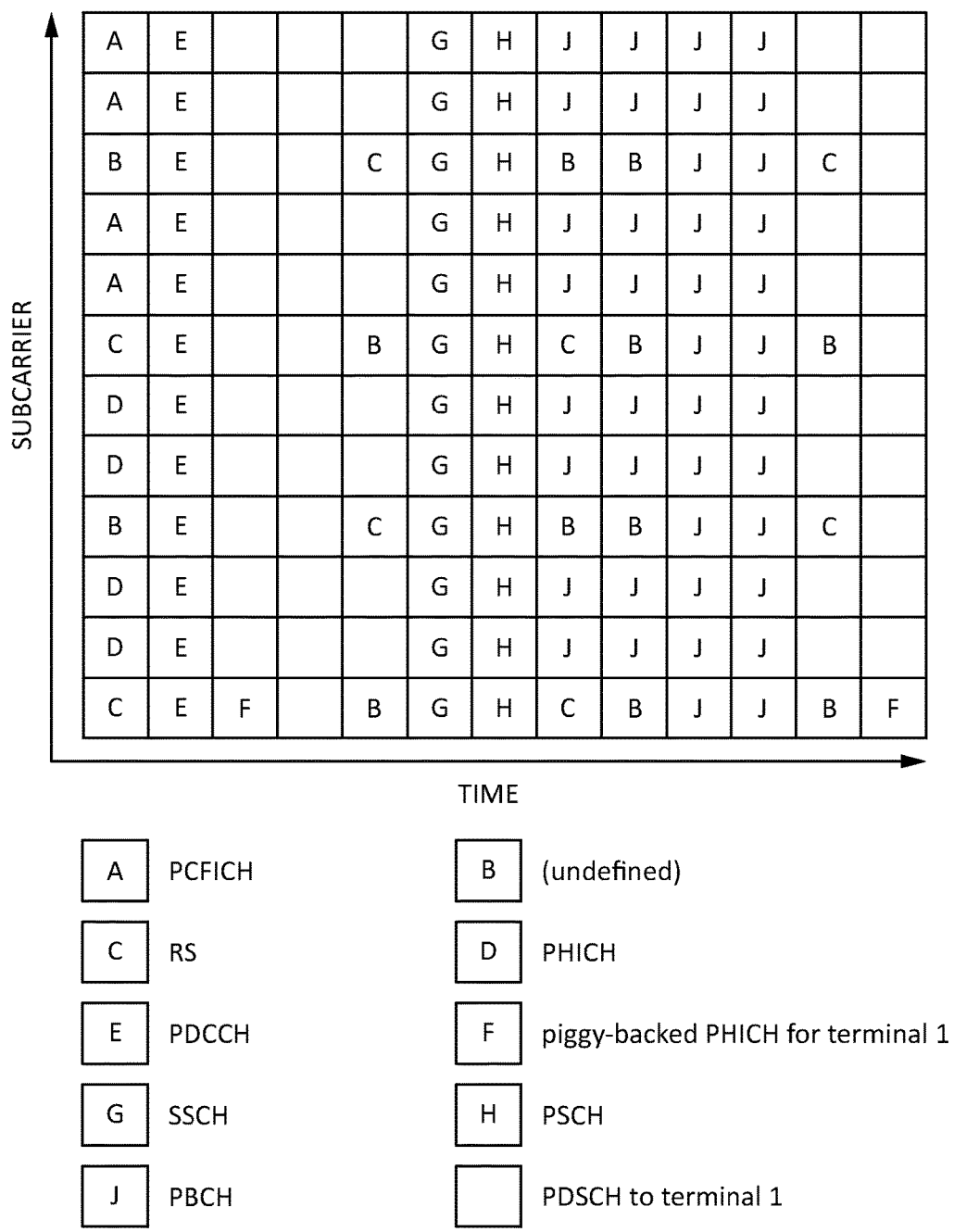
FIG. 5 illustrates an example of a DL time-frequency grid in LTE carrying different PHY channels.

FIG. 5 shows one configuration were the different channel are multiplexed on to a frame of LTE DL. Of particular interest in this disclosure is the PHICH which is used to signal hybrid-ARQ acknowledgements in response to uplink UL-SCH transmissions.

Physical Uplink Control Channel (PUCCH) carries Uplink Control Information (UCI) which is basically bits and pieces of information that eNB requires from UE in order to understand what UE needs and carries other information like channel quality that UE is seeing in downlink, for example. UCI may be divided into three main sub branches: Channel State Information (CSI), Scheduling Requests (SR) and HARQ ACK/NACK. CSI includes CQI reports, Rank Indicator (RI), and Pre-coding matrix (PMI). CQI informs an eNB about the downlink channel quality that is being observed by a UE. CQI values are in the range of 0 to 15, with 15 corresponding to excellent radio conditions. RI is control information sent from a UE to an eNB to help in the selection of downlink transmission layers. A PMI determines how the individual data streams, called layers in LTE, are mapped to the antennas. A UE sends a scheduling request (SR) to an eNB to get PUSCH/PUCCH resources for transmission of new control plane or user plane data. In an uplink, HARQ/NACK are sent to inform an eNB whether downlink data was correctly received. If the received data has an error, the UE will buffer the data and request a retransmission from the eNB.

Uplink L1/L2 control signaling needs to be transmitted on the uplink regardless of whether or not the terminal has any uplink transport-channel data to transmit and thus regardless of whether or not the terminal has been assigned any uplink resources for UL-SCH transmission. Hence, two different methods are proposed for the transmission of the uplink L1/L2 control signaling, depend on whether or not the terminal has been assigned an uplink resource for UL-SCH transmission.

Non-simultaneous transmission of UL-SCH and L1/L2 control. If the terminal does not have a valid scheduling grant—that is, no resources have been assigned for the UL-SCH in the current subframe—a separate physical channel, the PUCCH is used for transmission of uplink L1/L2 control signaling.

Simultaneous transmission of UL-SCH and L1/L2 control. If the terminal has a valid scheduling grant—that is, resources have been assigned for the UL-SCH in the current subframe—the uplink L1/L2 control signaling is time multiplexed with the coded UL-SCH on to the PUSCH prior to DFT pre-coding and OFDM modulation. As the terminal has been assigned UL-SCH resources, there is no need to support transmission of the scheduling request in this case.

The reason to differentiate between the two cases above is to minimize the cubic metric for the uplink power amplifier in order to minimize coverage. However, in situations when there is sufficient power available in the terminal, simultaneous transmission of PUSCH and PUCCH can be used with no impact on the coverage. The possibility for simultaneous PUSCH and PUCCH transmission was therefore introduced in release 10.

3GPP has defined different PUCCH formats to transfer different combinations of the information, as shown in Table 2. There are three different PUCCH formats provided, differentiated primarily by the size of the supported payload.

TABLE 2

PUCCH Formats

| PUCCH Format | Bits per TTI | Modulation Scheme | UCI Information |
|---|---|---|---|
| 1 | — | — | Scheduling Requests (SR) |
| 1a | 1 | BPSK | 1-bit HARQ ACK/NACK with/without SR |
| 1b | 2 | QPSK | 2-bit HARQ ACK/NACK with/without SR 4-bit HARQ ACK/NACK with channel selection |
| 2 | 20 | QPSK | CSI with/without (1 or 2 bit HARQ ACK/NACK) |
| 2a | 21 | QPSK + BPSK | CSI and 1 bit HARQ ACK/NACK |
| 2b | 22 | QPSK + QPSK | CSI and 2 bit HARQ ACK/NACK |
| 3 | 48 | QPSK | Up to 10 bit HARQ ACK with/without 1 bit SR |

Regarding resource allocation, the resource-block pair to use for PUCCH is determined from the PUCCH resource index. Multiple resource-block pairs can be used to increase the control-signaling capacity in the cell; when one resource-block pair is full, the next PUCCH resource index is mapped to the next resource-block pair in sequence.

Figure 6:
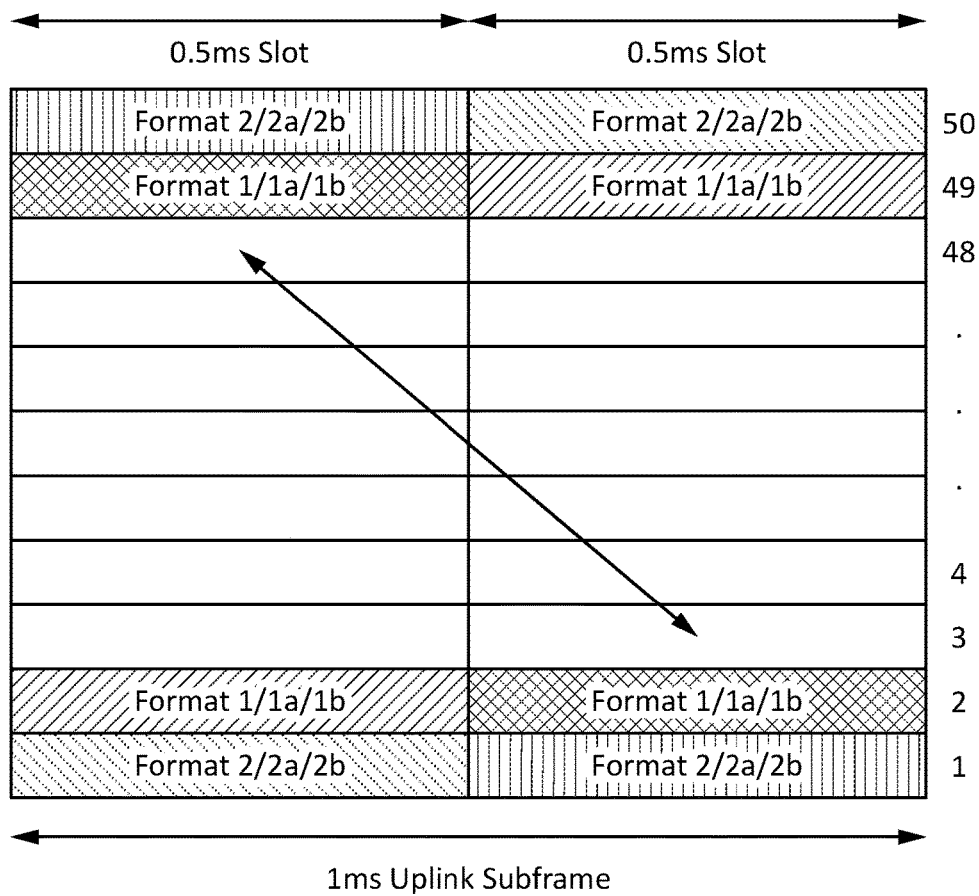
FIG. 6 illustrates an example of PUCCH frequency hopping.

The resource-block pair where a PUCCH is transmitted is located at the edges of the bandwidth allocated to the primary component carrier. To provide frequency diversity, frequency hopping on the slot boundary is used as shown in FIG. 6—that is, one "frequency resource" consists of 12 subcarriers at the upper part of the spectrum within the first slot of a subframe and an equally sized resource at the lower part of the spectrum during the second slot of the subframe (or vice versa).

The reasons for locating the PUCCH resources at the edges of the overall available spectrum are twofold. Together with the frequency hopping described previously, this maximizes the frequency diversity experienced by the control signaling. Assigning uplink resources for the PUCCH at other positions within the spectrum—that is, not at the edges would have fragmented the uplink spectrum, making it impossible to assign very wide transmission bandwidths to a single terminal and still preserve the low-cubic-metric properties of the uplink transmission.

Each pair of RBs allocated to PUCCH can be used simultaneously by multiple UEs by using different cyclic shifts and different orthogonal spreading codes.

Regarding UCI, if the terminal is transmitting data on PUSCH—that is, has a valid scheduling grant in the subframe—control signaling is time multiplexed with data on the PUSCH instead of using the PUCCH (in release 10, simultaneous PUSCH and PUCCH can be used, avoiding the need for control signaling on PUSCH for most cases at the cost of a somewhat worse cubic metric). Only hybrid-ARQ acknowledgements and CSI reports are transmitted on the PUSCH.

Figure 7:
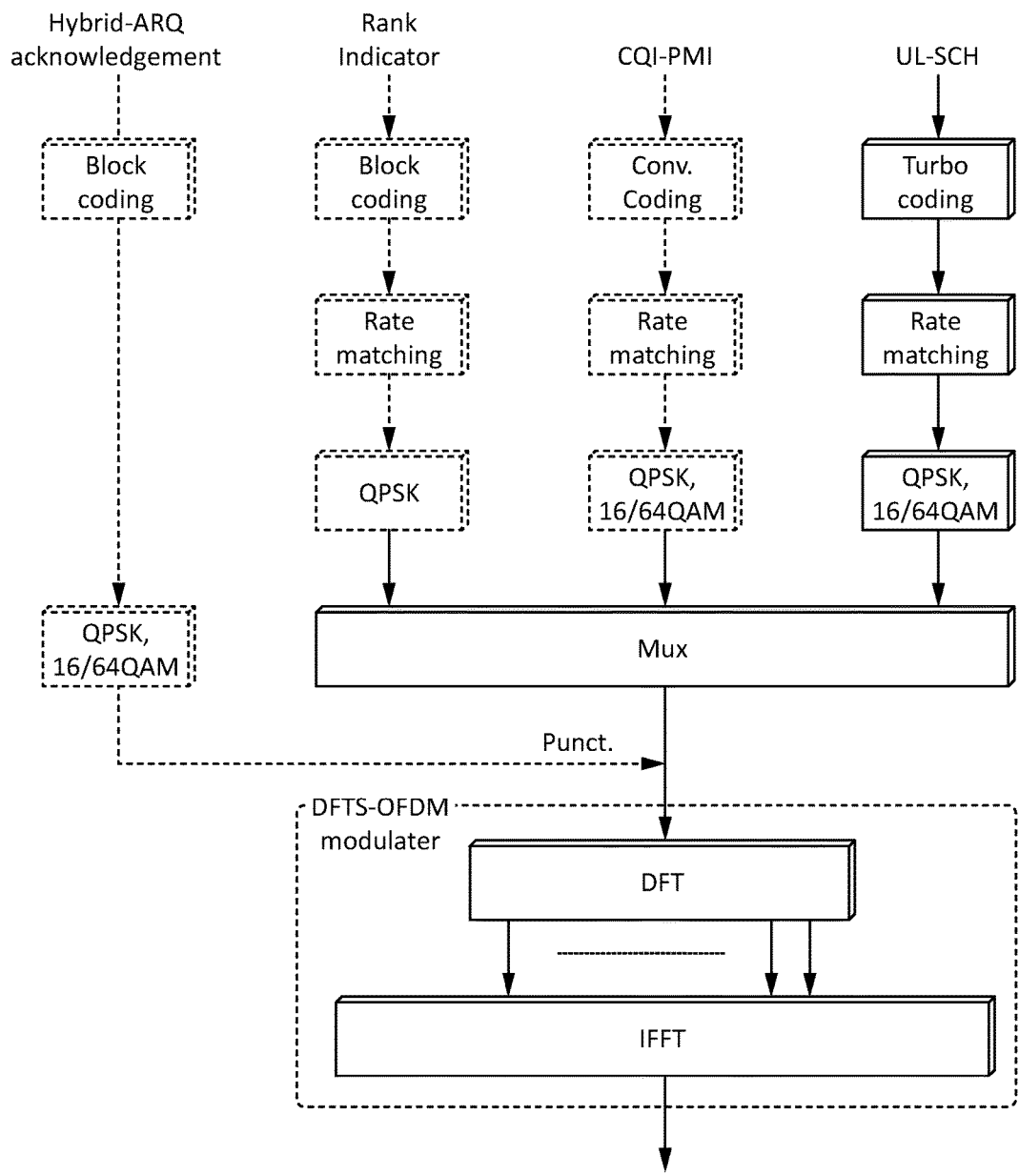
FIG. 7 illustrates an example mechanism for multiplexing of control and data onto PUSCH.
Figure 8:
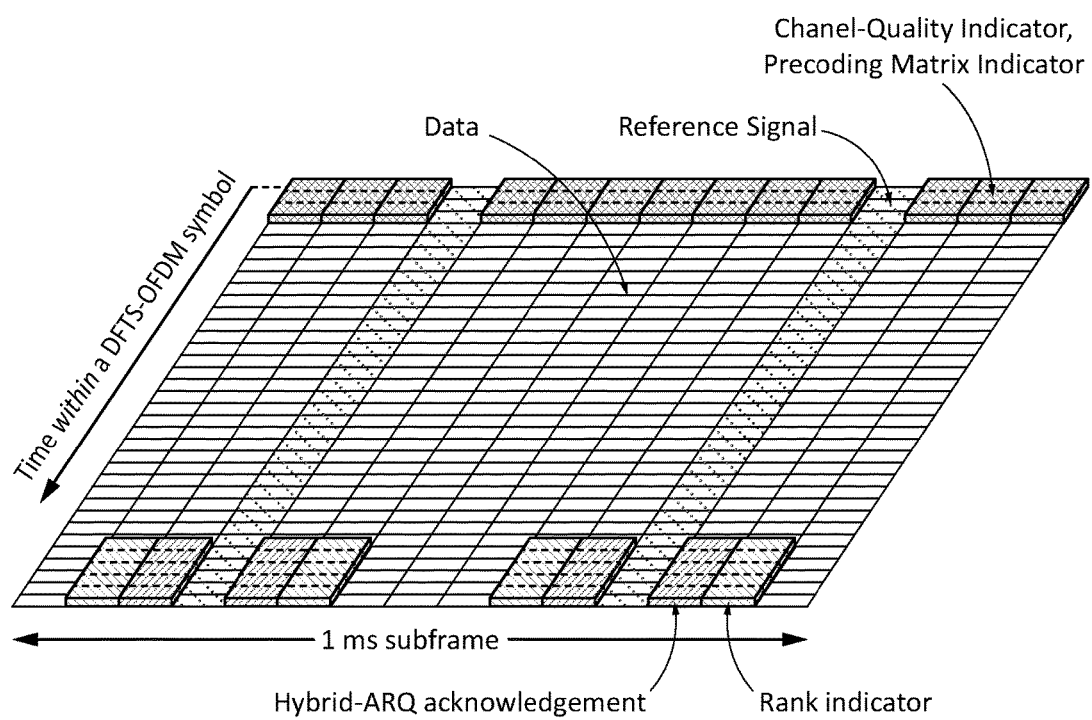
FIG. 8 illustrates an example of multiplexing control and data onto PUSCH.

Coding and modulation of UCI may be achieved in a number of ways. Time multiplexing of CSI reports and hybrid-ARQ acknowledgements is illustrated in FIGS. 7 and 8. FIG. 7 is a block diagram of example component functions. FIG. 8 shows an example subframe moving from the Mux to the DFT of FIG. 7. However, although they both use time multiplexing there are some differences in the details for the two types of uplink L1/L2 control signaling motivated by their different properties.

The hybrid-ARQ acknowledgement is important for proper operation of the downlink. For one and two acknowledgements, robust QPSK modulation is used, regardless of the modulation scheme used for the data, while for a larger number of bits the same modulation scheme for the data is used. Channel coding for more than two bits is done in the same way as for the PUCCH and bundling is applied if the number of bits exceeds 20—that is, two transport blocks on the same component carrier share a single bit instead of having independent bits. Furthermore, the hybrid-ARQ acknowledgement is transmitted near to the reference symbols as the channel estimates are of better quality close to the reference symbols. This is especially important at high Doppler frequencies, where the channel may vary during a slot. Unlike the data part, the hybrid-ARQ acknowledgement cannot rely on retransmissions and strong channel coding to handle these variations.

In principle, the eNodeB knows when to expect a hybrid-ARQ acknowledgement from the terminal and can therefore perform the appropriate demultiplexing of the acknowledgement and the data part. However, there is a certain probability that the terminal has missed the scheduling assignment on the downlink control channels (PDCCH or EPDCCH), in which case the eNodeB will expect a hybrid-ARQ acknowledgement while the terminal will not transmit one. If the rate matching pattern was to depend on whether an acknowledgement is transmitted or not, coded bits transmitted in the data part could be affected by a missed assignment, which is likely to cause the UL-SCH decoding to fail. To avoid this error, the hybrid-ARQ acknowledgements are therefore punctured into the coded UL-SCH bit stream. Thus, the non-punctured bits are not affected by the presence/absence of hybrid-ARQ acknowledgements and the problem of a mismatch between the rate matching in the terminal and the eNodeB is avoided.

A CSI report consists of Channel-Quality Indicator (CQI), Pre-coding Matrix Indicator (PMI), and Rank Indicator (RI). The CQI and PMI are time multiplexed with the coded data bits from PUSCH and transmitted using the same modulation as the data part. CSI reports are mainly useful for low-to-medium Doppler frequencies for which the radio channel is relatively constant, hence the need for special mapping is less pronounced. The RI, however, is mapped differently than the CQI and PMI, and the RI is located near to the reference symbols using a similar mapping as the hybrid-ARQ acknowledgements. The more robust mapping of the RI is motivated by the fact that the RI is required in order to correctly interpret the CQI/PMI. The CQI/PMI, on the other hand, is simply mapped across the full subframe duration. Modulation-wise, the RI uses QPSK.

Figure 9:
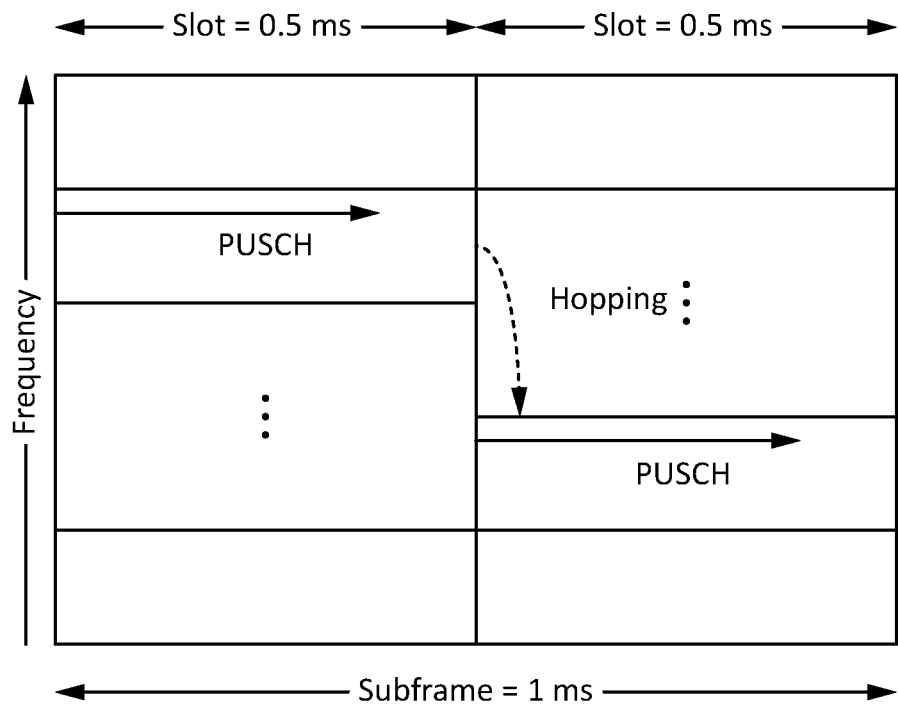
FIG. 9 illustrates an example of slot level frequency hopping.

In the LTE uplink, when data and control need to be transmitted in the same subframe, multiplexing is performed at the input of transform (DFT) pre-coding in order to keep the single-carrier property of SC-FDMA. In addition, the control and data multiplexing is performed in such a way that hybrid ARQ ACK/NACK information is present on both slots in the subframe and is mapped to resources around the demodulation reference signals. As the case of data transmission, it is important for hybrid ARQ ACK/NACK to gather frequency diversity, which can be achieved via slot-level hopping, as illustrated in FIG. 9.

LTE provides for DL HARQ. In FDD, DL data on the DL-SCH is transmitted to the terminal in subframe n and received by the terminal, after the propagation delay Tp, in subframe n. The terminal attempts to decode the received signal, possibly after soft combining with a previous transmission attempt, and transmits the hybrid-ARQ acknowledgement in uplink subframe n+4. Upon reception of the hybrid-ARQ acknowledgement, the eNodeB can, if needed, retransmit the downlink data in subframe n+8. Thus, eight hybrid-ARQ processes are used and the hybrid-ARQ round-trip time is 8 ms.

For TDD operation, the time relation between the reception of data in a certain hybrid-ARQ process and the transmission of the hybrid-ARQ acknowledgement depends on the downlink-uplink allocation. An uplink hybrid-ARQ acknowledgement can only be transmitted in an uplink subframe and a downlink acknowledgement only in a downlink subframe. The acknowledgement of a transport block in subframe n is transmitted in subframe n+k, where k>=4.

There is significant interest in reducing latency in future releases of LTE, over and beyond what can be currently achieved. Use cases include delay sensitive M2M applications, critical low latency applications and more robust real time applications such as VoLTE, gaming and conference.

As part of Rel. 14 the 3GPP working group approved a work item on latency reduction techniques in 3GPP 36.881 Study on Latency reduction techniques for LTE, V13.0.0. In the corresponding study item the group investigated proposals and performance of various latency reduction schemes that are backwards compatible with LTE (up to rel 13). One concept is the use of short TTIs (sTTI) that are much less than 1 ms in duration to provide reduced user-plane latency. The study item considered different TTI numerologies, e.g., various sTTI lengths from 2 symbols to 7 symbols.

sTTIs enables to reduce user plane latency because the signaling duration decreases and correspondingly, the processing times at the receiver, A/N response times and HARQ retransmission latencies also reduce.

Figure 10:
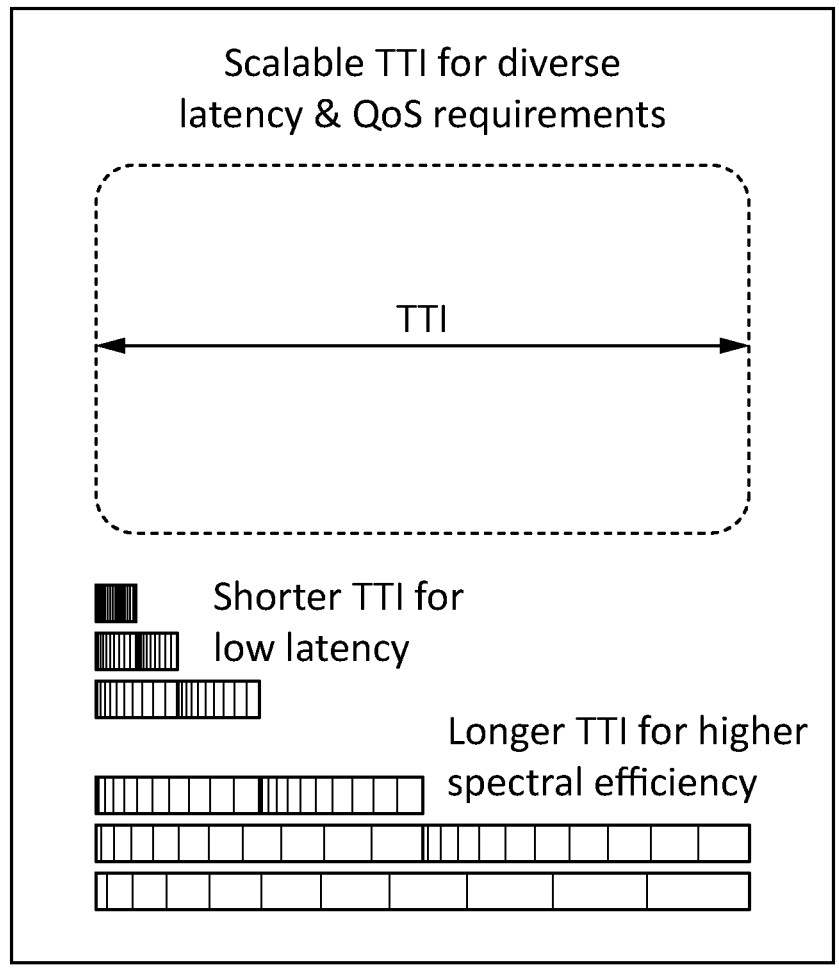
FIG. 10 illustrates a concept of scalable sTTI numerologies to support different latencies.
Figure 11:
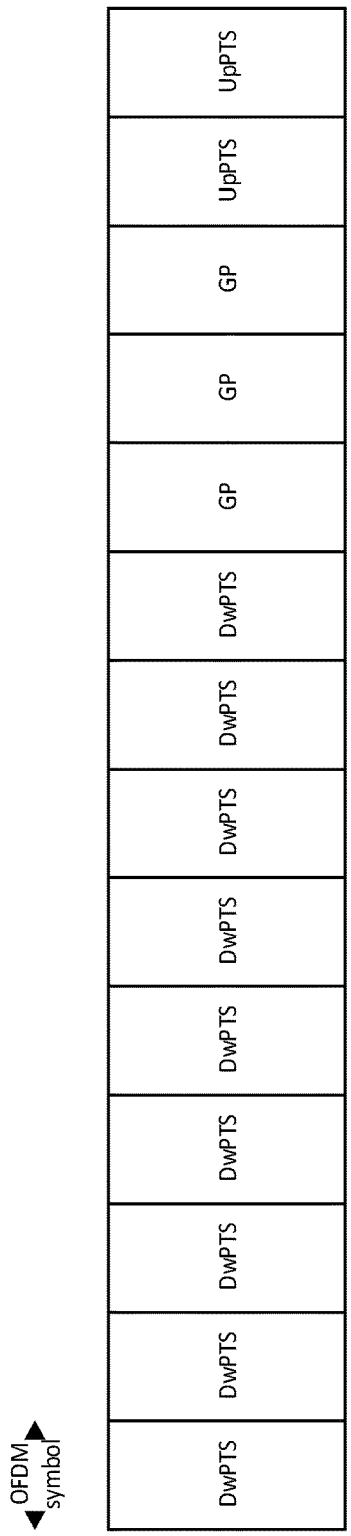
FIG. 11 illustrates an example TDD special subframe structure.

Table 3 shows an exemplary configuration of sTTIs based on the proposals in 3GPP 36.881. Because backwards compatibility is a requirement for these designs, traditional configurations assume 15 KHz carrier spacing. It is seen that the one way delay for signaling between UL and DL scales nearly linearly as the sTTI duration is scaled. FIG. 10 depicts the idea of linearly scaled sTTI numerologies. FIG. 11 illustrates an example TDD special subframe structure.

TABLE 3

Example sTTI configurations

| | | sTTI Numerology (# of symbols in sTTI assuming 15 KHz subcarrier spacing) | | | |
|---|---|---|---|---|---|
| Step | Description | 14 (LTE) | 7 | 4 | 2 |
| 1 | eNB Processing Delay = 1 * TTI | 1 ms | 0.5 ms | 0.28 ms | 0.14 ms |
| 2 | UE Processing Delay = 1.5 * TTI | 1.5 ms | 0.75 ms | 0.42 ms | 0.21 ms |
| 3 | Frame Alignment = 0.5 * TTI | 0.5 ms | 0.25 ms | 0.14 ms | 0.070 ms |
| 4 | sTTI duration = 1 * sTTI | 1 ms | 0.5 ms | 0.28 ms | 0.14 ms |
| 5 | HARQ delay (BLER @ 10%) = 8*0.1 * TTI | 0.8 ms | 0.4 ms | 0.23 ms | 0.115 ms |
| | Total one way delay | 4.8 ms | 2.4 ms | 1.35 ms | 0.68 ms |

LTE TDD special subframe introduced in Rel. 13 has three parts: Downlink pilot timeslot (DwPTS), Guard Period (GP) and Uplink pilot timeslot (UpPTS). The DwPTs carry DL data and control channels. When switching from downlink to uplink, a GP is inserted between the DwPTS and UpPTS field in each special subframe. The duration of the GP is configured by the network, based on the cell size. The UpPTS part of the special subframe is considerably shorter than the downlink DwPTS. The UpPTS carry SRS or PRACH. When switching from uplink to downlink there is no need for a guard period, since the uplink signals arrive at the eNodeB in a frame-synchronous fashion. One of LTE TDD special subframe structure with 9 OFDM symbols DwPTS, 3 GP OFDM symbols and 2 OFDM symbols UpPTS is depicted in the following:

It is expected that ultra reliable low latency applications in new radio/5G architectures, such as drone control, remote surgery, and some mMTC applications such as robotic control and industry automation, will significantly benefit from reduced control and user plane latencies. So there is considerable interest in having the UL and DL numerologies for 5G accommodate such use cases without requiring backward compatibility with LTE.

3GPP TR 38.913 defines scenarios and requirements for next generation access technologies. The following are excerpts of the Key Performance Indicators (KPI) section of 3GPP TR 38.913 that are relevant to low latency design.

7.5 User Plane Latency

For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture.

NOTE1: The reliability KPI also provides a latency value with an associated reliability requirement. The value above should be considered an average value and does not have an associated high reliability requirement.

For eMBB, the target for user plane latency should be 4 ms for UL, and 4 ms for DL.

NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture).

Figure 12:
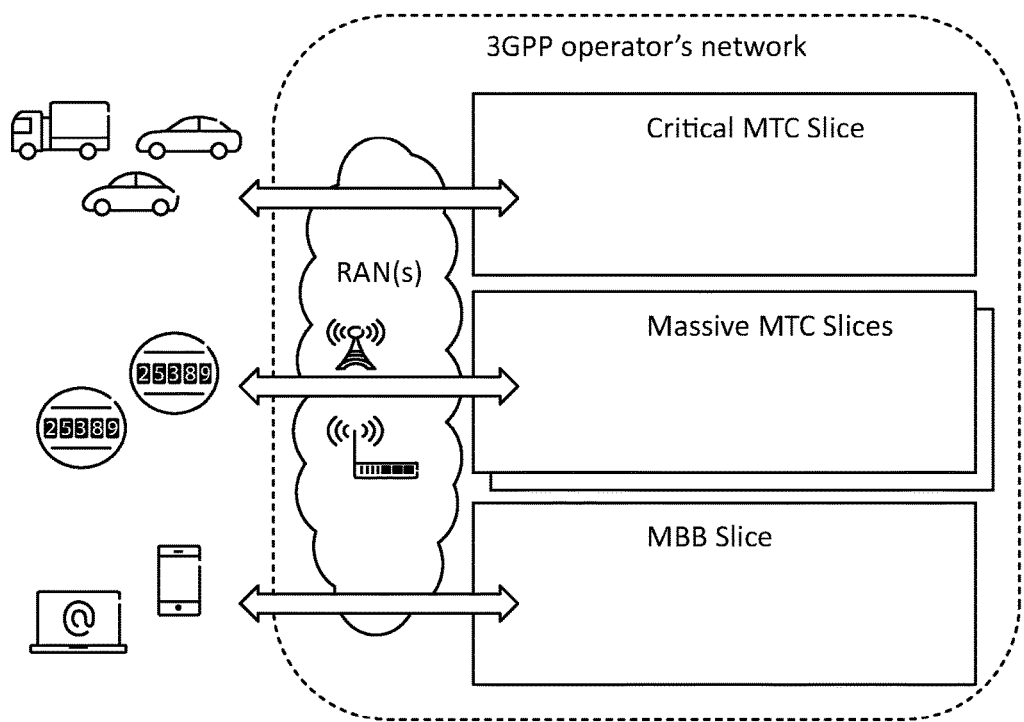
FIG. 12 illustrates a network slicing concept.

The FIG. 12 provides a high level illustration of the concept of network slicing. A network slice is composed of a collection of logical network functions that support the communication service requirements of particular use case (s). It shall be possible to direct UEs to selected slices in a way that fulfil operator or user needs, e.g. based on subscription or UE type. The network slicing primarily targets a partition of the core network, but it is not excluded that Radio Access Network (RAN) may need specific functionality to support multiple slices or even partitioning of resources for different network slices. See 3GPP TR 38.913 Study on Scenarios and Requirements for Next Generation Access Technologies, Release 14, V0.2.0.

Potential network slicing service requirements defined in 3GPP TR 22.891. The 3GPP System shall allow the operator to compose network slices, e.g., independent sets of network functions (e.g. potentially from different vendors) and parameter configurations, e.g. for hosting multiple enterprises or Mobile virtual network operators (MVNOs) etc. The operator shall be able to dynamically create network slice to form a complete, autonomous and fully operational network customized to cater for different diverse market scenarios. The 3GPP System shall be able to identify certain UEs and subscribers to be associated with a particular network slice. The 3GPP System shall be able to enable a UE to obtain service from a specific network slice e.g. based on subscription or UE type.

Figure 13:
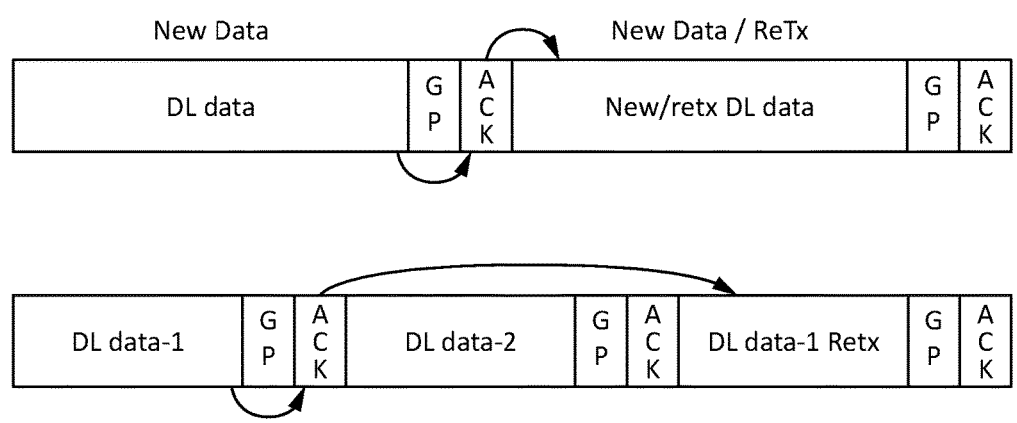
FIG. 13 illustrates an example self-contained subframe in TDD.

Currently 3GPP standardization efforts are underway to define the NR frame structure. Consensus is building along the lines of having 'self-contained' subframes for NR. Broadly, a self-contained subframe is understood to contain the control information for a grant, the data and it's A/N acknowledgement within a subframe and is expected to have configurable UL/DL/side link allocations and reference signals within its resources. An example of such a self-contained subframe in TDD is illustrated in FIG. 13. The Guard period GP enables a switch from DL to UL transmission and the A/N for the DL grant occurs within the duration of the subframe.

Figure 14:
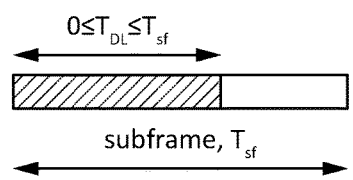
FIG. 14 illustrates an example unified design for TDD and FDD using certain subframes as building blocks.
Figure 14:
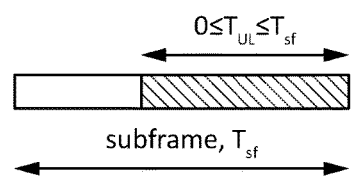
Figure 14:
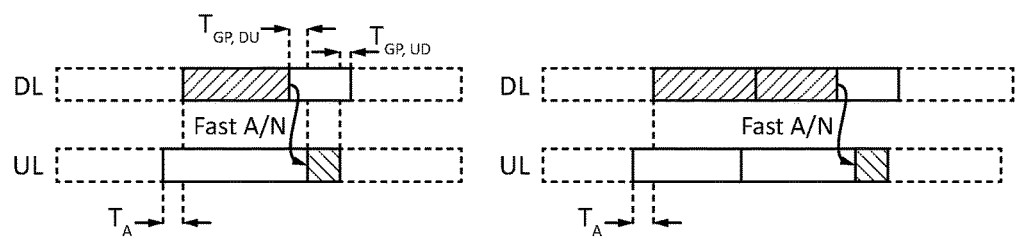
Figure 14:
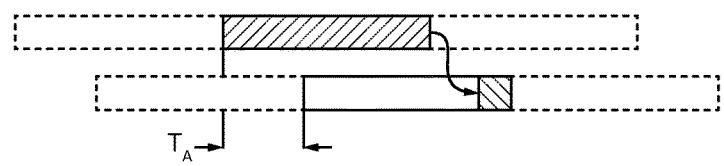
Figure 15:
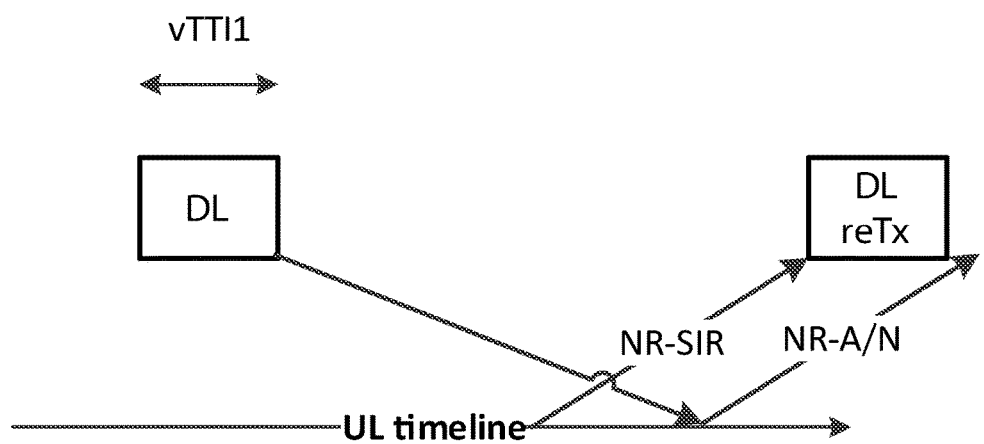
FIG. 15 illustrates an example of reduced latency with SIR compared to A/N.

A unified design philosophy for TDD and FDD is also having considerable support in the standardization process. A basic building block may be defined for DL and UL subframes and TDD and FDD configurations are derived from those building blocks. For example, the UL and DL building blocks may be defined as shown in FIG. 14. FIG. 15 illustrates an example of reduced latency with SIR compared to A/N.

For URLL devices which target low latency, HARQ retransmissions may not be practical due to the latency of the FEC decoder. Companies are proposing to use some form of soft information indicating reliability of successfully decoding the codeword from intermediate states of the decoder. See 3GPP R1-165363 On HARQ functionality for 5G, Nokia, May 2016. Information that can be generated at an intermediary stage from the FEC decoder may be referred to as SIR (soft information on reliability). SIR can be interpreted as a form soft A/N (non-binary) with information level of reliability of A/N and the corresponding best fit for the redundancy version in the retransmission. Shows an example where a retransmission can be triggered with less latency by the SIR than with A/N.

For example, for a turbo decoder, SIR may be sent to the eNB after a couple of iterations of the decoder which may ideally terminate only after 8 iterations. The SIR could be a non-binary metric derived from the log-likelihood ratios at the output of the intermediate iteration and would indicate the most likely outcome of the full decoding process and the best redundancy version for retransmission if the likelihood of failing is high. Because the latency through the intermediate stages is low, retransmission may be possible within the latency constraints for URLL devices.

In RAN1, many companies are considering the concept of beamforming as many PHY channels as possible in order to improve capacity and coverage. See 3GPP R1-164014 Discussion on RS for beamformed access, Samsung, May 2016. Highly directional beamforming based communications requires the eNB and UE need to be aligned in the right direction to obtain maximum gain. eNB for NR might use a hybrid beamforming combining analogue beamforming and digital pre-coding in which the eNB sends reference signal with certain beams that are pre-defined according to antenna patterns created by changing beamforming weight. UE measures quality of the reference signal from each direction. UE can select the best beam via measured quality and feedback the beam index to eNB.

Figure 16:
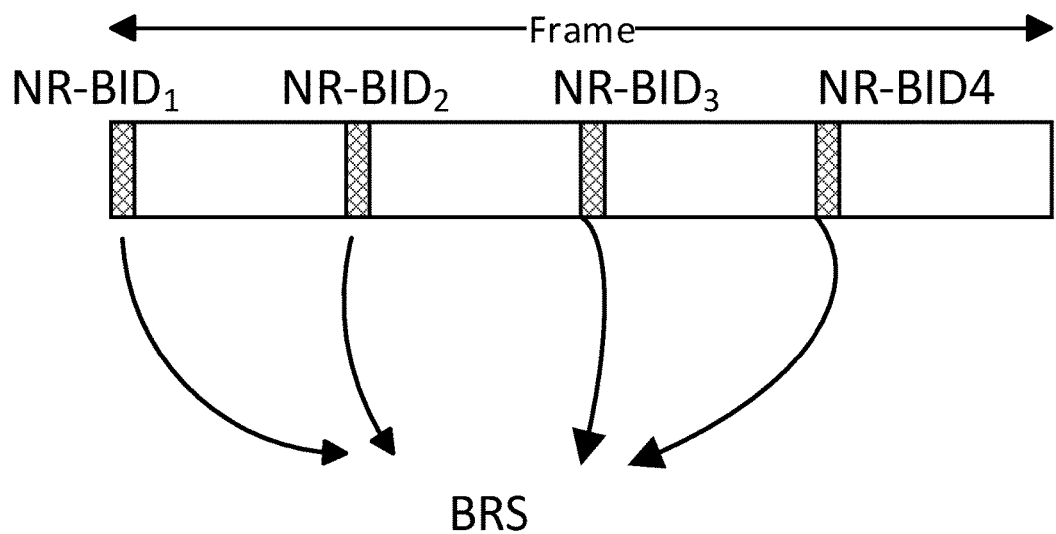
FIG. 16 illustrates an example of beam reference signals corresponding to different BIDs in a frame.

A beam measurement reference signal may be transmitted from eNB periodically as shown in FIG. 16. Here the eNB transmits multiple beam measurement reference signals (BRS) in a frame. Each BRS signalled corresponds to a different beam in the spatial domain. For example, BRS may be referenced by a beam index (NR-BID). The UE measures the signal quality for each beam using the BRS and transmits one or more NR-BIDs and their corresponding channel quality information.

Figure 17:
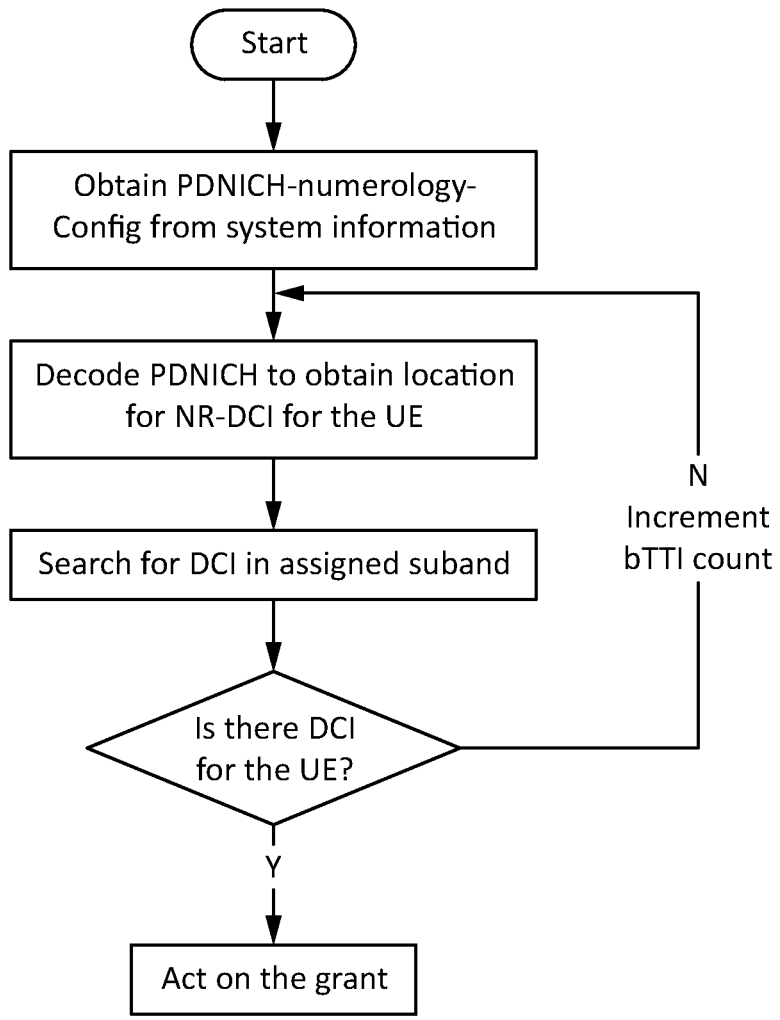
FIG. 17 illustrates an example UE method for obtaining NR-DCI through PDNICH.

The numerology allocation for a UE may be indicated through a PDNICH (Physical Downlink Numerology Indication Channel). The PDNICH may dynamically update the numerology; so the UE monitors this channel every TTI. The PDNICH may further indicate the location of the NR-DCI which would carry the grants and power control commands for the UE. An example of the UE method using PDNICH is shown in FIG. 17 Here PDNICH-Numerology-Config indicates the numerology that PDNICH is transmitted on in the network and may be obtained through system information such as the MIB.

Full-Dimension (FD) MIMO, a system in which a base station with two-dimensional antenna array supports multi-user joint elevation and azimuth beamforming, has been an active area of research and standardization in LTE. This may result in higher cell capacity compared to conventional systems discussed in 3GPP release 12. Recent studies have shown that with FD-MIMO techniques, LTE systems can achieve 3-5× performance gain in both cell capacity as well as cell edge throughput.

Release 13 study item, "Study on Elevation Beamforming/Full-Dimension (FD) MIMO for LTE," was completed in December 2015. The main purpose of the release 13 study item was to identify key issues in supporting up to 64 transmit antenna elements placed in the form of a two-dimensional antenna array. Some features presented in technical report TR 36.891 of this study item have been standardized in release 13. Standardization of systems supporting up to 16 antenna ports is an initial target for release 13 and standardization of systems supporting more than 16 antenna ports are under discussion in the approved release 14 work item, "Enhancements on FD-MIMO for LTE."

In the LTE, the scheduler can decide to change the frequency resources allocation for each user, following channel-aware criteria. Channel sounding is a technique that evaluates the radio environment for wireless communication, especially MIMO systems. In this technique, the User Equipment (UE) may transmit a sounding waveform on the uplink and the eNB may estimate the uplink channel quality over a wider bandwidth. The eNB may use this information for uplink frequency selective scheduling. In addition, UL Sounding Reference Signals (SRS) may be used by the base station for CSI estimation for supporting uplink channel-dependent scheduling and link adaptation. SRS may also be used by the base station to obtain CSI estimation for DL in the case of channel reciprocity.

There are 2 types of SRS configurations defined in LTE: Periodic SRS transmission and Aperiodic SRS transmission.

Periodic SRS transmissions may be based on UE specific SRS configurations. Periodic SRS transmission is called trigger type 0 SRS transmission and may be configured by RRC signaling. After receiving an RRC Connection Reconfiguration message with UE specific SRS configuration, and if the parameter duration set to FALSE, the UE may transmit SRS only once. This is called Single SRS transmission. If the parameter duration is set to be TRUE, then the UE may transmit Periodic SRS indefinitely until disabled.

Aperiodic SRS transmission may be based on UE specific SRS configurations. Aperiodic SRS transmission is called 'trigger type 1' SRS transmission, and is configured by RRC but triggered by DCI.

LTE periodic SRS may be configured using several parameters. srs-ConfigIndex defines SRS periodicity and an offset. The periodicity may range from 2 ms to 320 ms. srs-Bandwidth defines the bandwidth that needs to be used while transmitting SRS in a subframe. srs-HoppingBandwidth is defined for the purpose of frequency hopping of SRS. If frequency hopping of the SRS is enabled, then srs-HoppingBandwidth is smaller than srs-Bandwidth. freqDomainPosition defines the starting position of the SRS in the frequency domain. By varying from 1 to 8, cyclicShift generates up to 8 different SRS which are orthogonal to each other. The eNodeB can configure SRS for up to 8 UEs in the same subframe and frequency resources but using different cyclic shifts. The cyclicShift multiplexed signals may need to have the same bandwidth in order to maintain the orthogonality. transmissionComb may be used where, e.g., the SRS may be transmitted in every alternate (every even or every odd) subcarrier in the assigned SRS bandwidth. transmissionComb takes values 0 or 1 which informs whether to transmit SRS in every even or odd subcarrier in the assigned SRS bandwidth. By doing this, the eNodeB can multiplex two UEs with same cyclicShift, frequency and time resources but different transmissionComb (0 or 1).

In RRC connection setup and RRC connection reconfiguration, SRS may be configured in information elements as shown in Tables 4.

TABLE 4

Example SRS Configuration

| Ln | Code | |
|---|---|---|
| 1 | SoundingsRS-UL-ConfigCommon :: = Choice{ | |
| 2 | release | NULL , |
| 3 | setup | SEQUENCE { |
| 4 | srs-BandwidthConfig | ENUMERATED { bw0, bw1 ... bw7} |
| 5 | srs-SubFrameConfig | ENUMERATED { sc0, sc1 ... sc15} |
| 6 | ackNackSRS-SimulTrans | BOOLEAN , |
| 7 | srs-MaxUpPts | ENUMERATED {true} OPT'L - Cond TDD |
| 8 | } | |
| 9 | } | |
| 10 | SoundingsRS-UL-ConfigDedicated :: = Choice{ | |
| 11 | release | NULL , |
| 12 | setup | SEQUENCE { |
| 13 | srs-Bandwidth | ENUMERATED { bw0, bw1, bw2, bw3} , |
| 14 | srs-Hopping Bandwidth | ENUMERATED { hbw0, hbw1 ... hbw3}, |
| 15 | freqDomainPosition | INTEGER (0 .. 23) , |
| 16 | duration | BOOLEAN , |
| 17 | srs-ConfigIndex | INTEGER (0 .. 1023) , |
| 18 | transmissionCoeb | INTEGER (0 .. 1) , |
| 19 | cyclicShift | ENUMERATED { cs0, cs1 ... cs7} |
| 20 | } | |
| 21 | } | |

Table 5 contains commentaries on selected variables used in the example of Table 4.

TABLE 5

Comments on Varibles used in Table 4

| Comment | Item |
|---|---|
| $C_{SRS}$ | srs-BandwidthConfig |
| srsSubframeConfiguration | srs-SubFrameConfig |
| Simultaneous-AN-and-SRS (36.213 8.2, Short PUCCH vs Normal PUCCH) | ackNackSRS-SimulTrans srs-MaxUpPts |
| $B_{SRS}$ | srs-Bandwidth |

TABLE 5-continued

Comments on Varibles used in Table 4

| Comment | Item |
|---|---|
| $b_{hop}$ | srs-Hopping Bandwidth |
| $n_{RRc}$ | freqDomainPosition |
| $I_{SRS}$ | duration |
| $k_{TC}$ | srs-ConfigIndex |
| $k_{TC}$ | transmissionCoeb |
| n_SRS | cyclicShift |

The sounding reference signal will be transmitted in the last symbol of the uplink subframe. In addition to the UE specific SRS configuration, cell specific SRS configuration defines the subframes that can contain SRS transmissions as well as the set of SRS bandwidths available in the cell. Depending on the configuration set by the signaling message (e.g., SIB2, RRC Connection Setup, RRC Connection Reconfiguration, etc.), the UE can transmit every two subframes at the most and every 32 frames (320 subframes) at the least (the 10 bit signaling parameter srs-ConfigIndex tells the UE of the periodicity of SRS transmission, the period being 2, 5, 10, 20, 40, 80, 160, or 320 ms). It may also be possible that the UE does not transmit SRS at all.

LTE aperiodic SRS may be configured by a number of parameters. For example, Aperiodic SRS transmission may be a single shot SRS transmission based on a trigger. Aperiodic SRS may be configured by RRC but triggered by an 'SRS request' flag in PDCCH DCI Formats 0/4/1A (for FDD and TDD) and DCI Formats 2B/2C for TDD alone. Before triggering Aperiodic SRS using DCI Format x (e.g., x=0/4/1A), a single set of parameters srs-ConfigApDCI-Formatx may need to be configured by RRC. For Aperiodic SRS trigger using DCI Formats 0/1A/2B/2C, 1-bit SRS request field may be used whereas DCI Format 4 carries 2-bit SRS request field to indicate which of the three configured parameters is set to be used. The frequency domain behavior of Aperiodic SRS may be the same as Periodic SRS.

LTE SRS map to physical resources both in time and frequency. SRS uses the same sequence as uplink Demodulation Reference Signals (DMRS). Since the cyclic shift versions of the Zadoff-Chu sequence are orthogonal, several UEs (up to 8) can transmit using different cyclic shifts on the same physical radio resource. In practice, it cannot use all of 8 cyclic shifts because 1 cyclic shift has to be reserved for noise estimation.

There are two types of SRS transmission: Wideband SRS and Narrowband SRS. Using Wideband SRS, the UE can sound in the entire bandwidth of interest using single SRS transmission. However, the UE at the cell edge may not have sufficient power to sound over a wide bandwidth. In such a case, the eNodeB may configure the UE to use frequency hopping for SRS. If the configured srs-Bandwidth is set equal to the srs-HoppingBandwidth parameter, then the frequency hopping (FH) mode is not enabled. Narrowband SRS allows the UE to do Frequency Hopping (FH) between transmissions. Narrowband SRS is enabled when srs-HoppingBandwidth is smaller than srs-Bandwidth.

The SRS will be transmitted at the last symbol of the UL slot with full system band area and may be transmitted by a certain interval. If multiple UEs have the same SRS transmission cycle (interval), eNB can configure each of UEs to transmit SRS in hopping mode with a different hopping schedule to reduce SRS interference.

When SRS transmission is configured in wideband mode, one single transmission of the SRS covers the bandwidth of interest. The channel quality estimate is obtained within a single SC-FDMA symbol. When SRS transmission is configured as FH mode (narrowband SRS), the SRS transmission is split into a series of narrowband transmissions that will cover the whole bandwidth region of interest.

Sounding reference signals may be generated using a base sequence denoted by $r_{u,v}^{SRS}(n)$. This base sequence, used expressly to denote the SRS sequence, is defined by the following equation.

$$r_{u,v}^{SRS}(n) = r_{u,v}^{(\alpha)}(n),$$

where $\alpha$ is the cyclic-shift for the CAZAC sequence. It is desirable for the SRS sequences to have small power variations in time and frequency, resulting in high power amplifier efficiency and comparable channel estimation quality for all frequency components. Zadoff-Chu sequences are good candidates as they exhibit constant power in time and frequency. The sounding reference signals may be defined by a cyclic shift ($\alpha$) of a base sequence (r). The base sequence r is represented in the following equation:

$$r_{u,v}^{(\alpha)}(n) = e^{j\alpha n} r_{u,v}(n).$$

The preceding equation contains the following variables: $n=0, \ldots, M_{SC}^{RS}-1$ where $M_{SC}^{RS}$ is the length of the reference signal sequence, $U=0, \ldots, 29$ is the base sequence group number, and $V=0, 1$ is the sequence number within the group and only applies to reference signals of length greater than 6 resource blocks.

A cyclic shift in the time domain (post IFFT in the OFDM modulation) is equivalent to a phase rotation in the frequency domain (pre-IFFT in the OFDM modulation). The base sequence may be cyclic shifted to increase the total number of available sequences. The orthogonality can be exploited to transmit SRS at the same time, using the same frequency resources without mutual interference. Generally, SRS generated from different base sequences will not be orthogonal. However, they will present low cross-correlation properties.

Similar to the uplink demodulation reference signals for the PUCCH and PUSCH, the SRS may be time multiplexed. However, they may be mapped to every second subcarrier in the last symbol of a subframe, creating a comb-like pattern.

In LTE, the UE may first derive the cell specific SRS subframe based on the srs-SubframeConfig in SIB2. These subframe(s) are common to all the UEs in the cell. Different UEs may be configured with different UE specific SRS configurations, based on which each UE derives UE specific SRS subframes. The UE may transmit SRS only if the UE specific SRS subframe coincides with the Cell specific SRS subframe.

For example, if srs-SubframeConfig=sc8 and srs-ConfigIndex=0, from Table 5.5.3.3-1 in TS 36.211, subframes 2, 3, 7, and 8 are cell-specific subframes. From srs-ConfigIndex, UE specific subframes are 0, 2, 4, 6, and 8. Thus, the UE transmits SRS in subframes 2 and 8.

In LTE, when a SRS is being transmitted by a UE in a subframe, it may overlap in frequency with PUSCH being transmitted by another UE. When this occurs, none of the UEs in the cell transmits PUSCH in the last OFDM symbol of a cell specific SRS subframe. Since all UEs are aware of cell specific SRS configurations, they will not transmit PUSCH in the last OFDM symbol of the cell specific SRS subframe. A number of rules apply when LTE SRS collide with PUCCH transmission. For example, a UE does not transmit SRS whenever SRS and CQI transmissions happen to coincide in the same subframe. A UE shall not transmit SRS whenever SRS transmission and PUCCH transmission carrying HARQ-ACK and/or Scheduling Request happen to coincide in the same subframe if the parameter ackNack-SRS-SimultaneousTransmission in SIB2 is set to FALSE. A UE shall transmit SRS whenever SRS transmission and PUCCH transmission carrying HARQ-ACK and/or Scheduling Request using shortened PUCCH format happens to coincide in the same subframe if the parameter ackNack-SRS-SimultaneousTransmission is TRUE. The UE shall use shortened PUCCH format in a cell specific SRS subframe even if the UE does not transmit SRS in that subframe.

Figure 18:
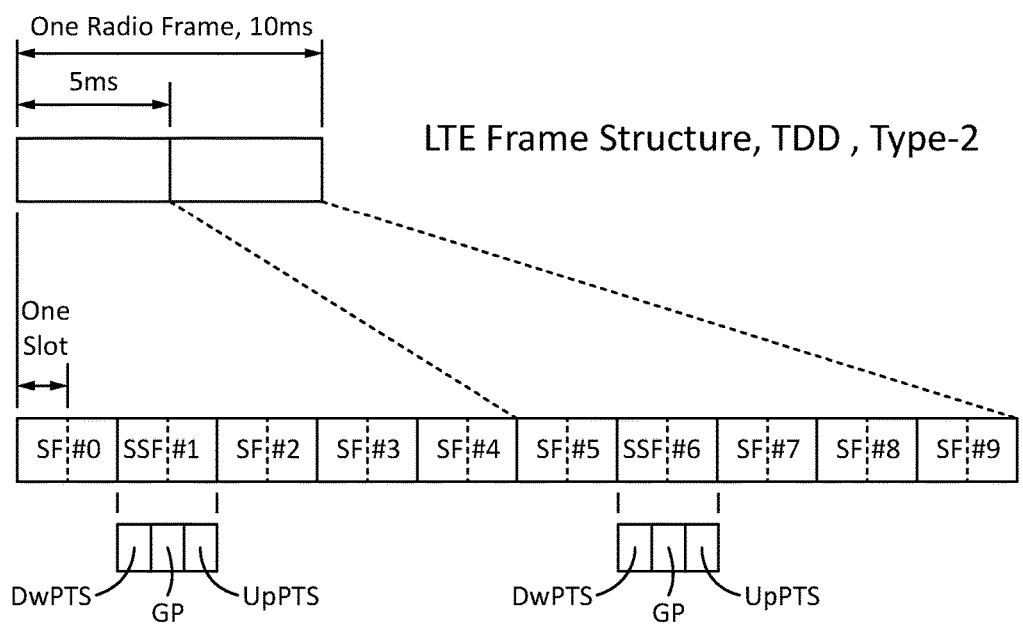
FIG. 18 illustrates an example LTE TDD UpPTS frame structure.

In TDD, SRS can be transmitted in uplink as well as in special subframes (UpPTS). Based on the special subframe configuration (Table 4.2-1 from 36.211), the UpPTS length varies (one or two OFDM symbols). When one SC-FDMA symbol exists in UpPTS, it can be used for SRS transmission. Alternatively, when two SC-FDMA symbols exist in UpPTS, both can be used for SRS transmission and both can be assigned to the same UE. In UpPTS, whenever a SRS transmission instance overlaps with the PRACH region for preamble format 4, the UE shall not transmit SRS. The LTE TDD UpPTS frame structure for UpPTS is shown in FIG. 18.

In the approved release 14 work item "Enhancements on FD-MIMO for LTE," discussion is undergoing to further increase the number of transmit antennas at the base station. Release 14 is targeting to support up to 32 antenna ports. Release 14 will also support both beamformed CSI-RS and non-pre-coded CSI-RS and will further improve the two schemes to support more antenna ports.

Following this, for 5G systems, companies proposed to have a massive number of antennas at the base station to further increase the cell capacity by 10× performance gain. The eNB will use antenna arrays with hundreds or even over a thousand antennas simultaneously serving tens of UEs in the same time-frequency resource. The wisdom behind massive MIMO systems is that, the number of the transmit antennas goes to infinity (very large), cross-correlation of two random channel realizations goes to zero and there will be no multi-user interference resulting from co-scheduling and multiple access. This will greatly improve the system throughput, and moreover, it will be energy-efficient, secure and robust and will use spectrum efficiently, which makes massive 3D MIMO a key enabler for 5G cellular systems.

Currently, 3GPP standardization efforts are underway to define the New Radio (NR) frame structure. Consensus is building along the lines of having 'self-contained' frame structure for NR. Broadly, a self-contained frame structure is understood to contain the control information for a grant, the data and it's A/N acknowledgement all within a frame and is expected to have configurable UL/DL/side link allocations and reference signals within its resources. Currently, 3GPP standardization agrees that a time interval X can contain one or more of a DL transmission part, a guard, and a UL transmission part Furthermore, the DL transmission region of time interval X to contain downlink control information and/or downlink data transmissions and/or reference signals may be supported. The UL transmission region of time interval X to contain uplink control information and/or uplink data transmissions and/or reference signals may also be supported.

Figure 19:
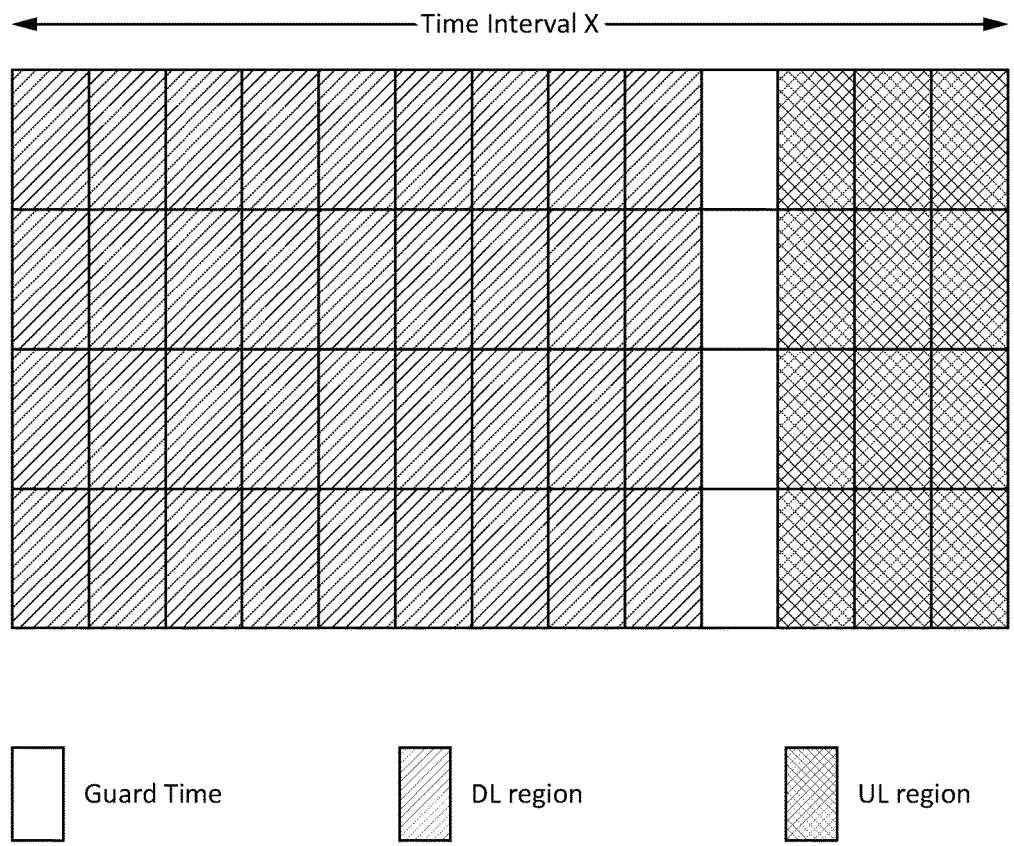
FIG. 19 illustrates an example NR self-contained frame structure.

In FIG. 19, an example of a NR self-contained frame structure is depicted. The transmission interval of a self-contained frame structure is defined as X. The self-contained frame structure has three major portions, i.e., DL region, guard time and UL region.

3GPP TR 38.913 defines scenarios and requirements for next generation access technologies. The following are excerpts of the Key Performance Indicators (KPI) section of 3GPP TR 38.913 that impose new requirements that are relevant to the NR MIMO method. The Key Performance Indicators (KPIs) for eMBB, URLLC and mMTC devices are summarized in Table 6.

TABLE 6

KPIs for eMBB, URLLC and mMTC Devices

| Device | KPI | Requirement |
|--------|-----|-------------|
| eMBB | Peak data rate | 20 Gbps for downlink and 10 Gbps for uplink |
|  | Mobility interruption time | 0 ms for intra-system mobility |
|  | Data Plane Latency | 4 ms for UL, and 4 ms for DL |
| URLLC | Control Plane Latency | 10 ms |
|  | Data Plane Latency | 0.5 ms |
|  | Reliability | $1-10^{-5}$ within 1 ms. |
| mMTC | Coverage | 164 dB |
|  | UE Battery Life | 15 years |
|  | Connection Density | $10^6$ devices/km$^2$ |

3GPP TR 22.863 identifies the use cases and consolidates requirements for the following families for the eMBB scenario: Higher Data Rates, Higher Density, Deployment and Coverage, and Higher User Mobility.

Currently, 3GPP standardization efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming this larger path-loss. In addition to this larger path-loss, the higher frequencies are subject to an unfavourable scattering environment due to blockage caused by poor diffraction. Therefore, MIMO/beamforming is essential in guaranteeing sufficient signal level at the receiver end.

Relying solely on digital pre-coding to compensate for the additional path-loss in higher frequencies seems not enough to provide similar coverage as below 6 GHz. Thus, the use of analog beamforming for achieving additional gain can be an alternative in conjunction with digital pre-coding. The sufficiently narrow beam should be formed with lots of antenna elements, which is likely to be quite different from the one assumed for the LTE evaluations. For large beamforming gain, the beam-width correspondingly tends to get reduced, and hence the coverage beam with the large directional antenna gain cannot cover the whole horizontal sector area, specifically in 3-sector configuration.

Based on these observations, multiple transmissions in time domain with narrow coverage beams steered to cover different serving areas may be necessary. Inherently, the analog beam of a subarray can be steered toward a single direction on each OFDM symbol, and hence the number of subarrays determines the number of beam directions and the corresponding coverage on each OFDM symbol. In some literature, the provision of multiple narrow coverage beams for this purpose has been called "beam sweeping." For analog and hybrid beamforming, the beam sweeping seems to be essential to provide the basic coverage in NR. Also, for analog and hybrid beamforming with massive MIMO, multiple transmissions in time domain with narrow coverage beams steered to cover different serving areas seems to be essential to cover the whole coverage area within a serving cell in NR.

With the foregoing as background, solutions to two problems that will be faced by NR systems are described hereinafter.

Figure 20:
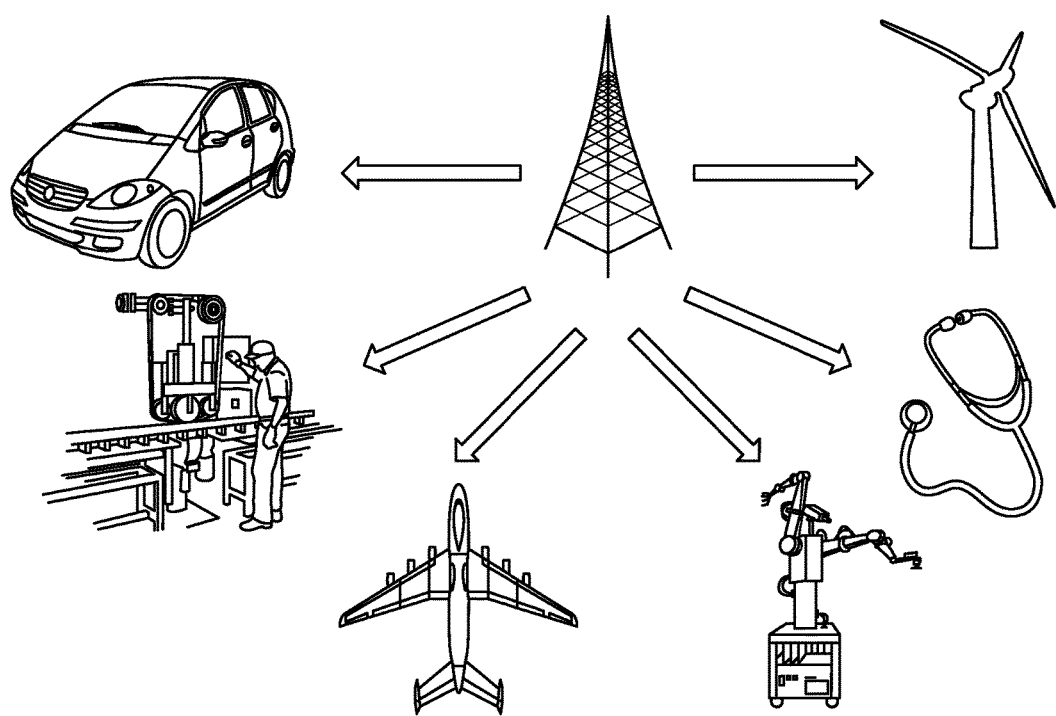
FIG. 20 illustrates some potential applications requiring low latency in 5G.

It is projected that 5G will support URLLC applications such smart vehicle control, drone control, robotic surgery and MTC applications like industry automation, etc. that require new solutions to address the demands for lower latency. FIG. 20 captures projected applications requiring low latency in UL and DL in a 5G network.

Figure 21:
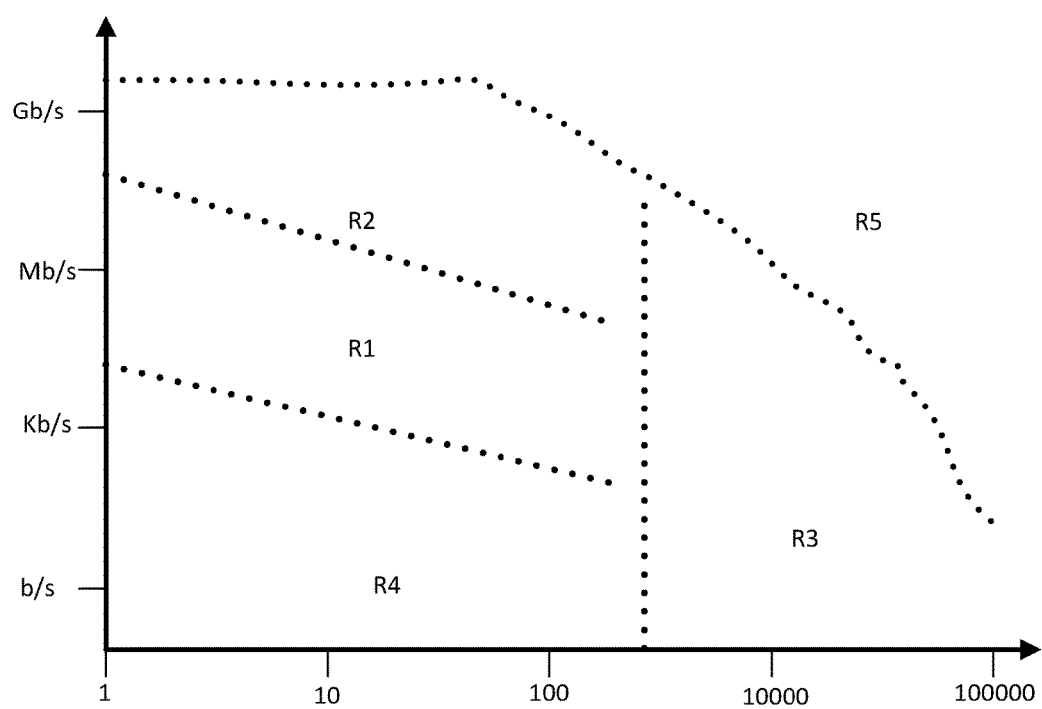
FIG. 21 illustrates example MTC and URLLC scenarios, comparing new latency requirements relative to legacy system requirements.
Figure 22:
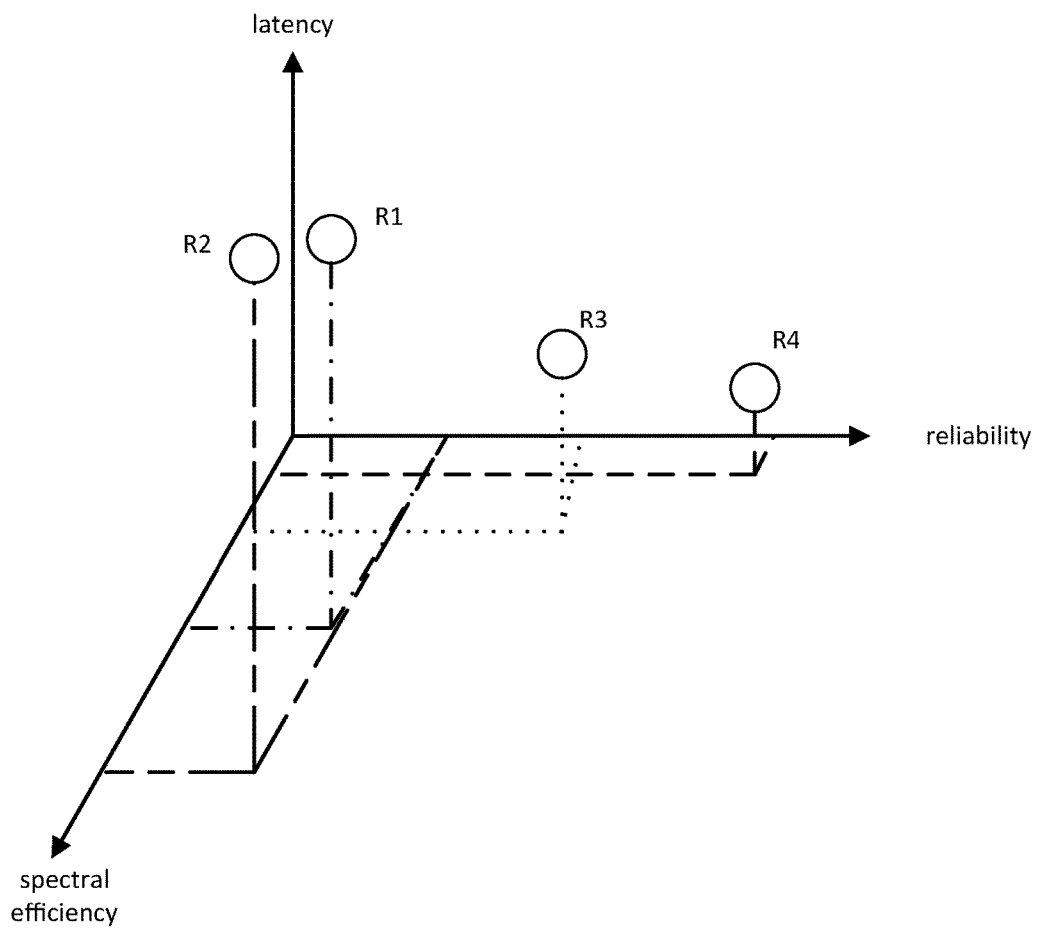
FIG. 22 illustrates example MTC and URLLC scenarios, comparing latency reliability, and spectral efficiency.

FIGS. 21 and 22 show projections of various applications with different deployment density and latency requirements in 5G.

The solutions in LTE are currently inadequate to address the scenarios that low latency requirements that 5G seeks to address. Also lacking are solutions to seamlessly multiplex applications with different numerologies simultaneously.

Figure 23:
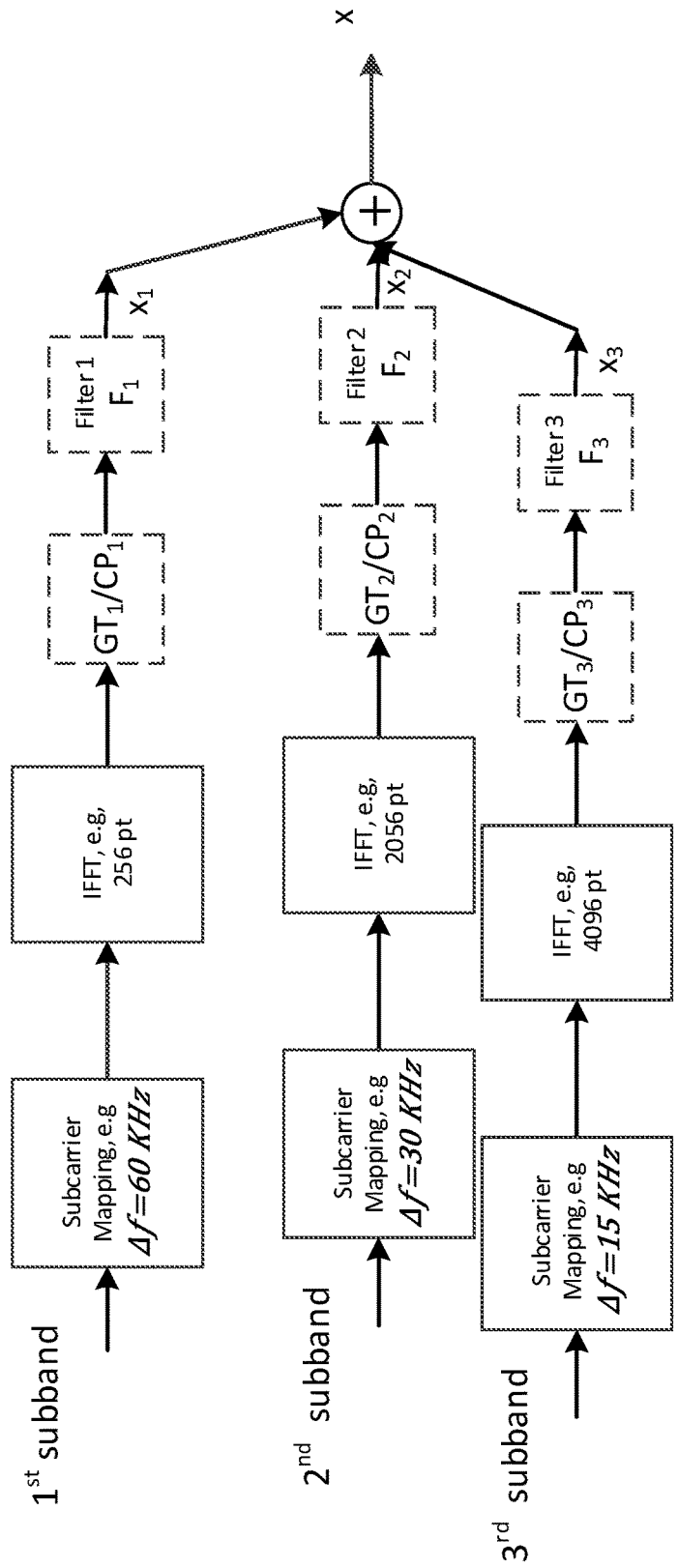
FIG. 23 illustrates an exemplary configuration of a 5G transmitter supporting multiple TTI numerologies simultaneously.

NR is expected to support multiple numerologies of TTIs, e.g., CP length, subcarrier spacing (or equivalently symbol duration) and the number of symbols in the TTI. Multiple numerologies may be multiplexed on to the same time-frequency resource grid. An exemplary configuration of a NR transmitter multiplexing different numerologies is depicted in FIG. 23. The numerologies are described in Table 7.

TABLE 7

Exemplary numerologies supported in 5 G

|  | 5 G numerology case 1 | 5 G numerology case 2 | 5 G numerology case 3 |
| --- | --- | --- | --- |
| Subcarrier spacing | 15 KHz | 30 KHz | 60 KHz |
| $T_{guard}$ | 4.7 μs | 2.35 μs | 1.175 μs |
| Symbol duration (including $T_{guard}$) | 71.37 μs | 35.68 μs | 17.57 μs |

Figure 24:
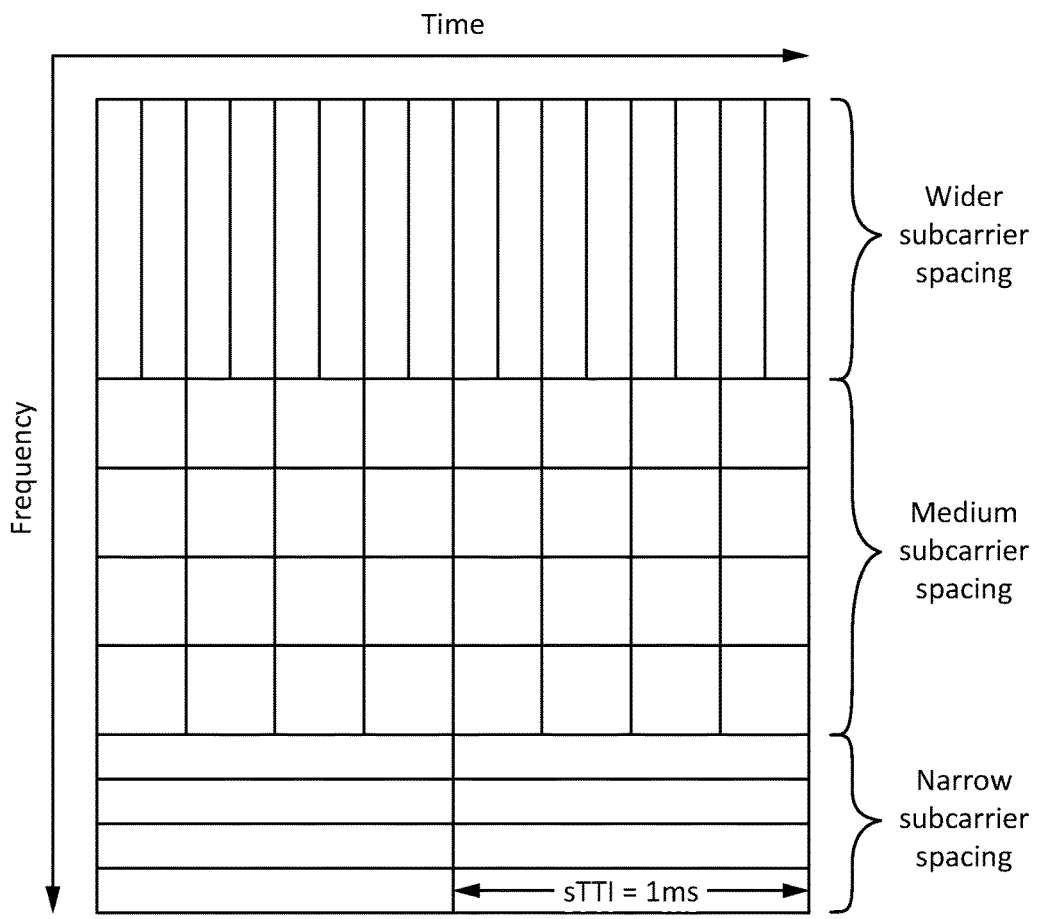
FIG. 24 illustrates examples of multiple numerologies multiplexed in a time-frequency resource grid.

FIG. 24 shows an exemplary configuration of multiplexed numerologies for 5G belonging to numerologies of case-1, case-2 and case-3.

In LTE, PUCCH carries the UCI in the outer bands of the available bandwidth while PUSCH carries piggybacked UCI. But for NR, currently no solution for defining the numerology and location of the NR-UCI resources exists. So the problem of how and where NR-UCI resources can be assigned needs to be addressed.

The UCI for low latency applications is required to be transmitted and received at much lower latencies for NR than LTE can support. LTE has 8 ms latency between a transmission and its retransmission in response to its A/N. However, URLL applications in NR need user plane latency of 1 ms. Similarly applications that require faster CQI updates such as those in high Doppler scenarios also require faster response times.

Also UEs have PAPR constraints. Especially at the cell edge where they are power limited, the best form of UL signaling is a single carrier waveform such as SC-FDMA in LTE. In addition, power limited UEs require more resources in time than one that it not power-limited. So it may not have sufficient UL coverage with short signaling durations, implying that design of NR with very short TTI poses new challenges in terms of UL coverage; so NR should provide flexibility in assigning sufficient number of resources in time to provide sufficient UL coverage. So solutions for NR-UCI should take power constraints and UL coverage into account in their designs.

To address these and other needs, UL control information resources may be assigned semi-statically or dynamically within a "container." Different types of UL control information for different UEs may be multiplexed within a container. Frequency hopping of the UL control information resources may be used to address frequency diversity. UL reference signals may be used within a container.

Similarly, resources may be dedicated to carry UL control information for all supported numerologies. The dedicated resources may be numerology specific or common across all numerologies.

In 4G LTE/LTE-A system, SRS only supports a single numerology. In NR systems, multiple use cases with their own numerologies, different deployment scenarios, and flexible interval structures will be supported. Hence, the design of SRS in an NR system needs to support multiple numerologies with scalable subcarrier spacing, flexible frame/subframe structure and/or different deployment scenarios. FIG. 24 depicts an example of three different numerologies being transmitted in a NR cell.

In order to address this problem, a number of solutions are proposed herein. For example, SRS resources can be either dynamically or semistatically configured for each supported numerology independently. The wideband and narrowband SRS sequence length is adaptive to each supported numerology, the configuration of wideband SRS is signaled via higher layer signaling (for example, RRC signaling) for each supported numerology. The time domain location of SRS symbols are not limited to the last symbol of a time interval X (or equivalent time unit of a TTI/subframe) and can be adaptive based on either aperiodic or periodic transmission. Time, frequency, and orthogonal resources for SRS can be allocated by either using DL control channel or RRC configuration.

Alternatively or additionally, for a self-contained frame structure, the number of transmitted SRS symbols and allocated frequency bandwidth can be dynamically or semi-statically configured by either using DL control channel or RRC configuration The transmission of SRS in a self-contained frame structure (e.g. time interval X) can be triggered by the DL control channel in the same or previous time interval X.

In the current 3GPP LTE system, the SRS is not pre-coded or applied with beamforming. For NR systems, at least at higher frequency (mmW band), beamforming will be used to provide sufficient cell coverage. Beamforming will impact coherent time and coherent bandwidth. Hence, an effective channel sounding method is desired to explore both coherent bandwidth and time in beamforming based NR systems.

To address this problem, a number of solutions are proposed herein. For example, a generalized method may be used which supports channel sounding with or without the full channel information knowledge. SRS may be pre-coded in FDD, TDD systems or in flexible/self-contain frame structure. The pre-coding weights for SRS can be based on codebook and/or non-codebook approach. Pre-coded SRS may be adaptive to UE antenna/port configuration. The UE antenna/port information can be configured by gNB/NR-node. The pre-coding configuration of SRS may be done either by RRC or DL control channel. Pre-coded SRS may be dynamically or semistatically configured by gNB/NR-node to support multiple numerologies.

Alternatively or additionally, NR-SRS may be used as UL demodulation RS (DM-RS). In other words, NR-SRS can serve both beam sounding and demodulation purposes and reduce the overhead of UL NR-DMRS.

Herein, the prefix NR- is used to indicate PHY channels useful in a New Radio design. Examples are given in Table 8.

TABLE 8

NR Acronyms

| | |
|---|---|
| NR-DCI | Downlink control information in NR |
| NR-A/N | A/N in NR |
| NR-BID | Beam Index in NR |
| NR-CQI | Channel Quality Indicator in NR |
| NR-DD | Downlink data in NR |
| NR-DRS | Reference signal in Downlink in NR (typically used for channel estimation) |
| NR-PMI | Pre-coder Matrix Index in NR |
| NR-RI | Rank indicator in NR |
| NR-URS | Reference signal in Uplink in NR (typically used for channel estimation) |
| NR-SIR | Soft information on Reliability in NR |
| NR-SR | Scheduling Request in NR |
| NR-UCI | Uplink control information in NR |
| NR-UD | Uplink data in NR |

The term Variable-TTI (vTTI) is used herein to denote TTIs of different durations. For example, $vTTI_1$ may be of 1 ms duration while $vTTI_2$ may be of 0.25 ms. The vTTI duration is the interval over which a transmission block may be transmitted. NR-UCI may signal one or more of the following or other parameters that effectively convey one or more of the following to the eNB.

TABLE 9

Example NR-UCI Parameters

| | |
|---|---|
| a. NR | b. A/N(s) in response to DL transmission(s) |
| c. One or more NR | d. BID reports |
| e. One or more NR | f. CQI reports |
| g. One or more NR | h. PMI reports |
| i. One or more NR | j. RI reports |
| k. One or more NR | l. SR |
| m. One or more NR | n. SIR (Soft information on reliability of successfully decoding the codeword) |

Aspects of NR-UCI signaling when multiple numerologies are supported simultaneously by a carrier may be addressed, for example, through NR-UCI in containers and NR-UCI in dedicated resources, or a combination thereof.

NR is considering a concept of the subframe wherein DL data, related reference signals and UL A/N are contained within a certain time period—this subframe structure has been loosely referred to as self-contained subframe. In LTE, the term "subframe" connotes as a specific duration (1 ms) and meaning in LTE. Herein, the term "subframe" is often used more generally.

Figure 25:
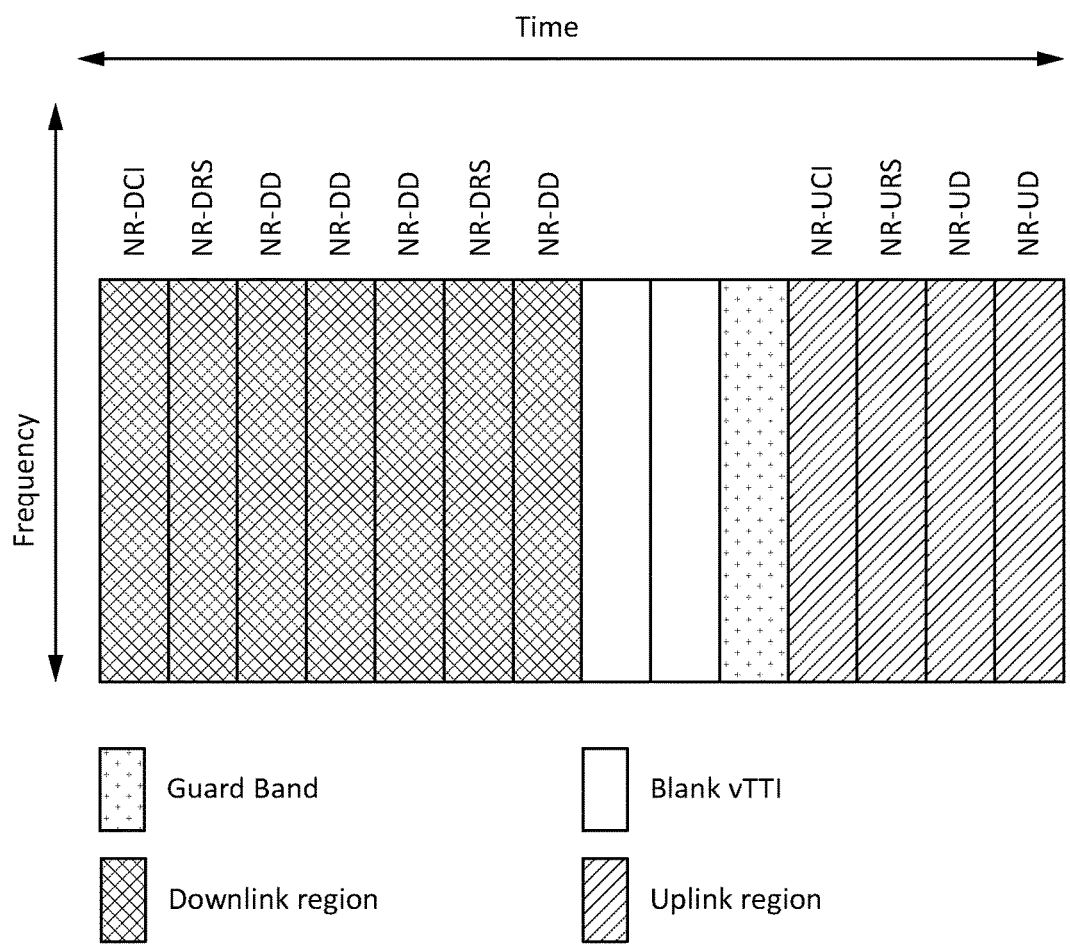
FIG. 25 shows exemplary numerologies in an NR cell.

Herein, the term "container" is often used to denote the time-frequency resource configuration within which a DL transmission, a UL transmission, or both a DL and a UL transmission occur, and carry one or more of data, control, reference signals and blank vTTIs. FIG. 25 shows an example of a container in TDD with NR-DCI in the leading symbol followed by NR-DD, blank vTTI of 2 symbols, a guard band and NR-UD, NR-UCI and NR-URS.

A container may be configured to contain a DL grant and its corresponding NR-A/N in the UL.

Table 10 lists example attributes that may be specified in the standards specification (static assignment) for NR or be configurable either semi-statically or dynamically to define the container.

TABLE 10

Example Container Attributes

| | |
|---|---|
| 1. | The time-frequency resource grid of the container |
| 2. | The resources for DL and UL portions within the container structure |
| 3. | The resources for data, different types of control and reference signals within the DL and UL resources |
| 4. | The number of vTTIs in the container |
| 5. | The numerology parameters (equivalent to the specification of subcarrier spacing, vTTI duration, CP duration, guard period in TDD) for the DL and UL transmissions in a container |
| 6. | The beam (NR-BID) for UL and DL transmission |
| 7. | Duration for which the container configuration would be valid or the time at which the container configuration may be updated. |

Once the structure of the container is defined, it may be assigned anywhere within the carrier.

Herein, the set of parameters from the above list that configure one or more containers may be referred to as configContainerSemiStatic and configContainerDynamic for the semi-static and dynamic cases respectively.

It has been agreed in 3GPP RAN1 (#85) that the latency between a DL data transmission and it's NR-A/N on the UL should be configurable semi-statically or dynamically but the details have not been discussed.

Figure 26:
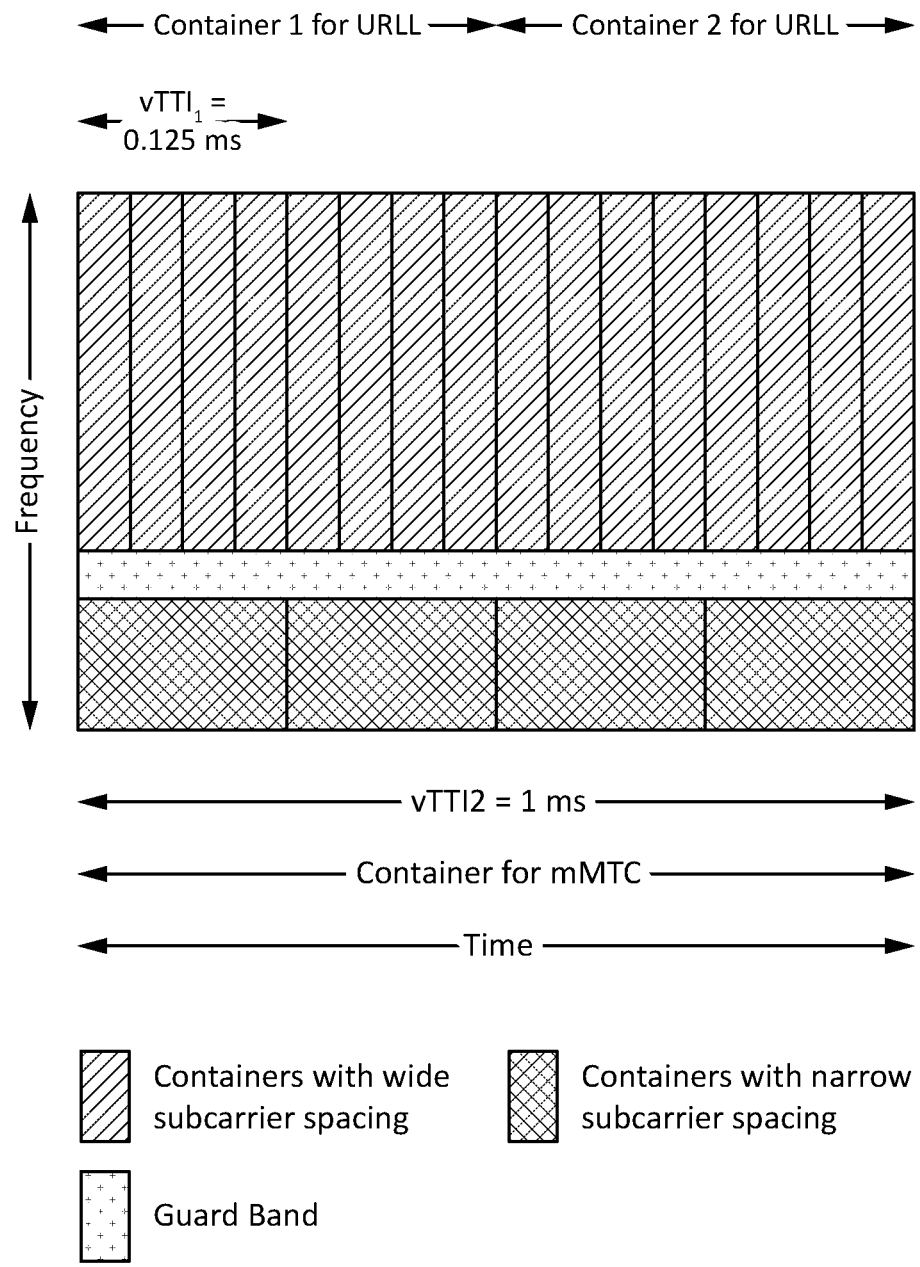
FIG. 26 shows an example of a container in TDD with regions for different signals.

A cell may support multiple containers simultaneously. One scenario where this solution is useful is when multiple network slices have to be supported with different numerology and latency requirements. For example as shown in FIG. 26 for an FDD system, URLL may use one container with short symbol duration, shorter vTTI and a large subcarrier spacing to enable low latency while mMTC may use another container configured with longer symbol duration, longer vTTI and smaller subcarrier spacing in order to operate at a lower sampling rate and have increased coverage. In this example, the container consists of multiple vTTIs.

Figure 27:
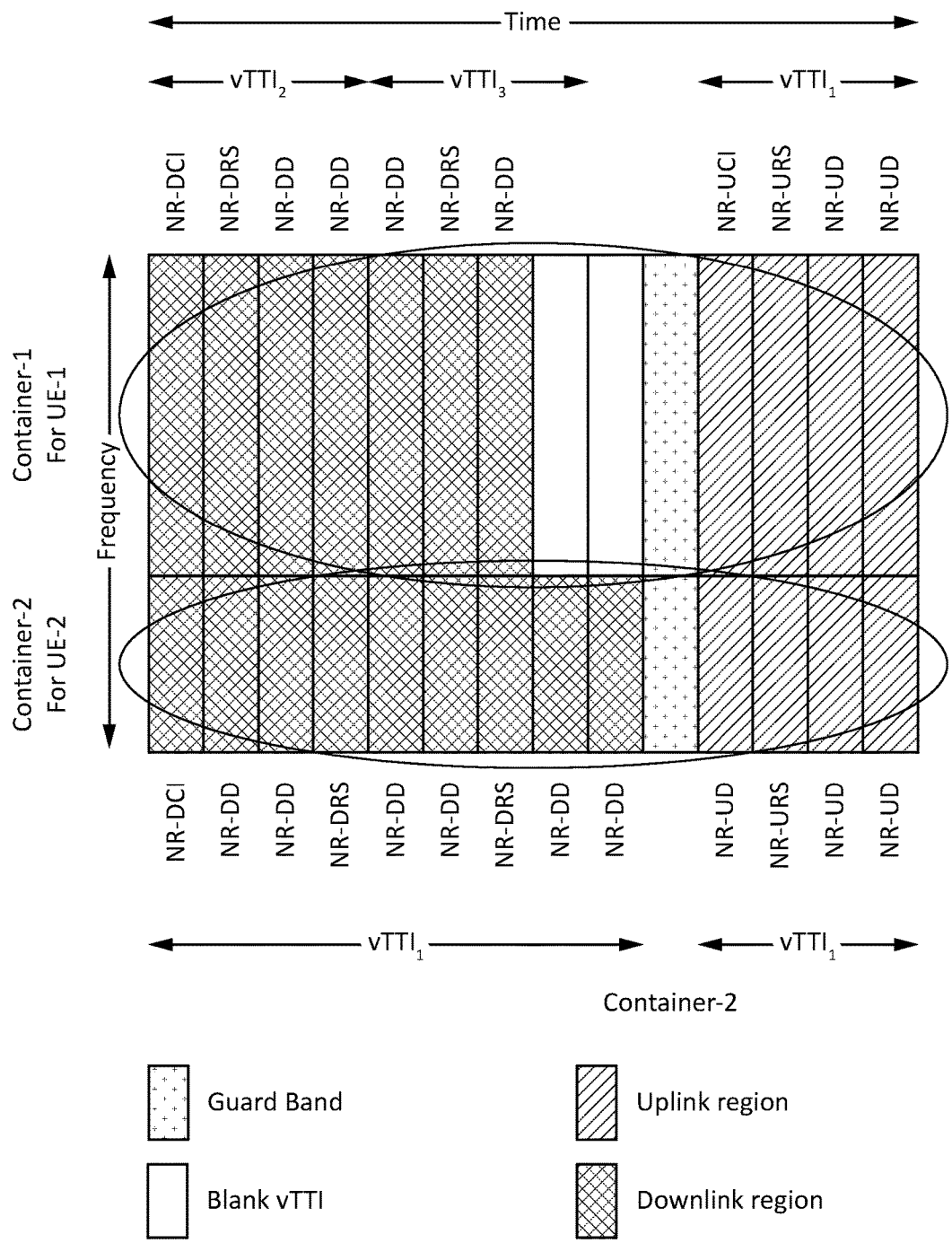
FIG. 27 shows an example of supporting multiple containers in a cell in FDD.

Another scenario where this solution is useful is when different UEs have different channel conditions. For example, each UE's containers can be configured to have more or less resources for reference signals depending on the channel quality and SNR. They can also be configured to have different number of resources for UL control signaling depending on the amount and type of control data to be transmitted. FIG. 27 shows an example wherein the two containers have the same numerology but have different amount of UL and DL resources, different number of NR-URS resources and different number of NR-UCI resources and different vTTI durations in UL and DL.

For semi-static configuration of containers, RRC and subsequent MAC CE updates may be used to set up the configContainerSemiStatic for on per-UE basis or for a network slice. For dynamic configuration of containers, NR-DCI may carry the configContainerDynamic. The RRC/MAC CE updates or NR-DCI—whichever is used to configure the containers' resources—may indicate the resources as an index into a pre-defined table of possible container configurations in order to minimize the signaling overhead.

Figure 28:
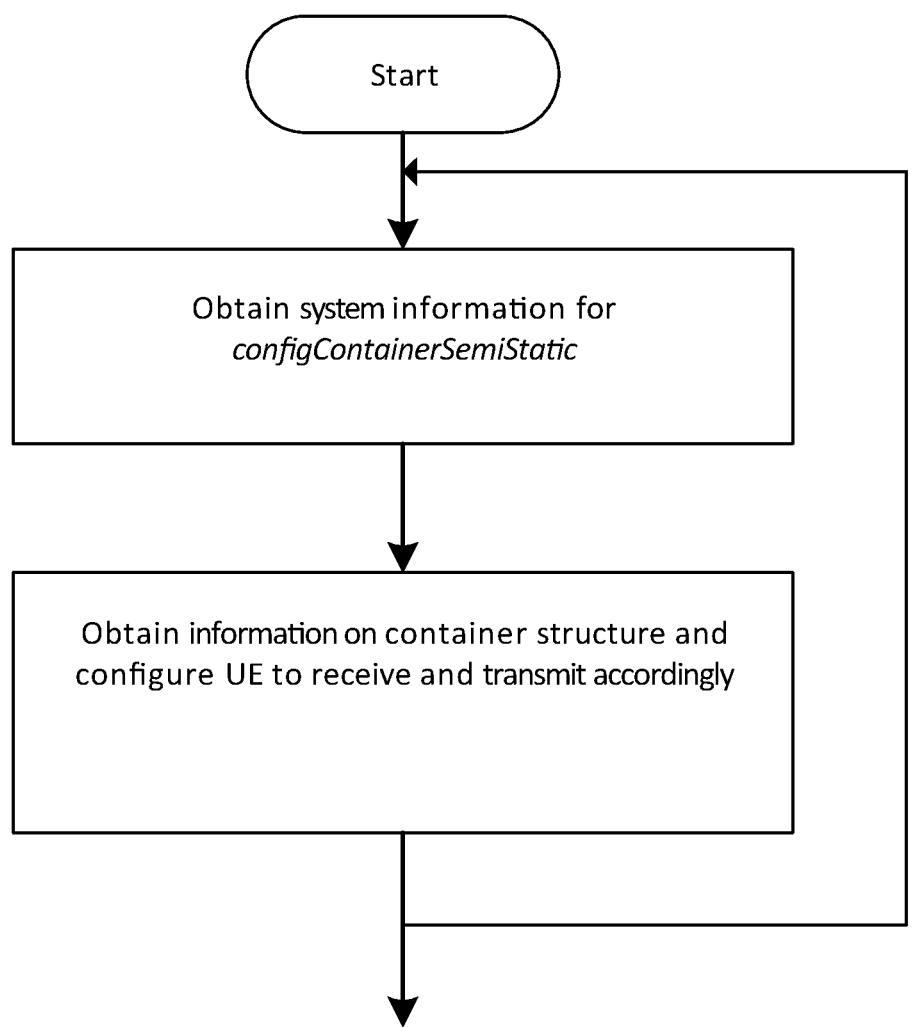
FIG. 28 shows an example of containers with common numerology but different configurations in TDD.

A semi-static container configuration may be achieved through system information such as SIB-2 in LTE obtained via RRC. Network configures a separate container for each network slice. The corresponding UE method for using system information to configure the container for the UE is shown in FIG. 28. It is assumed that the cell executes the appropriate method to enable the UE to obtain the system information before knowing the container configuration. For example, this may be achieved by a design wherein the system information is transmitted in containers with pre-defined configurations and at specific times, both known a priori to the UEs. Once the system information with configContainerSemiStatic is received, the UE configures itself to receive and transmit with the parameters corresponding to its network slice.

Figure 29:
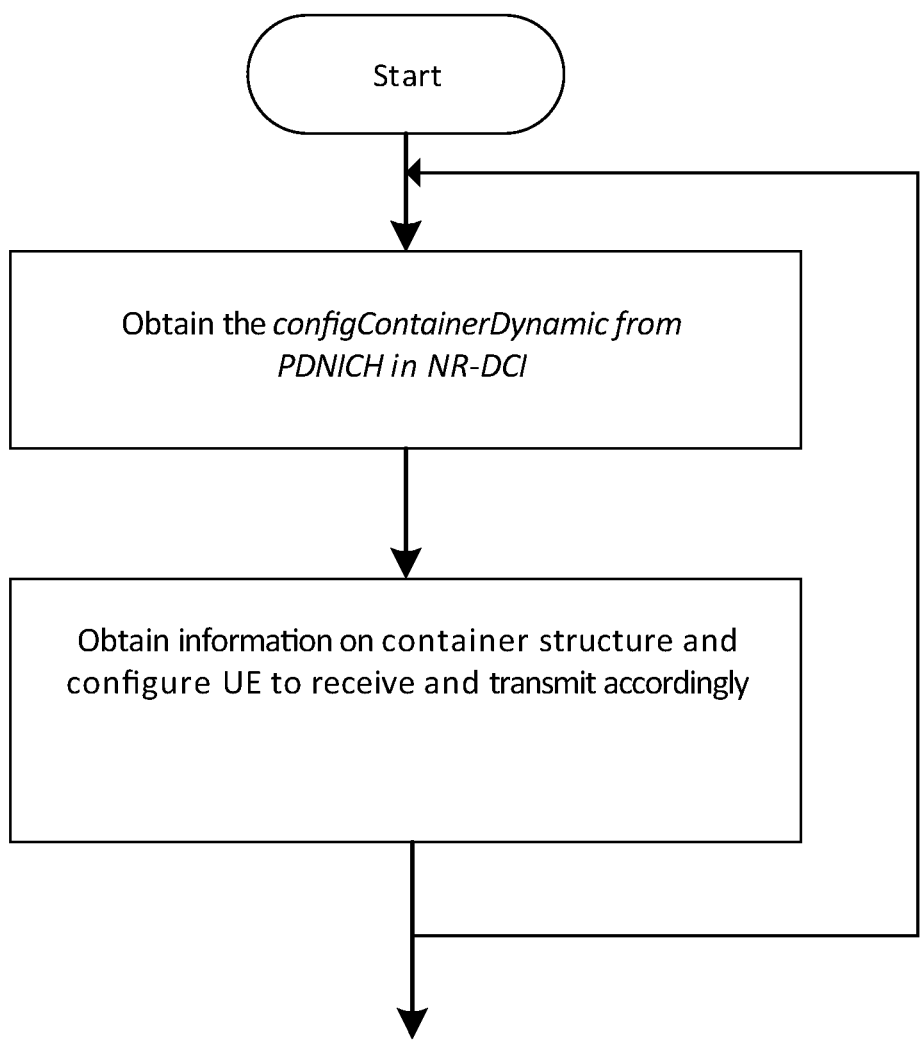
FIG. 29 is a flow chart of an example UE method for configuring a container through system information.

The UE method for dynamic container configuration in shown in FIG. 29. Presumably, at least the part of the NR-DCI specifying the configContainerDynamic can be decoded without knowledge of the container configuration. This may be possible if the NR-DCI contains a PHY channel such as the PDNICH. Here PDNICH is assumed to be blindly decoded from a finite set of possible resources or located in resources known a priori to the UE. Once the configContainerDynamic is obtained from PDNICH, the UE configures itself to receive and transmit according to the container configuration assigned to its network slice.

Figure 30:
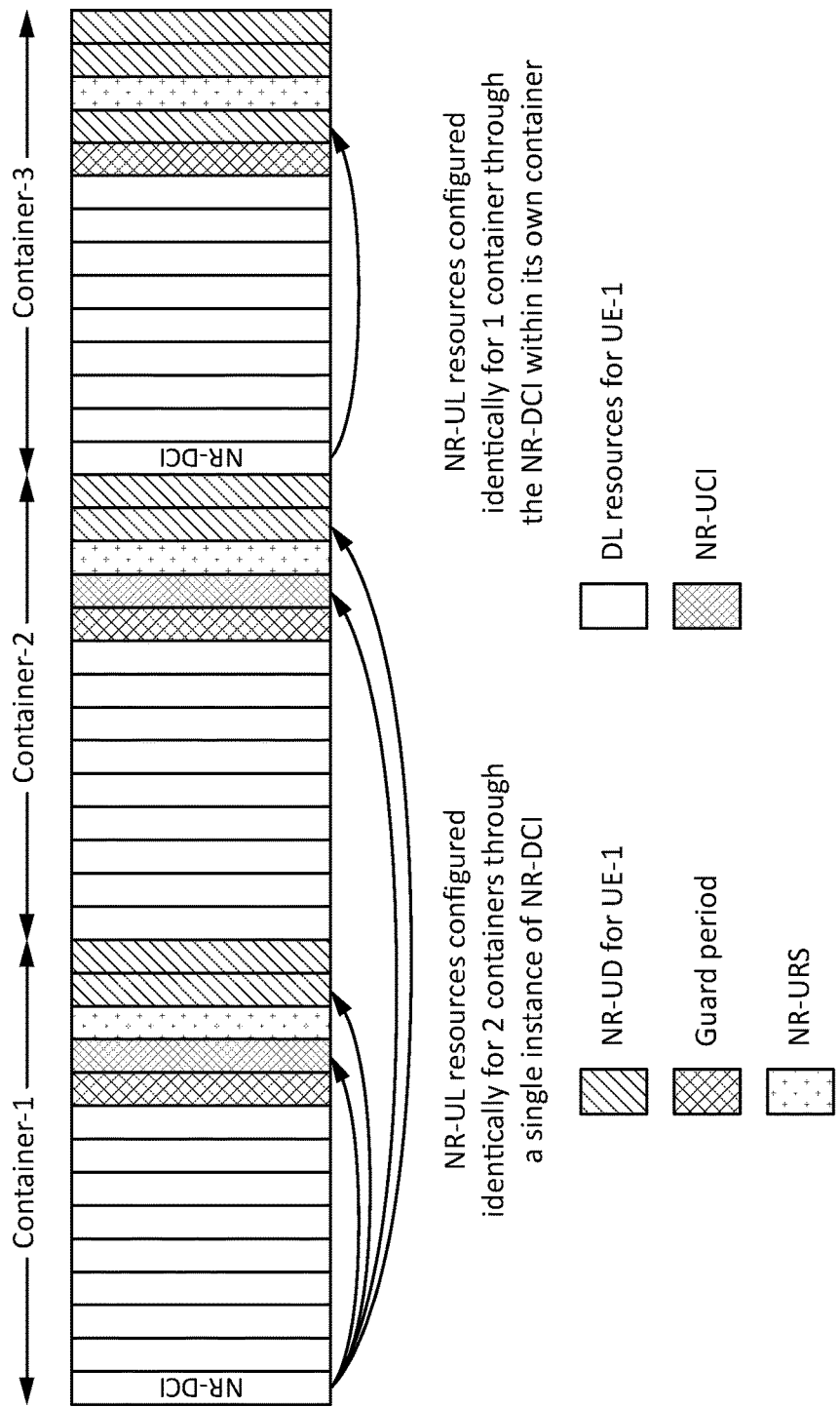
FIG. 30 is a flow chart of an example UE method for configuring a container through NR-DCI.

NR-DCI may configure the container on a per-UE basis or a network slice and may signal once to indicate the configuration for a duration X that may consist of multiple containers following it. In the example shown in FIG. 30, the NR-DCI in the first container sets up the configuration for NR-UL dynamically and the same configuration is valid for container-2. Container-3 has a new configuration for NR-UL through its NR-DCI.

Figure 31:
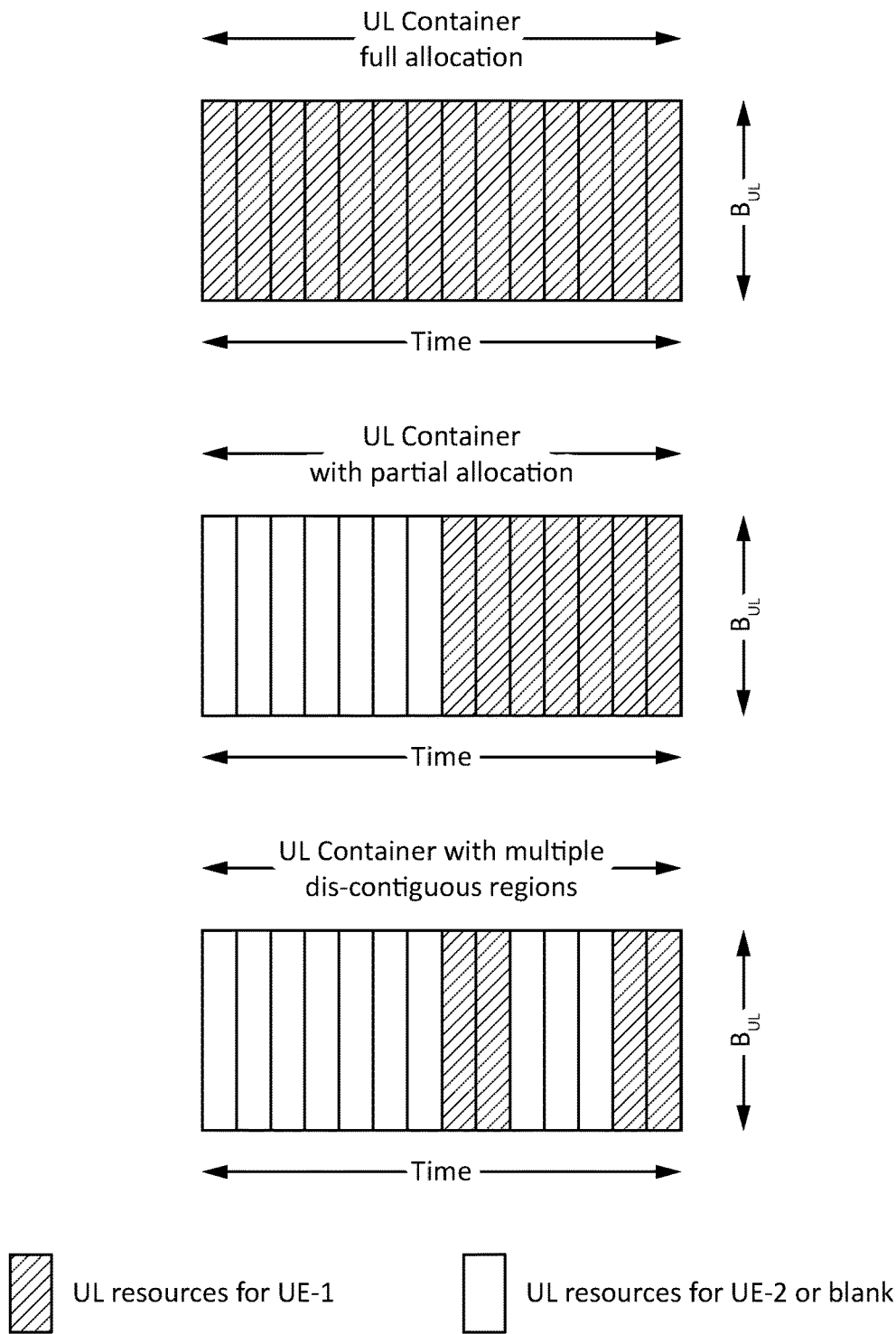
FIG. 31 illustrates an example NR-A/N resource allocation through NR-DCI applicable to two containers before reconfiguration through next NR-DCI in a TDD system.
Figure 32:
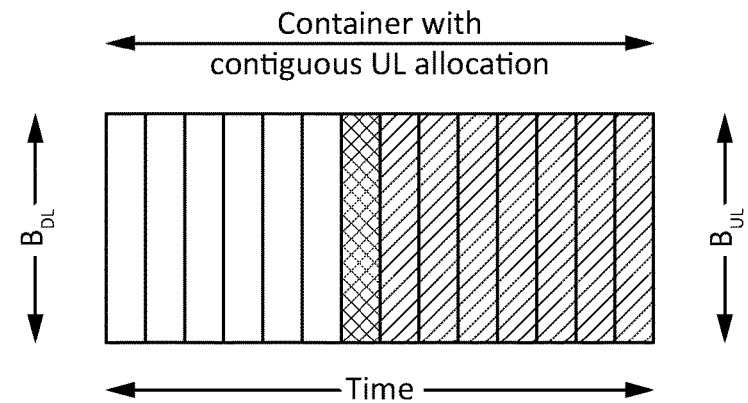
FIG. 32 illustrates an example of UL resource allocation to one or more users within a self-contained subframe.
Figure 32:
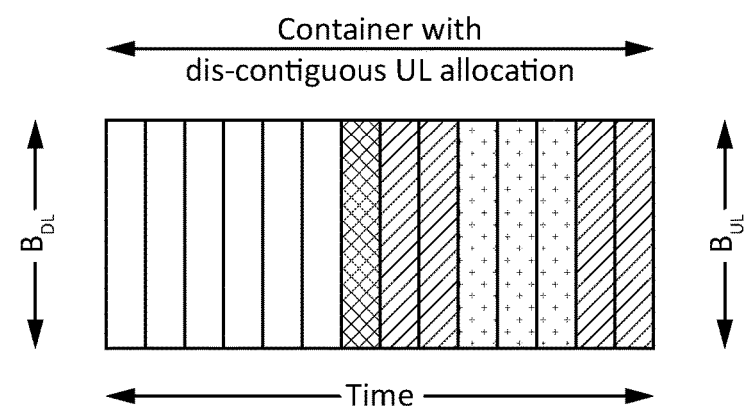
Figure 32:
Figure 32:
Figure 32:
Figure 32:
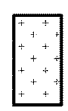

UL signaling may be achieved within a container. Specifically, a container may carry one or more of control, data and reference signals for the UL in one or more non-contiguous (in time or frequency) regions within the container. The UL allocation may occupy the entire container depending on the configuration. Further, UL resources within the container be multiplexed between multiple UEs through time division multiplexing or frequency division multiplexing or code division multiplexing. This concept is shown in FIGS. 31 and 32 for different containers in FDD and TDD wherein two users share UL resources within a container.

Figure 33:
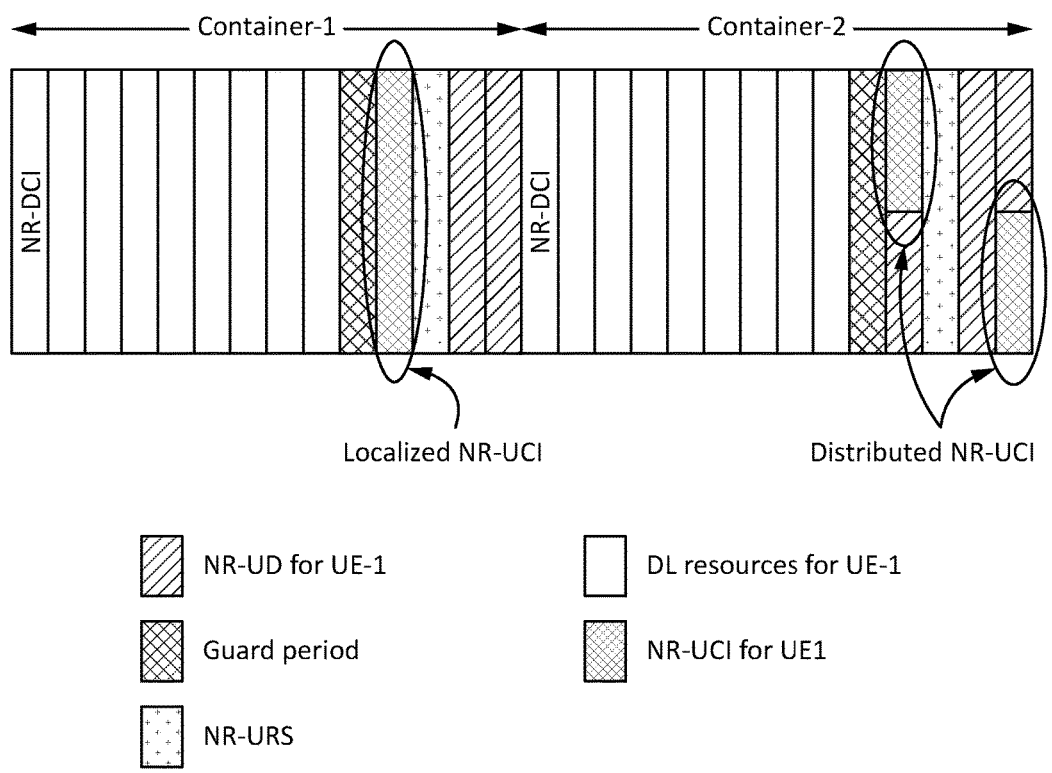
FIG. 33 illustrates another example of UL resource allocation to one or more users within a self-contained subframe.

The NR-UCI may be allocated in some or all frequency resources within one or more symbols or be multiplexed with NR-UD in the resources within the UL part of the container as exemplified in FIG. 33. Furthermore, the resource allocation of NR-UCI may be localized, e.g., in a set of contiguous symbols or distributed, e.g., across non-contiguous resources in time and/or frequency domain. The type of distributed allocation shown here may provide frequency diversity.

Figure 34:
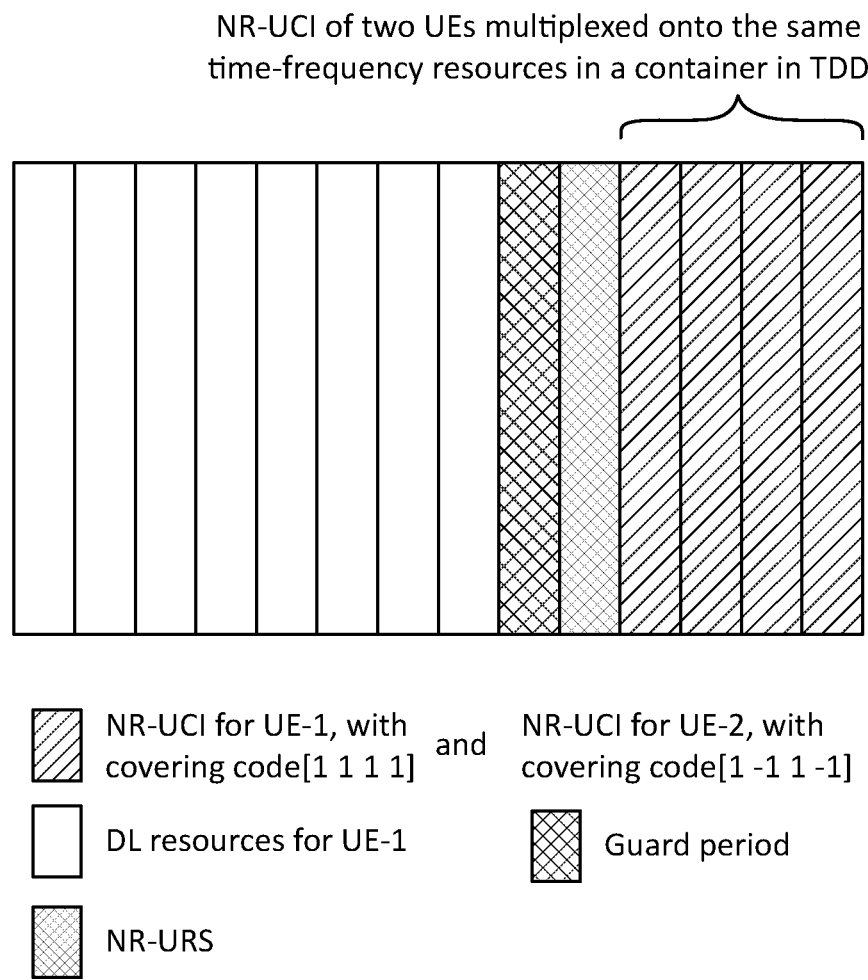
FIG. 34 shows an example of UL resource allocation to one or more users within a container.

NR-UCI of multiple UEs may be mapped to the same time-frequency resources but be transmitted using time domain spreading code/sequence and/or orthogonal or low-cross correlation spreading code/sequence in the frequency domain. In this way the eNB can distinguish different NR-UCI from different UEs. FIG. 34 shows two UEs using orthogonal covering codes to distinguish their transmission in the same time-frequency resources. This solution is different from LTE, where the PUCCH regions are restricted to resources in the outer bands of the carrier and do not beamform to the base station, because the NR-UCI resources can be assigned anywhere within the bandwidth of the carrier and can be beamformed.

The time or frequency division resources and covering codes or orthogonal sequences may be explicitly assigned through an NR-DCI preceding the NR-UCI. Alternatively, the time or frequency division resources and covering codes or orthogonal sequences may be implicitly derived from one or more of: location of DL grant such as the first RB of the DL grant, especially when transmitting NR-A/N; vTTI duration of the DL grant; vTTI duration of the UL transmission in the container; location (in time and frequency domain) of NR-UCI e.g. A/N, e.g. relative position of NR-UCI to data or DL NR-URS or DCI; location (in time and frequency domain) of DCI; and location (in time and frequency domain) of DL NR-URS.

The symbols allocated to a UE within a container may be configured to support frequency hopping thereby providing frequency diversity in open-loop operation. Hopping may be enabled through RRC or MAC CE. For example, the system information such as the SIB-2 in LTE may carry a flag to enable or disable hopping. Alternatively or additionally, the hopping pattern may be a predefined function of one or more of: cell ID; beam ID; numerology type; vTTI of the DL grant in whose response the UCI is transmitted; and vTTI of the UL NR-PDSCH.

Figure 35:
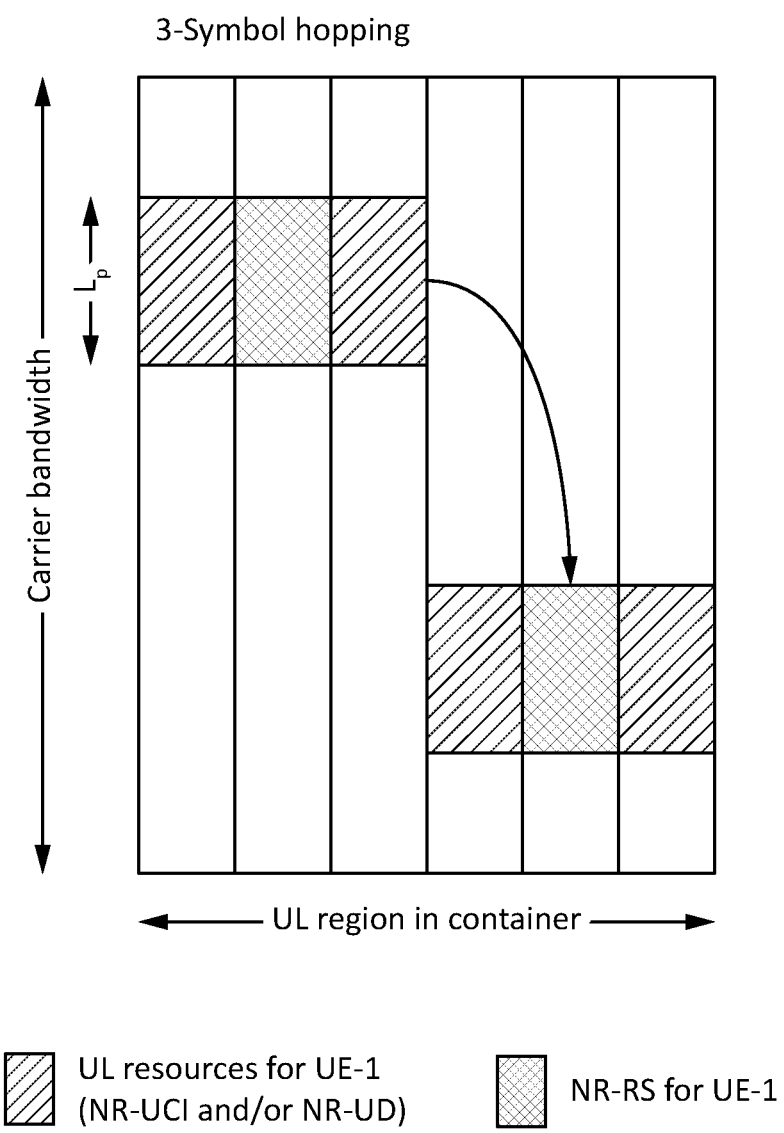
FIG. 35 shows an example of multiple UEs sharing NR-UCI resources through orthogonal covering codes.

FIG. 35 shows an exemplary configuration with a hopping pattern of a basic unit of 3 symbols and Lp subcarriers where two symbols within each segment of the hopping pattern are configured to transmit NR-UCI and/or NR-UD and one is configured to carry NR-URS.

Various methods may be employed which are specific to different types of NR-UCI, such as NR-A/N, NR-SIR, NR-SR, NR-CSI, NR-BID, and related reference signaling.

Figure 36:
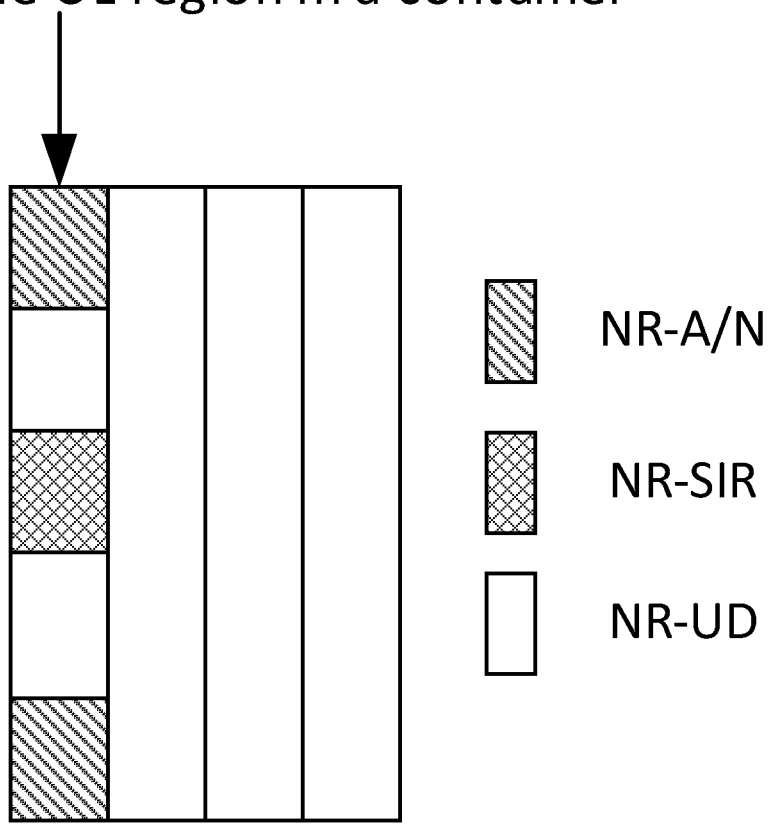
FIG. 36 illustrates example UL operation of UE within allocated subbands.

Symbols signaling NR-A/N and NR-SIR may be implicitly derived based on maximum allowed latency for DL grant and the corresponding vTTI, as specified by the standards specifications. Alternatively, Symbols signaling NR-A/N and NR-SIR may be explicitly granted by the NR-DCI FIG. 36 shows an example where the NR-A/N and NR-SIR are allocated to resources in the leading symbol to minimize the latency. In the example of FIG. 36, the number of resources and modulation and coding for NR-A/N and NR-SIR be implicitly derived based on one or more in the following list. This solution avoids the need to signal the number of resources explicitly to the UE, as well as the channel quality (which indicates the coding and modulation that can be supported, number of layers if spatial multiplexing is used, the number of NR-A/N and NR-SIR bits to be transmitted, numerology type, and beamwidth used in UL beamforming (could be based on pre-coder). This solution is a form of piggybacking the NR-UCI onto NR-UD and identifies resources to multiplex NR-UD and NR-UCI.

Figure 37:
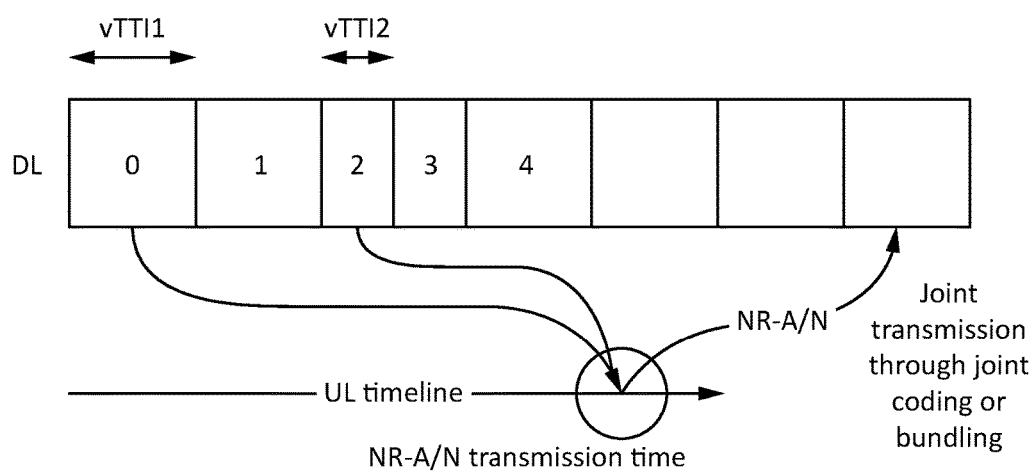
FIG. 37 illustrates an example of NR-A/N and NR-SIR allocated in leading symbol within the UL region to minimize latency.

A/N for HARQ processes with different latency requirements may be jointly encoded or bundled if they are scheduled to be signaled within an interval 'L'. This case arises when different HARQ processes correspond to different vTTI durations and/or different numerologies. The duration L may be predefined by the standards specification or configured through RRC and MA CE. For example, FIG. 37 shows a case when the A/N is transmitted for HARQ processes 0 and 2 at the same time through joint encoding or bundling.

NR-A/N may be jointly encoded or bundled for multiple spatial layers. NR-A/N for primary and secondary carriers may be bundled or jointly encoded when using carrier aggregation. NR-SIR may be jointly encoded or bundled for multiple spatial layers. NR-SIR for primary and secondary carriers may be bundled or jointly encoded when using carrier aggregation For transmitting the scheduling request NR-SR, symbols and resources for signaling NR-SR within the UL region of the container be assigned through pre-defined locations in the standards specification. For example, NSR frequency resources may be reserved for NR-SR beginning from the lowest frequency resource in the 1st symbol of the UL portion of the container. Alternatively, dedicated RRC or MAC CE and the periodicity of SR opportunity be signaled through system information. Further, NR-SR be jointly encoded with NR-A/N(s)

Resources for NR-BID, NR-CQI, NR-PMI and NR-RI or other equivalent channel parameters that provide a channel quality metric be configured for periodic transmission according with a period configured through RRC or MAC CE.

Resources be configured for aperiodic transmission through NR-DCI. Container based transmission, rather than periodic, is better suited for carrying aperiodic NR-CSI since typically a large amount of resources are required dynamically.

The modulation and coding of the resources may be configured based on one or more of the following: number of information bits being encoded; channel quality; and number of layers if spatial multiplexing is used. These types of NR-UCI for primary and secondary carriers be jointly encoded and transmitted on the carrier signaled by the downlink control information. When a UE is served by multiple component carriers, it monitors and reports the channel quality and the best beam indices for all of those carriers. For example, the NR-CQI reports for all the carriers may be jointly encoded and transmitted on the NR-UCI of the primary carrier Solutions for allocating reference signals may be achieved using NR-URS in a container. For example, the NR-URS resources for a UE may be allocated dynamically according to the type of UL traffic carried by the UE. The UE may obtain resources implicitly from the location of resources of other signals such as NR-A/N or NR-SIR. For example, the NR-URS may be located in the symbol immediately following the NR-A/N. The UE may also obtain resources explicitly signaled through NR-DCI such that a single transmission of the NR-DCI may configure the NR-URS resources for several subsequent subframes, or based on fixed locations predefined in the specifications. Further, the NR-URS location may be adjacent to that of NR-A/N and NR-SIR in time to provide the best demodulation/decoding performance.

When frequency hopping is configured, NR-URS may be assigned in each segment of the bandwidth where NR-UCI is present.

The NR-URS sequence may be designed to have single carrier properties (like ZC sequences) in order to keep the PAPR on the UL within acceptable limits.

An exemplary configuration in FIG. 37 consists of a of a basic unit of hopping of 3 symbols and $L_p$ subcarriers where each segment of bandwidth containing the UL signal consists of NR-URS to enable channel estimation. Moreover, the NR-URS is placed adjacent to the NR-UCI to provide low BER/BLER for the NR-UCI.

NR-UCI transmission may be used in dedicated resources which do not carry NR-UD. This is similar to the concept of PUCCH resources in LTE. In LTE resources are dedicated for PUCCH in the outer edges of the band and multiple UEs are multiplexed in a time division or frequency division or code division manner. Such a solution is beneficial when UEs are power limited when operating at cell edge. Here they may require significant frequency diversity to achieve acceptable NR-UCI BER rates. So having frequency resources sufficiently far apart (such as the outer edges of the band) will provide good diversity, especially for small bandwidths. Such a solution is also beneficial when the amount of NR-UCI to be transmitted is minimal such as when the A/N information is small or SR has to send, several UEs can be multiplexed effectively in PUCCH-like resources with minimal overhead The solution for NR is however different from that in LTE because NR has to deal with multiple numerologies and multiple vTTI durations. The proposals are described below.

For each numerology or network slice supported by the eNB, dedicated resources may be assigned semi-statically through system information such as SIB-2 in LTE. Herein, parameters defining the location of these resources as may be referred to as configNumerologyResourcesUCI, which includes—one or more of: resources in frequency within the carrier; frequency hopping pattern between the resources; and numerology of the resources.

For example, the network may assign a different numerology-specific pool of resources to each network slice; URLL devices may be assigned the wider subcarrier spacing based resources to minimize latency while the mMTC devices may be assigned the longer symbol duration based numerology, keeping in mind the low sampling rate and power constraints of the devices.

Figure 54:
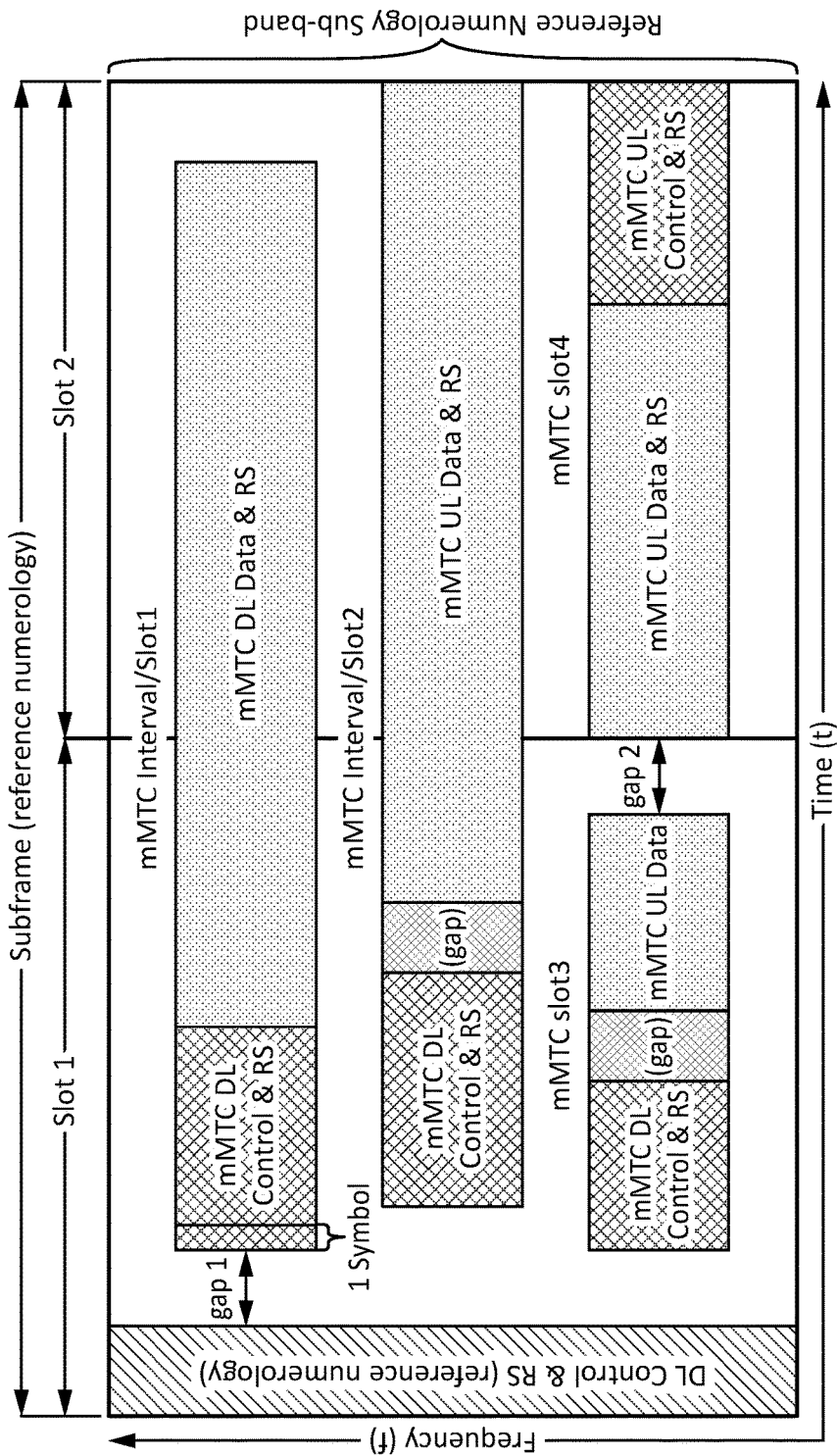
FIG. 54 shows an example of mMTC interval/slot types for narrow band.
Figure 55:
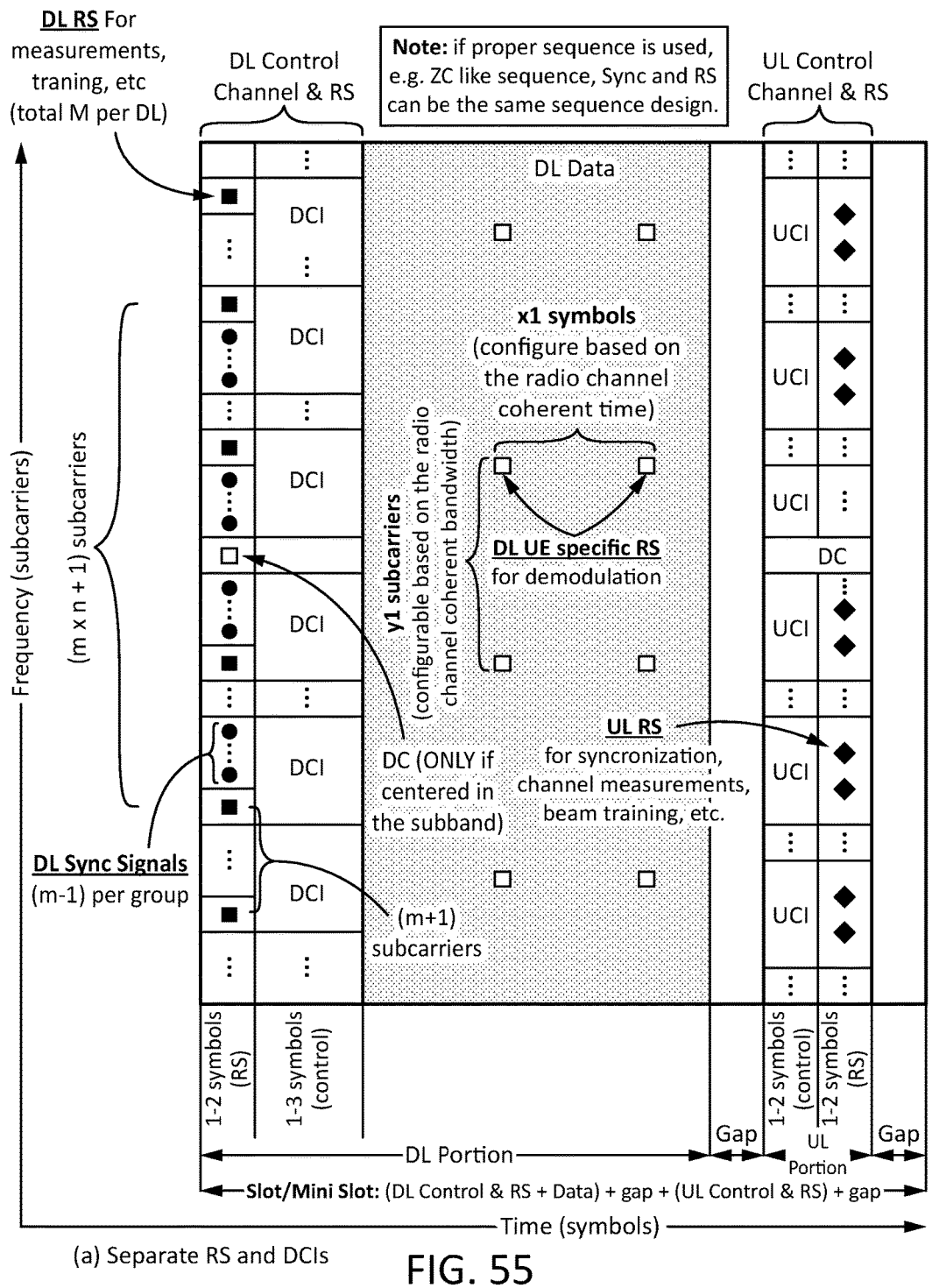
FIG. 55 shows an example of slot/mini-slots with control channel and reference signals for downlink (DL) data with separated RS and DCIs.

Within the resources defined by configNumerologyResourceUCI, a UE may identify its NR-UCI resources through the method similar to those described herein in relation to FIGS. 54 and 55.

Within the resources defined by configNumerologyResourceUCI, UEs may be multiplexed in a time division or frequency division or code division manner and that resources allow for frequency hopping across groups of one or more symbols.

Figure 38:
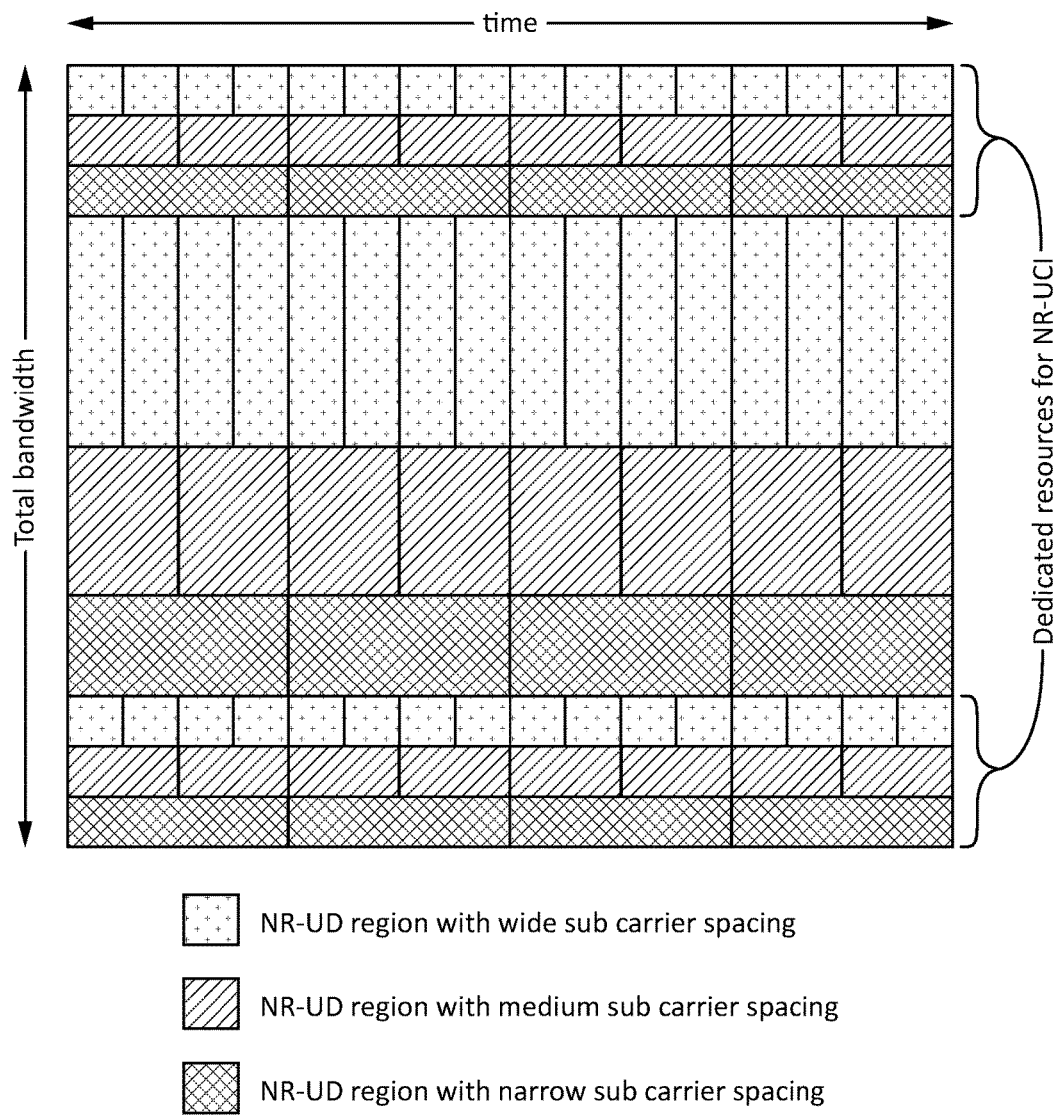
FIG. 38 illustrates an example of joint NIR-A/N transmission.

FIG. 38 shows an exemplary configuration where dedicated regions (configured by configNumerologyResourceUCI) are defined for NR-UCI for different numerologies. Here, UEs are configured to transmit NR-UCI in the numerologies in which they transmit NR-UD. So a UE transmitting NR-UD with a wide subcarrier based numerology will transmit the corresponding NR-UCI in the dedicated NR-UCI region with wide subcarrier spacing. The transmission within a vTTI may consist of segments that hop between the top and bottom sections of the assigned numerology-specific resource pool.

Another exemplary configuration would allow for PUCCH-like formats to be deployed in the respective numerologies assigned to the UEs.

UEs from all supported numerologies may be multiplexed in a time division or frequency division or code division manner within a common set of dedicated resources for NR-UCI. This solution provides better utilization of resources as they are shared by all numerologies.

The common resources for NR-UCI may be assigned semistatically through system information such as SIB-2 in LTE. Herein, the parameters defining the location of these resources may be referred to as configCommonResourcesUCI. configCommonResourcesUCI may include, for example, resources in frequency within the carrier; and a frequency hopping pattern, for example.

Within the resources defined by configCommonResourcesUCI, a UE identifies its NR-UCI resources through methods similar to those described herein in relation to FIGS. 54 and 55.

Figure 39:
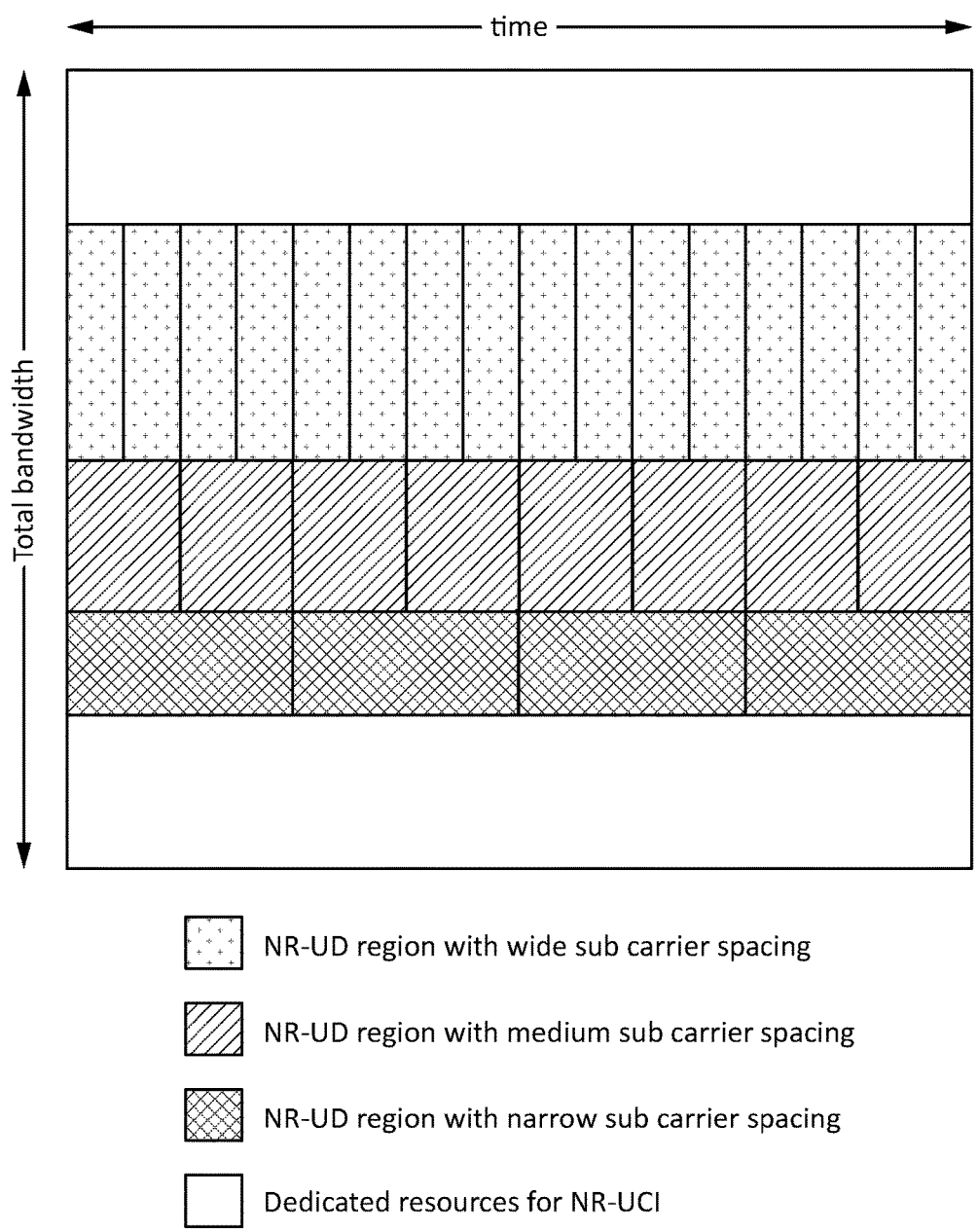
FIG. 39 illustrates an example of numerology specific NR-UCI resources.
Figure 40:
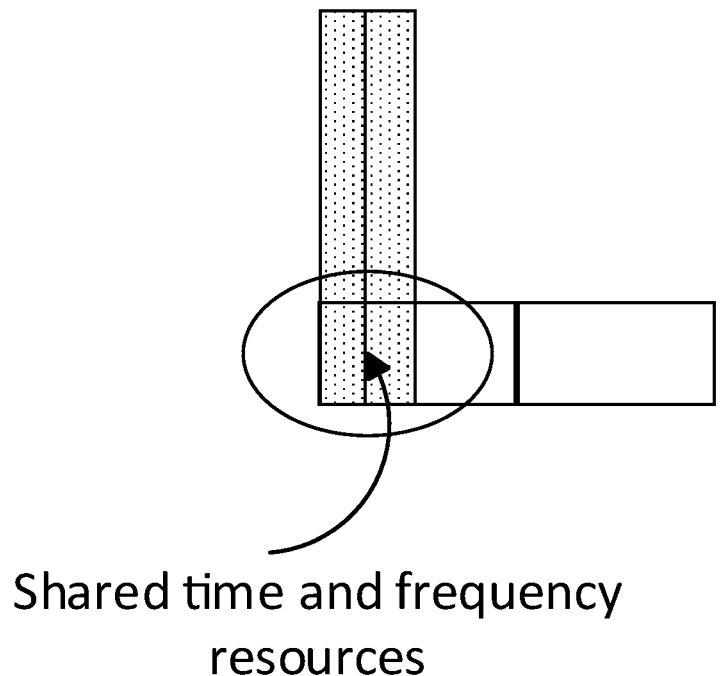
FIG. 40 illustrates an example of common NR-UCI resources.

FIG. 39 shows a dedicated region defined by configCommonResourcesUCI that is assigned for carrying NR-UCI from all UEs transmitting with different numerologies. The UE be multiplexed in time and frequency and through code division within the common resources. Multiple UEs with different numerologies can transmit their NR-UCI on some common time and frequency resources, as shown in FIG. 40, because they do not fully overlap in the time or frequency resources. The NR-UCI multiplexed in this manner may be constructed with sequences having low cross-correlation so that the cell can identify all the users distinctly.

The UE may identify its UE-specific resources from within the corresponding dedicated regions configNumerologyResourcesUCI and configCommonResourcesUCI, respectively. UE-specific resources be derived from one or several parameters, such as: numerology of the NR-UD; vTTI of NR-UCI; vTTI and numerology of the corresponding downlink grant (for example, for NR-A/N and NR-SIR); system information or RRC (for example, NR-SR resource may be set to occur as some periodicity defined in the system information); and numerology used for NR-UCI.

Herein, the group of selected parameters defining the UR-specific resources may be referred to as configUESpecificUCI.

Figure 41:
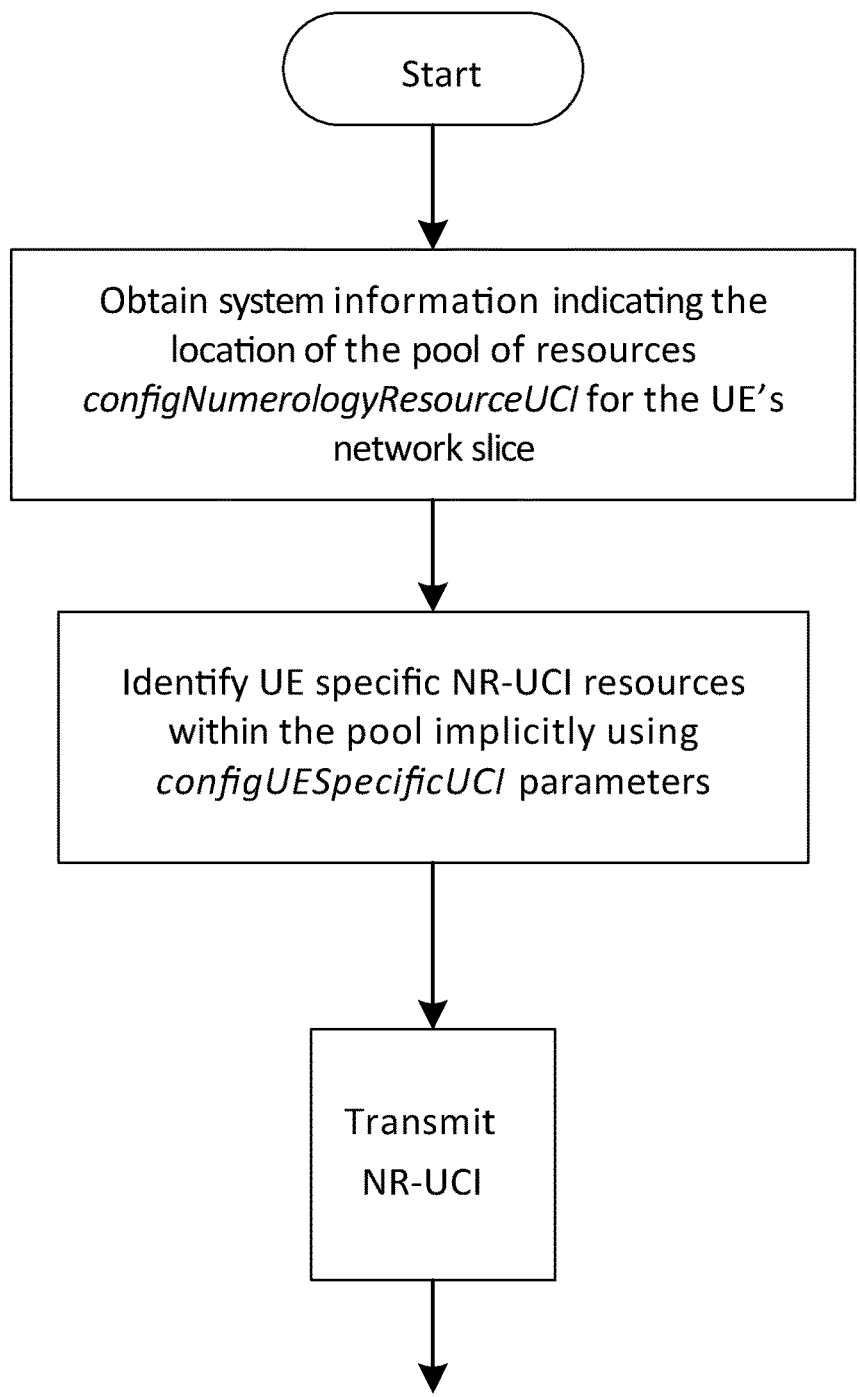
FIG. 41 illustrates an example of sharing time and frequency resources between UEs with different numerologies in common NR-UCI region.

An example of a UE method to obtain its NR-UCI resources from the numerology-specific configuration is shown in FIG. 41. Here, the UE first obtains knowledge of its resources for its network slice from configNumerologyResourceUCI and then within the indicated region, identifies its own resources configUESpecificUCI and then transmits its NR-UCI.

An example of a UE method to obtain its NR-UCI resources from the numerology-specific configuration is shown in FIG. 41. Here, the UE first obtains knowledge of its resources for its network slice from configNumerologyResourceUCI and then within the indicated region, identifies its own resources configUESpecificUCI and then transmits its NR-UCI.

Figure 42:
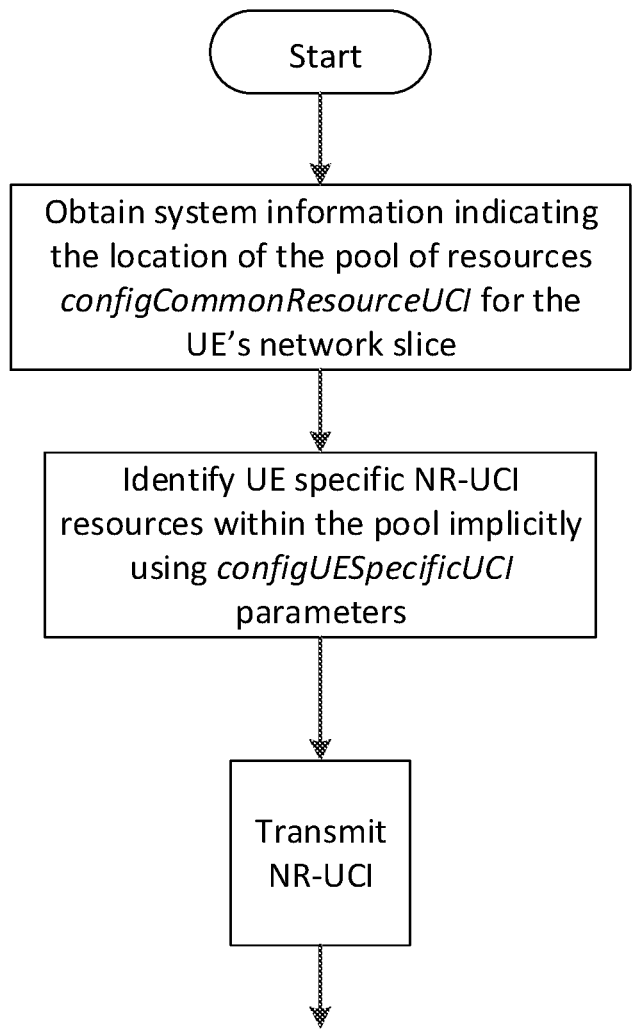
FIG. 42 is a flow chart of an example method for obtaining the numerology specific NR-UCI resources.

NR-A/N may be multiplexed across multiple numerologies. FIG. 42 shows situations where a UE may have to transmit NR-A/N corresponding to multiple DL data transmissions on different numerologies at the same time. In such cases, the NR-A/Ns may be jointly encoded or bundled together and transmitted on resources corresponding to one of the numerologies, preferably the one that provides the least latency.

Efficient SRS design, including SRS location design, configuration, methods, for example, may comprise support of multiple numerology and beamforming operations in NR systems.

Figure 43:
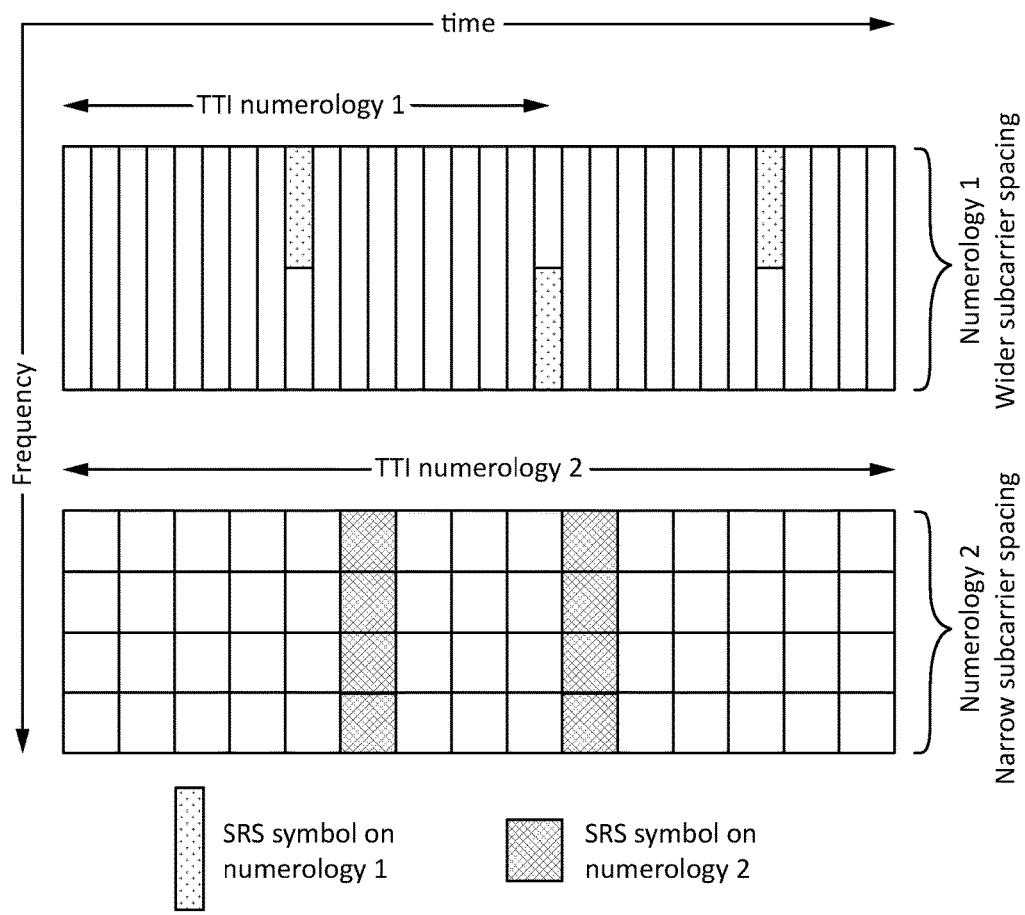
FIG. 43 shows example SRS configurations according to different numerologies.

In an NR system, multiple numerologies may be supported. Different numerologies may have different parameters such as subcarrier spacing, cyclic-prefix duration (length), and flexible interval length X. In the example of FIG. 43, two different numerologies being supported in a NR node, one of the numerologies having a wider subcarrier spacing with shorter interval X duration than the other. As shown in FIG. 43, the NR-SRS for supported numerology can be independently configured according to the numerology bandwidth, orthogonal resources such as cyclic-shift, comb-type and periodical or aperiodical transmission intervals. In addition, the wideband SRS and frequency hopping (FH) SRS operation can be independently configured by each supported numerology.

In the example of FIG. 43, NR-SRS in numerology 1 is configured using FH and NR-SRS in numerology 2 can be configured to cross its whole operation bandwidth. In practice, for narrowband (NB) services such as mMTC application, the operation bandwidth may be very narrow and makes it difficult to perform SRS FH. Hence, in the mMTC application, one possible solution is to disable SRS FH by setting the srs-Bandwidth equal to srs-HoppingBandwidth.

NR-SRS resources and settings can be either dynamically or semistatically configured independently for each supported numerology. For each numerology, NR-SRS resources (e.g., time, frequency and orthogonal sequence) and settings (e.g., transmission period, beamforming patterns, etc.) can be configured or allocated by using either the DL control channel or RRC signaling.

For example, the time domain location of SRS is not limited to the last symbol of a time interval X (or equivalent time unit of a TTI/subframe) and can be configured differently for either aperiodic or periodic transmission, or dynamically signaled by downlink control channel. In the configuration, one or several fixed time locations of NR-SRS may be allocated. Alternatively, a set of allowed time locations of aperiodic NR-SRS may be configured by the higher layer. Then, for each aperiodic NR-SRS transmission dynamically triggered by a DL control channel, the triggering DL control channel may dynamically indicate the index of NR-SRS time location out of the set of allowed time locations configured by higher layer. The configured transmission bandwidth of NR-SRS of each numerology may be smaller than or equal to the bandwidth of the corresponding numerology. The wideband and narrowband NR-SRS sequence length and allowed cyclic shifts may be adaptive to each supported numerology. Settings such as NR-SRS transmission periodicity, beamforming patterns, etc. may be configured according to the characteristics of the numerology and corresponding Use Cases (such as eMBB, UR/LL, mMTC, etc.), UEs' situation such as UE mobility, the NR-SRS overhead vs. data to be transmitted ratio, etc.

Further, configuration parameters that are common to all UEs (Cell-specific) belonging to the same numerology/Use Case may be included in the information elements of NR-SRS configuration in the higher layers common numerology or network slice configuration. Cell-specific configuration is RRC based. Configuration parameters that are UE-specific (such as NR-SRS Tx period, assigned SRS sequence cyclic shift) may be included in the RRC configuration of NR-SRS for each UE and can be configured through DCI. Cell specific NR-SRS resources might not be reserved. Only UE specific NR-SRS may be configured using narrowband NR-SRS. Wideband or frequency hopping (FH) SRS can be independently configured for each supported numerology. SRS power control can be independently configured by each supported numerology. The power offset can be configured either by RRC or DL DCI. The number of cyclic shift codes can be varied with each support numerology. This is due to the fact that each support numerology may have different bandwidth and cyclic-prefix (CP) length. In general, the number of cyclic shift codes is proportional to $$\left\lfloor \frac{N\!f\!f\!t}{CP\,(\text{in samples})} \right\rfloor,$$

where NFFT is the FFT size and CP is the cyclic prefix length in samples. SRS grouping can be independently configured for each support numerology when SRS frequency hopping is performed. This is because the total of S CAZAC sequence groups can be varied from different numerologies. For example, numerology 1 can have $S_1=30$ sequence groups but numerology 2 can have $S_2=60$ sequence groups One example of NR-SRS configuration parameters is shown in Table 11.

TABLE 11

Example of Configuration of NR SRS

| Parameter Name | Description |
| --- | --- |
| srs-ConfigIndex | This parameter defines SRS transmission period |
| srs-SymbolLocation | This parameter defines where the starting SRS to be transmitted, i.e. at which starting symbol can be used to transmit SRS in an interval X |
| srs-Bandwidth | This parameter defines the bandwidth for transmitting SRS in a symbol |
| srs-HoppingBandwidth | This parameter defines the hopping bandwidth for transmitting SRS in a symbol |
| srs-FreqDomainPosition | This parameter defines the starting position for transmitting SRS in frequency |
| srs-SymbolLength | This parameter defines number of OFDM symbols to be used to transmit SRS in time |
| srs-cyclicShift | This parameter defines the cyclic-shift code used for SRS transmission |
| srs-combType | This parameter defines the comb configuration used for SRS transmission |
| srs-TxAntennaPort | This parameter defines which transmit port is configured |
| srs-preCodedEnable | This parameter enables SRS is precoded or not |
| srs-codeBookIndex | This parameter indicates which codebook is used when multiple codebooks are used in NR system |
| srs-numberOfBeams | Number of configured beams N for channel sounding |
| srs-beamIDs | Beam IDs used for channel sounding |
| srs-beamProperty | beam direction: horizontal angle horizontal angle: $\psi$ vertical angle $\theta$ beamwidth $\Delta B$ |
| srs-multiBeamFactor | This parameter may be defined for multiple beams that can be transmitted at a SRS symbol time |
| srs-powerOffset | srs transmission power offset |

Alternatively or additionally, the UE may be configured with a common SRS configuration to all numerologies. The configuration of a common SRS will be similar to that of use case numerology specific SRS, service specific SRS, or network slice specific SRS with the following differences The NR node may only configure, schedule and manage one type of SRS as opposed to managing multiple types of SRS. The SRS may be configured with a numerology (e.g., subcarrier spacing, frame and subframe structure, etc.) dedicated to a common SRS. SRS dedicated numerology may be different from use case or service specific (e.g. eMBB, URLL, mMTC, etc.) numerology and may not be limited to any particular subband of the available system frequency band. It may span the entire frequency band either with frequency hopping or without frequency hopping. The common numerology SRS may be similar to legacy LTE SRS with the difference that it has a dedicated numerology.

Since the common numerology, as opposed to service specific numerology, case-specific numerology, or network specific numerology, may use resources in any part of the available time/frequency resource grid, the inter-cell interference is likely not to be inter-cell service specific interference or inter-cell use case specific interference, for example, for inter-cell eMBB to eMBB or inter-cell URLL to URLL. The common numerology SRS measurements may therefore readily be used by the eNB to decide on frequency-time resource reconfiguration for numerology associated with different use cases, services, or network slices. This may not necessarily be easily achievable in the case of use case specific, service specific, or network specific numerology based SRS since the SRS may be limited to a specific region in the frequency domain or even in the time domain.

SRS may be managed in a self-contained frame structure. A self-contained frame structure, such as time Interval X, contains one or more of the following: DL transmission part, Guard time, and UL transmission part. If there is no UL transmission part in the time interval X, then there is no guard period or NR-SRS transmission. If there is a UL transmission part in the time interval X, then the time interval contains SRS or no SRS transmission, depending on the configuration. The triggering of NR-SRS transmission in the time interval X and some dynamic settings of SRS transmission can be signaled by the DL control channel in the same or previous interval X. The SRS resources such as frequency bandwidth or symbols can be dynamically or semistatically configured by DL control or RRC configuration. The RRC signaling can specify several possible parameter sets (e.g., combination of time, frequency location, sequence, etc.), and the dynamic DL control channel can indicate which combination that the UE should use on a more dynamic basis (e.g., over each interval X or over several intervals X).

Figure 44:
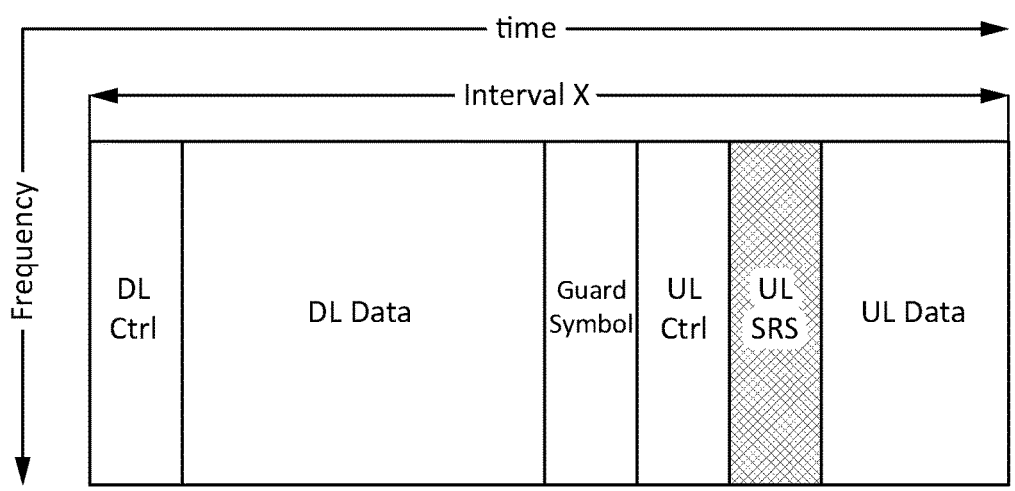
FIG. 44 shows an example SRS configuration in a NR self-contained interval.

An example of NR-SRS transmission in a self-contained frame structure interval X is illustrated in FIG. 44.

Figure 45:
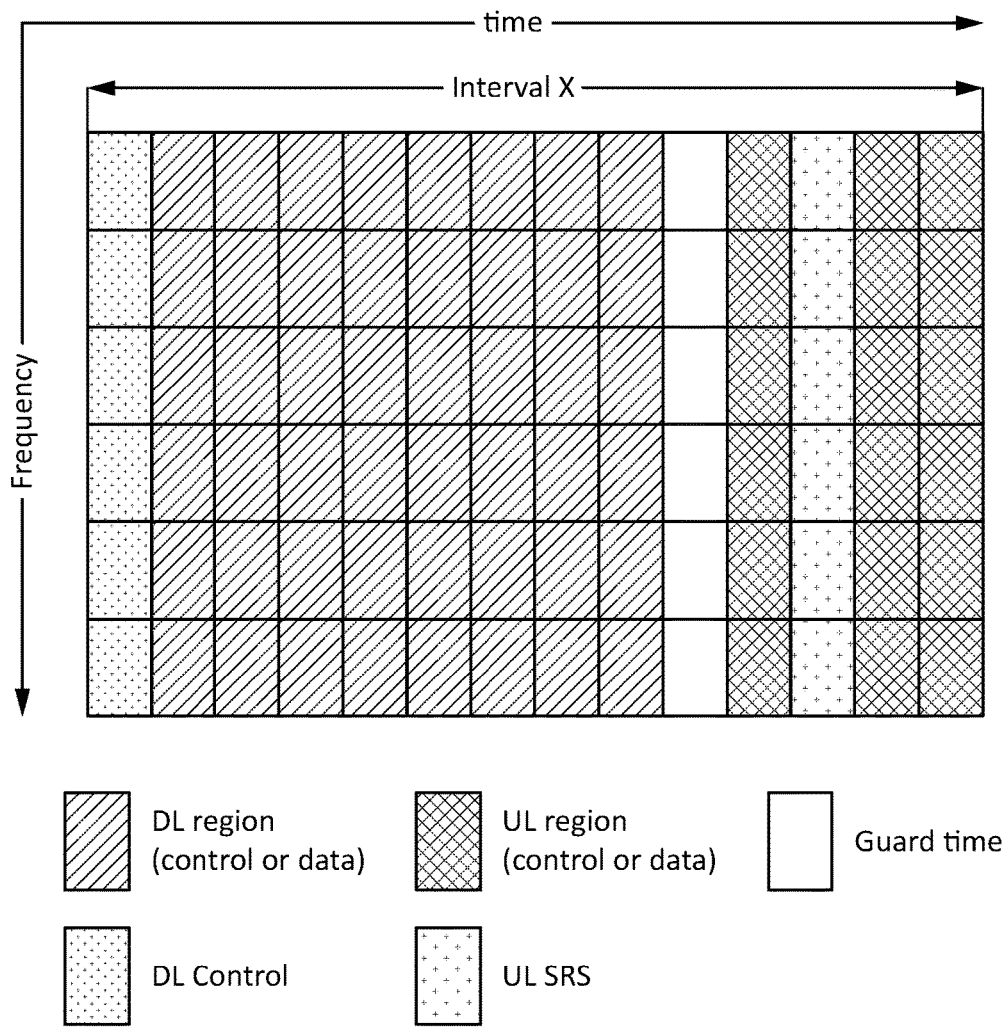
FIG. 45 depicts an example SRS transmission triggered by its DL control in a NR self-contained interval.

In the example of FIG. 45, a single, self-contained interval X is configured with DL reception, guard time and UL transmission. The SRS transmission can be triggered by the DCI information in the DL control channel. The SRS transmission resources such as allocated SRS bandwidth and starting symbol in time also can be dynamically configured by DL control channel or semistatically configured by RRC signaling.

Figure 46:
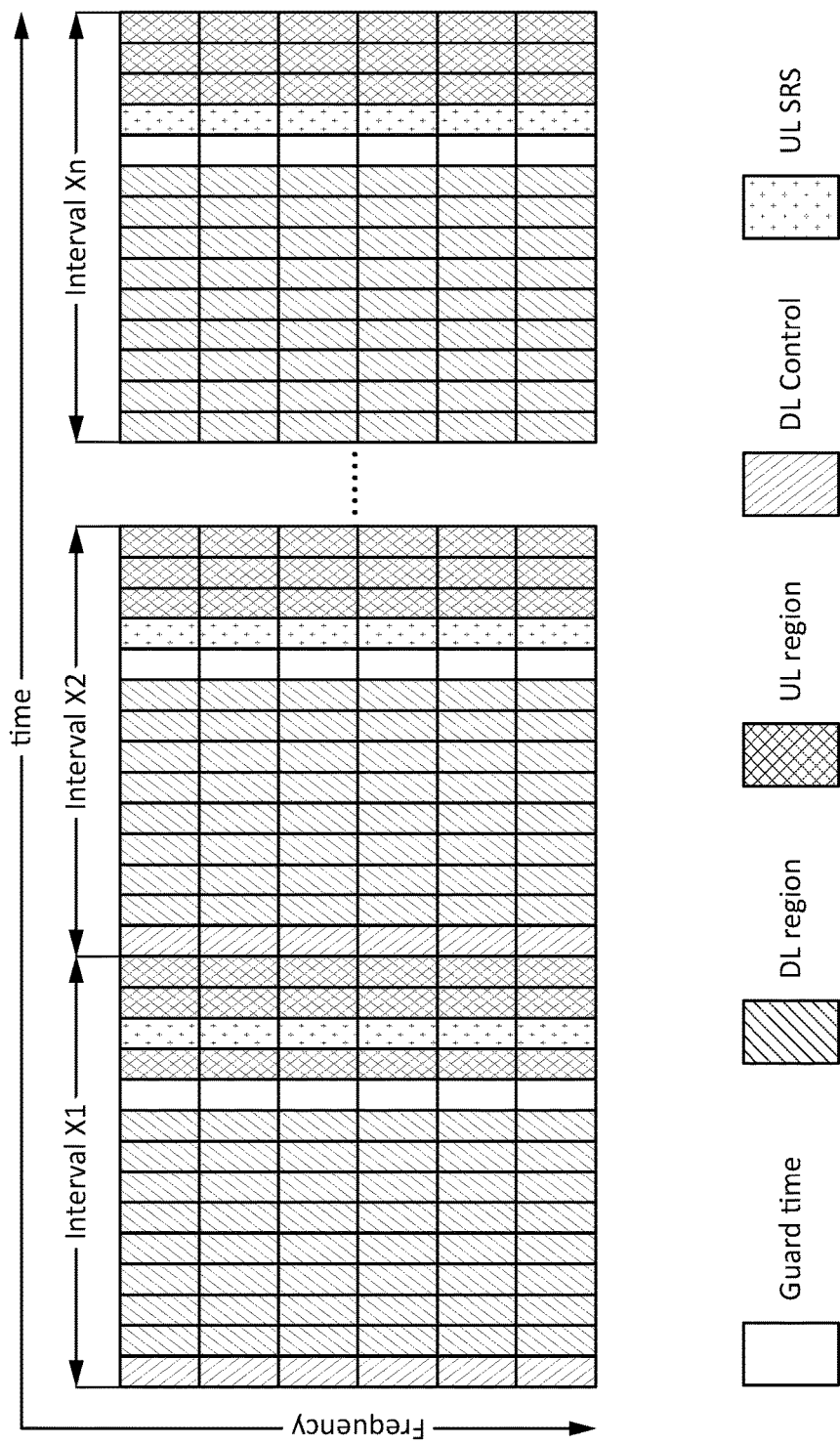
FIG. 46 depicts an example SRS transmission triggered by its DL control in multiple NR self-contained subframes.

When there is more than one self-contained interval X configured, as shown in the example of FIG. 46, triggering of the SRS transmission can be either dynamically configured by the DL control channel in the current Interval $X_i$ (i∈2, . . . , n) or by the DL control channel in the previous self-contained Interval $X_j$ 1≤j<i. In the self-contained interval X, the configuration of SRS transmission resources such as SRS bandwidth and starting symbol can be dynamically configured by the DL control channel or semistatically configured by RRC.

For example, NR SRS transmission resources such as transmission bandwidth, number of transmission symbols, and orthogonal mechanisms can be semistatically configured via RRC and the SRS transmission timing in self-contained Interval X can be triggered by the NR self-contained DL control DCI.

Alternatively or additionally, a method for channel sounding to explore wireless channels may be performed using a beamforming technique. The beamforming method for channel sounding is especially preferred when the full Channel State Information (CSI) cannot be obtained from the channel sounding signal. In higher frequency bands (such as >6 GHz), the transmit signal is attenuated dramatically due to reflection. The received signal quality may experience degradation if there is no light-of-sight (LOS) path in the higher frequency band. Therefore, in the higher frequency bands, using beamforming to explore LOS or non-LOS becomes an effective method to explore wireless channels.

NR SRS can be pre-coded for FDD, TDD and flexible self-contained frame structures. For example, if the srs-preCodedEnable flag is set to enable, then SRS can be pre-coded when it is on transmission (see Table 7). The pre-coding weights for NR SRS can be based on a codebook or non-codebook approach.

If there is a specified codebook from the gNB with multiple codebooks setup for pre-coding SRS, the SRS can use the pointed/assigned codebook while pre-coding the SRS. In addition, pre-coded NR SRS can be adaptive to UE antenna configurations. srs-TxAntennaPorts can be configured to indicate antenna ports used for SRS pre-coding. The pre-coding weight can be either signaling via DL control channel or RRC configuration. For example, if there are 4 codebooks supported in a NR system, each codebook (pre-coding matrix) is denoted as $C_i$ i=1, 2, 3, and 4. Each $C_i$ might have different antenna configuration. For example, $C_1$ may be a 2×2 pre-coding matrix, $C_2$ a 4×4 pre-coding matrix, $C_3$ a 8×8 pre-coding matrix and $C_4$ a 16×16 pre-coding matrix. If srs-codeBookIndex is set to 3 then $C_3$ codebook is chosen for SRS pre-coding. The pre-coding weights (codebook matrix column vectors) and layers (ranks) can be signaled via DL control or via RRC configuration. For example, if a DL control channel indicates the pre-coding matrix column indices {1, 3} from a codebook $C_i$ then the pre-coding matrix can be constructed from codebook $C_i$ by taking out column vector $$W = C_i(1,3) = [c_{i,1} c_{i,3}],$$

where $c_{i,1}$ and $c_{i,3}$ are $1^{st}$ and $3^{rd}$ column vectors of the codebook $C_i$ matrix.

Additionally or alternatively, an NR-SRS pre-coding matrix may be constructed from a pre-defined codebook (specified in the standards). In this approach, the signaling overhead for choosing the pre-coding matrix can be reduced for pre-coding SRS. For example, the SRS pre-coding matrix can be constructed from a discrete Fourier transform (DFT) codebook. A DFT codebook can be expressed as $$B = [b_1 b_2 \ldots b_N],$$

where $$b_n = \frac{1}{\sqrt{N_t}} \begin{bmatrix} 1 & e^{j\frac{2\pi n}{N}} & \ldots & e^{j\frac{2\pi(N_t-1)n}{N}} \end{bmatrix}^T, n = 0, \ldots, N-1,$$

where N denotes (beam resolution) and $N_t$ denotes number of transmit antennas. Since the values of $N_t$ and N can be dynamically configured to be adaptive to a UE antenna configuration, this can avoid the need to use multiple codebooks and hence can reduce the signaling overhead.

A special pre-coding case for SRS is equivalent to antenna selection when the pre-coding matrix is using an identity matrix. If srs-preCodedEnable is set to "disable," then the pre-coding matrix can be set as an identity matrix for SRS pre-coding.

$$I = \begin{bmatrix} 1 & \ldots & 0 \\ \vdots & \ddots & \vdots \\ 0 & \ldots & 1 \end{bmatrix}.$$

In this way, the NR-SRS can be treated as always being pre-coded.

The SRS pre-coding may be based on a non-codebook approach. In such a case, the SRS can be seen as a case of directional beamforming. For example, to construct the NR 3D direction beam, the configuration can be specified with a beam direction or horizontal angle $\varphi$ and vertical angle $\theta$ and a beam width $\Delta B$.

Figure 47:
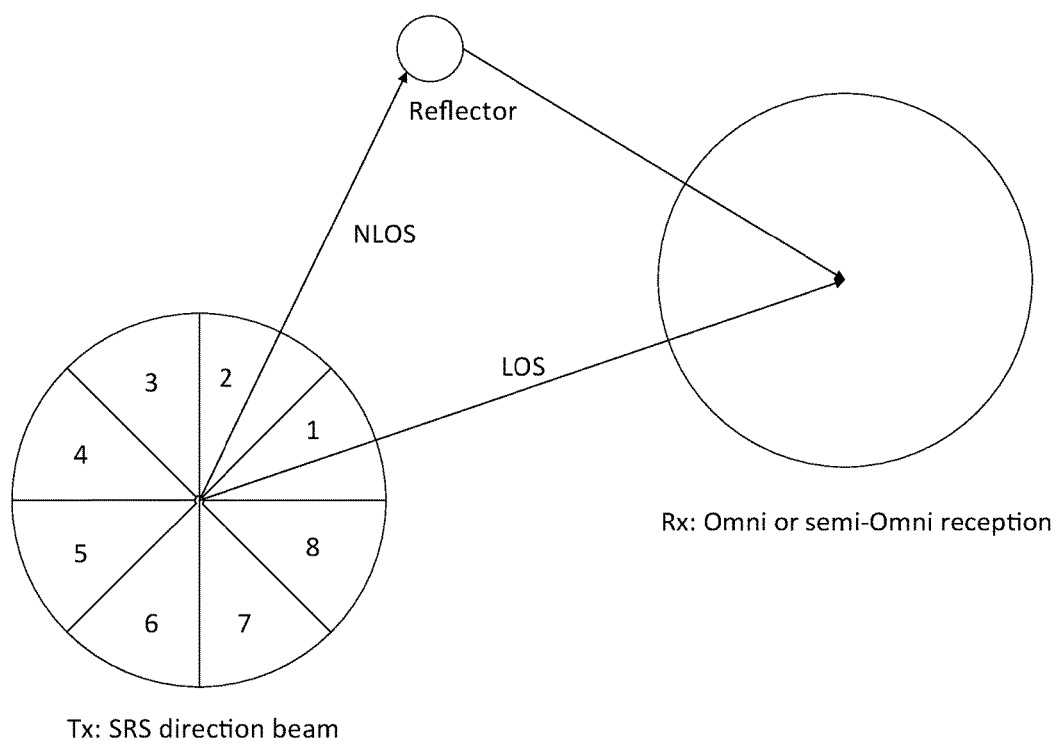
FIG. 47 shows an example channel sounding method via SRS direction beams.

The number of beam directions and the beam width can be adaptive to UE capability and category. If a UE is equipped with a large number of transmit antennas then it can, in principle, perform better beam direction resolution and construct a finer beamforming quality. In the example of FIG. 47, an eight direction beams is configured for SRS direction beamforming setup. In this 2D example, each direction 2D beam width is set to 45 degrees for each beam direction. In this example, the TX beam 1 and 2 can explore the LOS and NLOS path for a UE. Hence, SRS direction beams can achieve the channel sounding. Such methods may be generalized to 3D.

Each direction beam can be associated with a unique beam ID. This beam ID can be used for configuration of sounding method (see the discussions of channel sounding in reference to FIGS. 48 and 49 below for more details for beam ID usage). Each direction beam can be associated with a beam training sequence. The beam training sequence can use a CAZAC sequence or low-PAPR sequences. For example, the beam training sequence for SRS can be expressed as:

$$SRS = e^{j\alpha n} e^{\frac{-j\pi u q(q+1)}{N}}, q = 0, 1, \ldots, Q-1,$$

where Q is the sequence length, the root of CAZAC sequence u can be set as function of beam ID, and $\alpha$ is the cyclic shift.

The sounding method may be categorized via a beam ID feedback method or a beam sweeping method.

In the beam ID feedback method, each beam ID can be associated with a unique directional beam. The srs-beamIDs specified in Table 7 can be used to carry those beam ID configurations. In addition, this field (srs-beamIDs) can be associated with srs-beamProperty for non-codebook based approach or srs-codeBookIndex for codebook based approach to construct the desired beam. In this way, a UE can use these aforementioned configurations to generate the specified direction beams. For example, the UE may be configured with 3 beams and non-codebook based approach to form direction beams. In this example, the srs-beamIDs and each corresponding srs-beamProperty in Table 7 can be expressed as ={1, 2, 3} and {{$\varphi_1, \theta_1$}, {$\varphi_2, \theta_2$}, {$\varphi_3, \theta_3$}}, respectively. The presentation of the horizontal angle $\varphi$ and vertical angle $\theta$ can be quantized instead of using explicit angle degree or rad. For example, the range of horizontal angles is starting from 0 to 180. The range of horizontal angle can be normalized to from 0 to 9 (=180) for this example. In this example, if a horizontal angle $\varphi$=60, then the quantization presentation can be equal to $\varphi$=3. By the beam configuration information, the UE can perform 3 specification direction beams. In short, when NR-node configures UE using beam ID feedback method for channel sounding, UE can apply the configured beam ID information to generate the corresponding/specified beamforming SRS and transmit those beams to NR-node. In this way, NR-node is expecting to detect those configured beams. Hence, NR-node can perform the beam quality measurement to decide which beam has a better quality. This method is useful for refining the channel sounding for NR-node. Otherwise, NR-node can configure UE to perform beam sweeping instead of using beam ID feedback. When NR-node configures UE with beam a sweeping method for channel sounding, UE will transmit pre-setup or configured sweeping beams within the SRS transmission interval. For example, if a UE is configured with 8 beams, it transmit/sweep all 8 beams during the SRS transmission interval. This option can save the configuration overhead because there is no specified beams during the SRS transmission interval.

Figure 48:
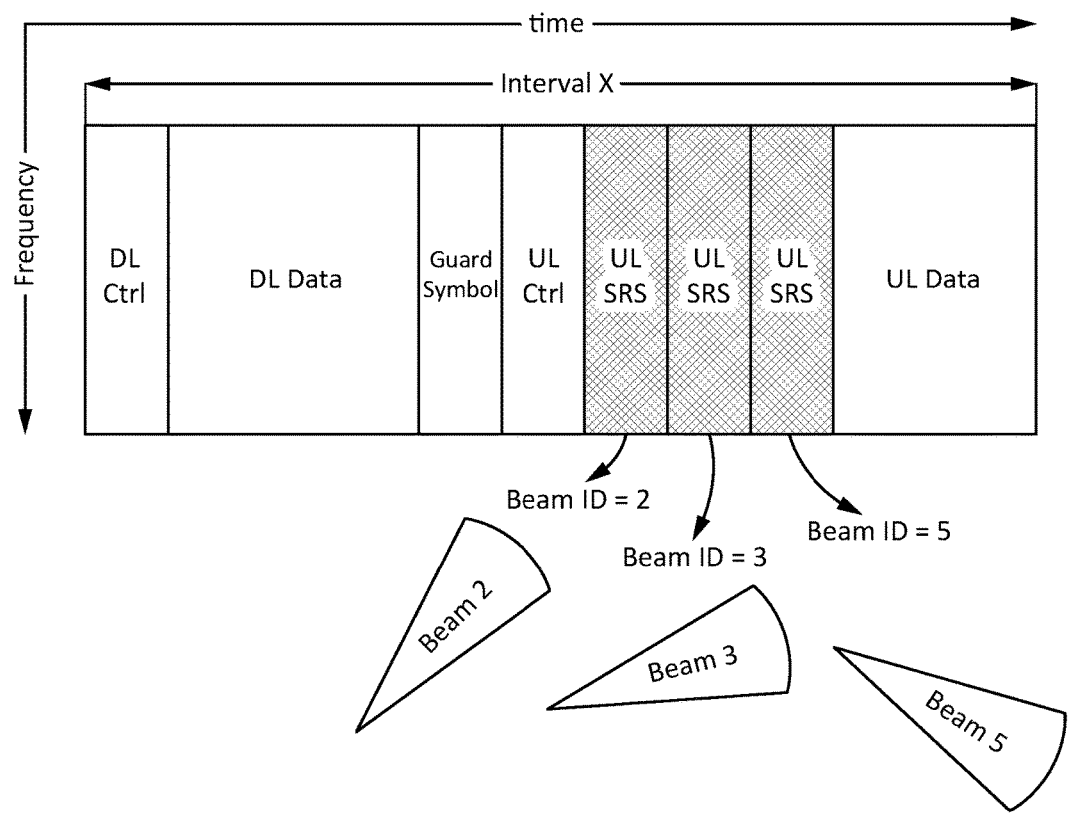
FIG. 48 shows an example configurable SRS for channel sounding via an iterative beam training approach.

Another use case of beam ID feedback method is that the UE can be requested to transmit specified multiple beams or a single beam during the sounding time for supporting iterative beam sounding techniques. The iterative beam sounding method is referred to as not involving any beam sweeping operation and beams can be independently configured at each beam transmission time. The beam ID method allows NR-node to configure specified beams for sounding purpose and without brute force to sweep all configured beams. The beam sounding period can be configured via either RRC or DL signaling. The number of SRS beams are transmitted at each transmission interval X can be configured. If each SRS beam transmission duration is set to L symbols and K srs-multiBeamFactors, multiple beams can be simultaneously transmitted and the total transmission duration for all N beams is equal to $$\left\lceil \frac{N}{K} \right\rceil \times L$$

symbols. The N parameter can be configured via srs-numberOfBeams listed in Table 7. The start of symbol index is configured by srs-SymbolLocation in an interval X. If the number of configured srs-beamIDs is less than N then the beam sweeping operation is not performed. For example, if srs-numberOfBeams N is set to 8 and srs-beamIDs are set as {2, 3, 5} then UE will transmit 3 beams. The beam quality can be specified as $\{\{\varphi_2, \theta_2\}, \{\varphi_3, \theta_3\}, \{\varphi_5, \theta_5\}\}$ in the srs-beamProperty for a non-codebased approach. In a codebook based approach, if multiple beamforming vectors are specified from a codebook, then a UE can try to find an optimized beamforming vector for transmission using the following formula:

$$W_{tx} = \mathrm{argmin}_{W_{tx}} \|W_{SRS} - W_{tx}\|_F^2 \text{ such that } \|W_{tx}\|_F^2 = N_{tx},$$

where $W_{tx}$ is the UE transmission pre-coder or beamforming weight and $W_{SRS}$ is the target pre-coder or beamforming weights that are configured by the NR-node. For the codebook based approach, the $W_{SRS}$ can be configured via srs-codeBookIndex. If based on non-codebook based approach, $W_{SRS}$ can be specified via srs-beamProperty. In addition, the activated beam ID can be dynamically signaled via the DL control channel. FIG. 48 depicts an exemplary configurable sounding method.

Figure 49:
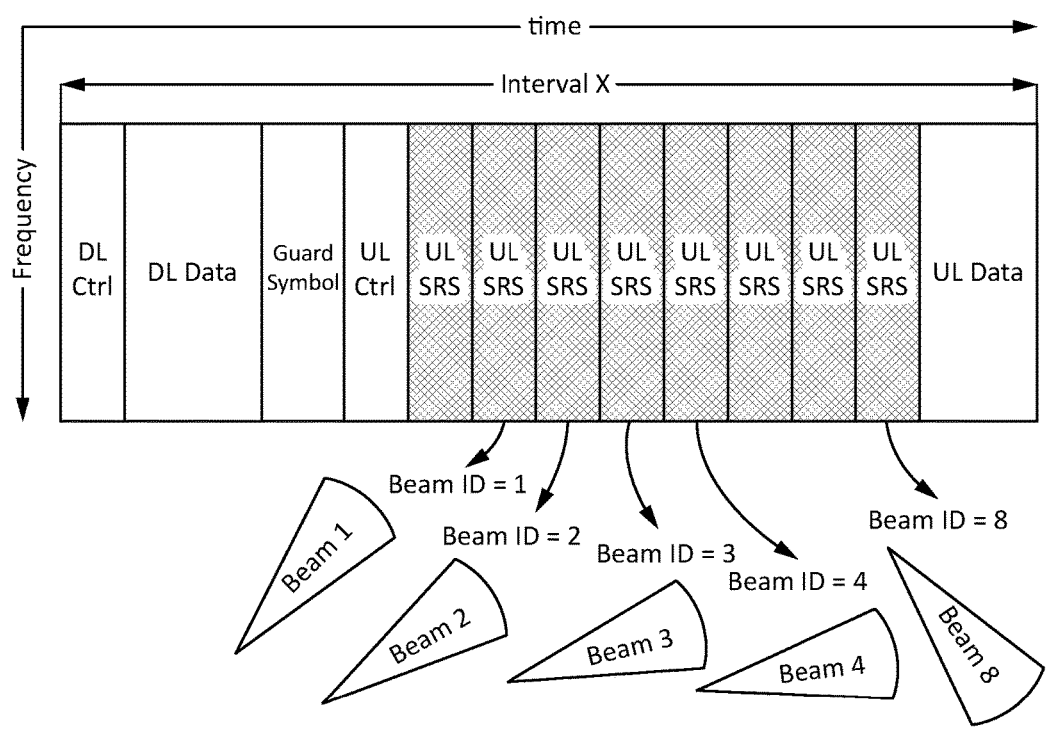
FIG. 49 shows an example configurable SRS for channel sounding via a beam sweeping approach.

In the example of FIG. 48, if the number of srs-beamIDs is set equal to srs-numberOfBeams, then the beam sweeping will be performed. FIG. 49 depicts SRS configured for beam sweeping during a channel sounding stage.

The following four cases are examples of interaction between the UE and the NR-node during a sounding method.

In Case 1, UE Tx beam sounding/training with NR-node use beam feedback for UE Tx beam refinement. In this case, NR-node configure UE to feedback specified beams for channel sounding refinement and no beam sweeping is involved.

In Case 2, there is no UE Tx beam sounding/training but NR-node performs Rx beam sweeping with NR-node feedback for best NR Node's Rx beam(s), i.e., beam paring. In this case, a UE perform beam ID feedback methods for UL channel sounding/beam training and NR-node determines which beams have better received quality associated with the NR-node received beamforming. NR-node can feedback the best paired beams to this UE. For example, a UE configures 8 beams I={1, 2, . . . , 8} but only transmit beam ID={2, 3, 4}. In the NR-node, it performs 16 receive beamforming (16 receive direction) and each receive beamforming is also associated a beam ID, i.e., J={1, 2, . . . , 16}. Therefore, it has 3×16=48 transmit-receive beam pairs. If the NR-node detect the transmit beam {i=3} and receive beam {j=7} has the best quality than other beam pairs then {i=3, j=7} beam pair can be feedback to UE. The NR-node can feedback multiple beam pairs as well.

In Case 3, UE Tx beam sweeping, no NR-node RX beam sweeping, NR-node feedback for best UE Tx beam. In this case, NR-node configure UE performing beam sweeping for channel sounding and NR-node feedback to the UE which received beams have better quality.

In Case 4, UE Tx beam sweeping, NR-node perform RX beam sweeping, NR-node feedback for best UE Tx beam and best NR Node RX beam. In this case, a UE perform beam sweeping methods for UL channel sounding and beam training and NR-node determine which beams have better received quality associated with NR-node received beamforming. NR-node can feedback the best paired beam to a UE. For example, a UE performs 8 beams {1, 2, . . . , 8} sweeping and NR-node determines which beams have better received quality associated with the NR-node received beamforming. NR-node can feedback the best paired beams to this UE. For example, a UE configures 8 beams I={1, 2, . . . , 8}. In the NR-node, it performs 16 receive beamforming (16 receive direction) and each receive beamforming is also associated a beam ID, i.e., J={1, 2, . . . , 16}. Therefore, it has 8×16=128 transmit-receive beam pairs. If the NR-node detect the transmit beam {i=3} and receive beam {j=10} has the best quality than other beam pairs then {i=3, j=10} beam pair can be feedback to UE. The NR-node can feedback multiple beam pairs as well.

The methods of cases 1-4 may be used separately or in any combination.

In the case of beam training, the feedback may be beam direction information (e.g., horizontal angle, azimuth, etc.), beam width, or Tx power. This information may be grouped into beam training feedback information sets. The feedback information sets may be quantized and coded over, for example, from anywhere between 2 bits for 4 possible beam training information feedback sets to 8 bits for 256 possible beam training information feedback sets. The possible beam information feedback sets may be predefined in the standard, with each of the sets corresponding to an index (coded, for example, over anywhere between 2 bits to 8 bits), that can be signaled to the UE by the NR Node. The configuration of the beam training information feedback sets may be through RRC signaling and MAC Control Element (MAC CE) signaling while the actual training feedback (i.e., the coded bit(s) for the beam training feedback) may require a more dynamic playback and might be signaled to the UE through PHY layer signaling (e.g. new NR DCI).

Figure 50:
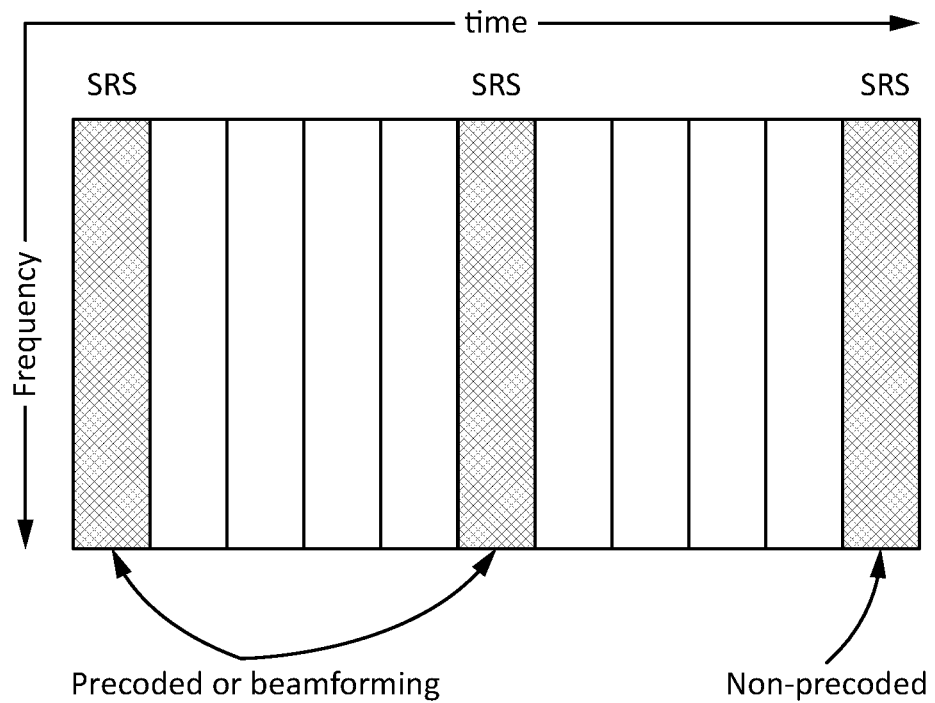
FIG. 50 shows an example dynamic configuration of pre-coded or beamformed SRS transmissions.

The time and frequency resources for pre-coded or beam-formed SRS can be done either by an RRC or DL control channel, similar to the non-pre-coded SRS configuration case. Beamforming can be achieved via codebook or non-codebook based beamforming. Non-codebook based beamforming can be achieved by using either analog beamforming or analog plus digital beamforming (i.e., hybrid beamforming). Furthermore, the pre-coding or beamforming setup can be configured via DL control and RRC. Similar to non-pre-coded SRS, each SRS transmission, whether performing the pre-coding or beamforming, can be configured by DL control or RRC at each SRS transmission time. For example, srs-preCodedEnable can be triggered by the DL control channel signaling even when srs-preCodedEnable is set to disable in RRC configuration. Also, the beamforming or pre-coding information can be varied at different SRS transmissions. In the example of FIG. 50, during a SRS transmission period, a SRS can be configured to be with or without pre-coding/beamforming. This kind of configuration can be dynamically triggered by DL control channel indication. Alternatively, the NR-SRS transmission pattern can be configured as a pattern of $M_p$ pre-coded SRS and $M_{np}$ non-pre-coded SRS within a fixed time duration.

Figure 51:
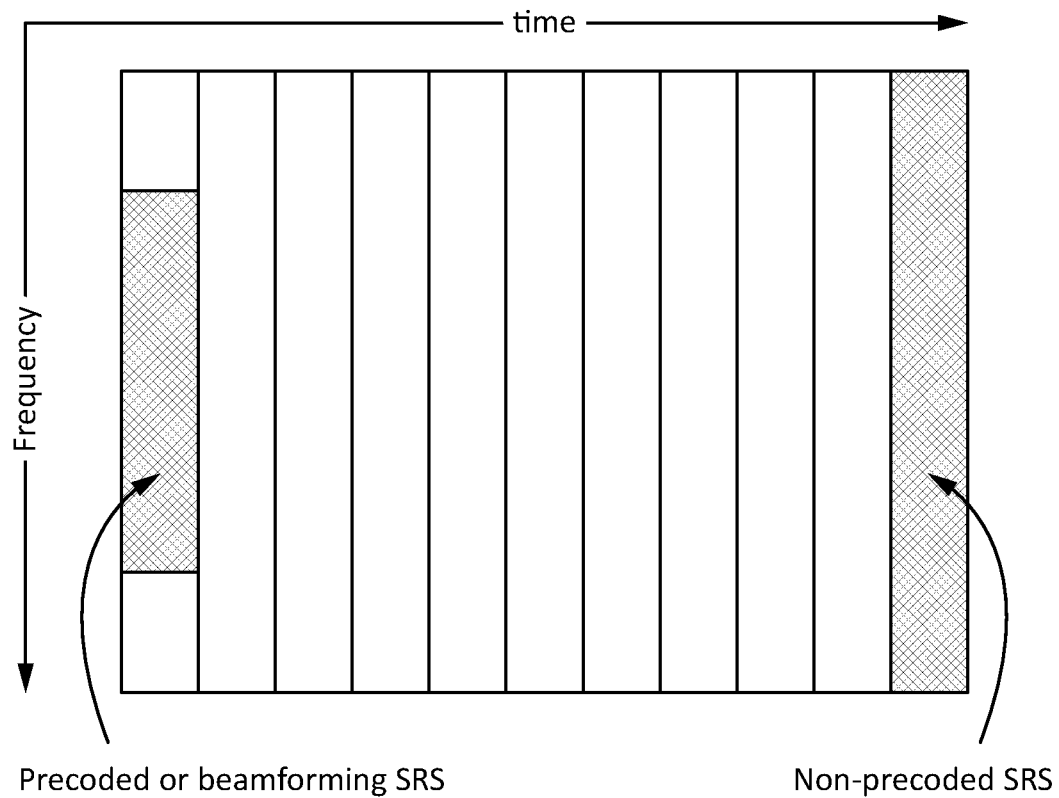
FIG. 51 shows an example of different BW setups in pre-coded or beamformed SRS.

When the srs-preCodedEnable is set to enable, the srs-Bandwidth can be used for the coherence bandwidth of pre-coded or beamformed SRS. In the example of FIG. 51, the pre-coded or beamformed SRS can have different BW setups. The srs-Bandwidth can be dynamically configured by DL DCI.

Figure 52:
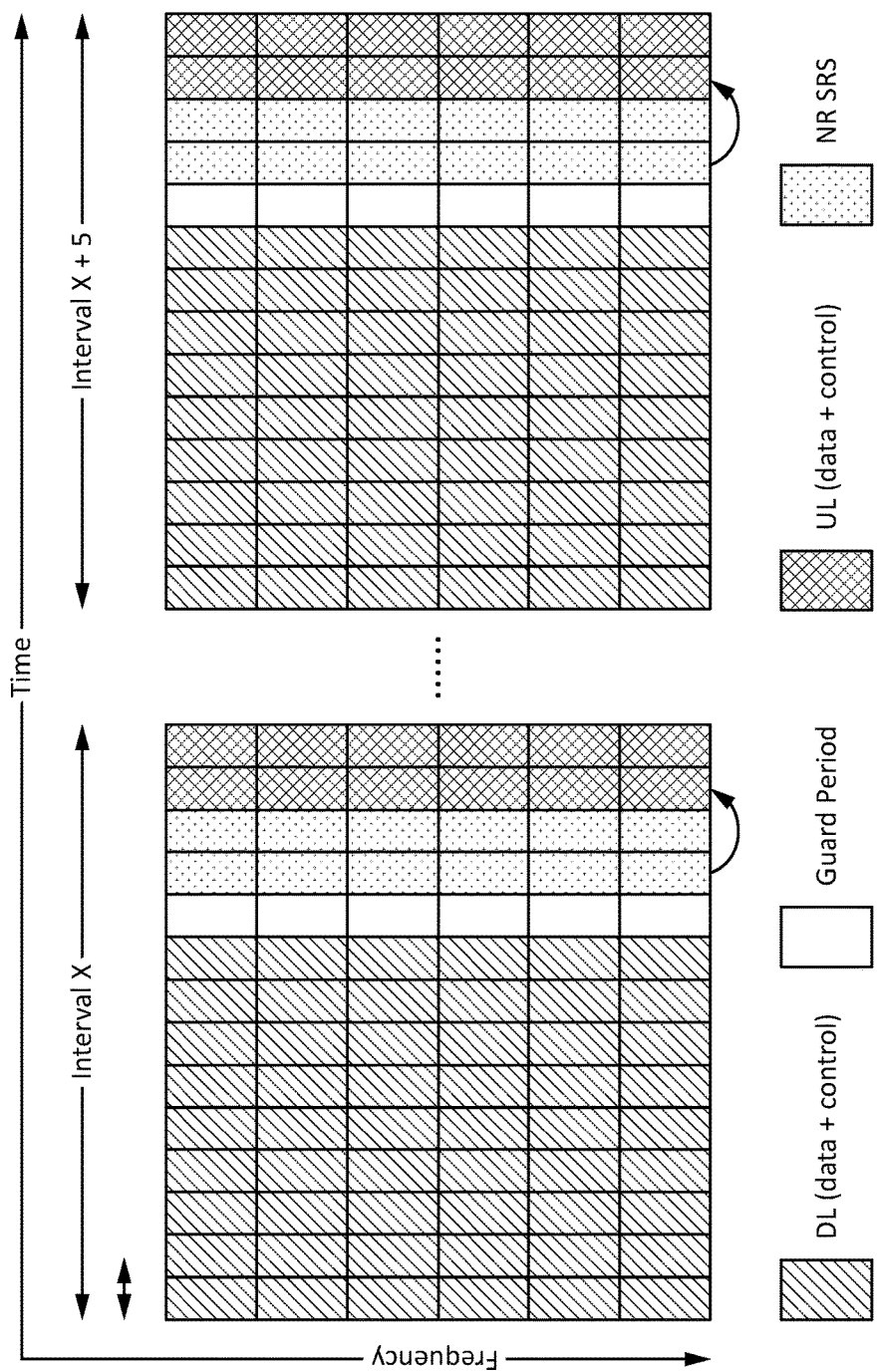
FIG. 52 depicts an example of an NR-SRS serving as NR-UL-DMRS.

NR-SRS may be used as UL demodulation RS (DMRS), i.e., NR-SRS can serve both beam sounding and demodulation purposes and reduce the overhead of UL NR-DMRS. This is because the NR-node takes advantage of NR-SRS to be served for both sounding and UL demodulation purposes. The main purpose of UL-DMRS is for UL data or control channel demodulation. This scheme is useful during the sounding/beam refinement to save NR DMRS overhead. When NR-SRS is configured for DM-RS, it can be used for demodulation of UL data and control channel. If the NR-SRS is pre-coded, the UL data and control channel can use the same pre-coding weights as NR-SRS. If the NR-SRS is not pre-coded, the UL data and control channel is pre-coded and the pre-coder weight may be known to the eNB In FIG. 52, the NR SRS is configured with the next UL data or control symbols. Therefore, the configured SRS can be used for UL demodulation purposes. In this example, the configured density of NR SRS can satisfy the demodulation of the UL data channel.

Turning now to frame structures with control channels and reference signals, in a subframe of a reference numerology, different kinds of mini-slots may be allocated for different devices supporting different transmission numerologies.

Figure 53:
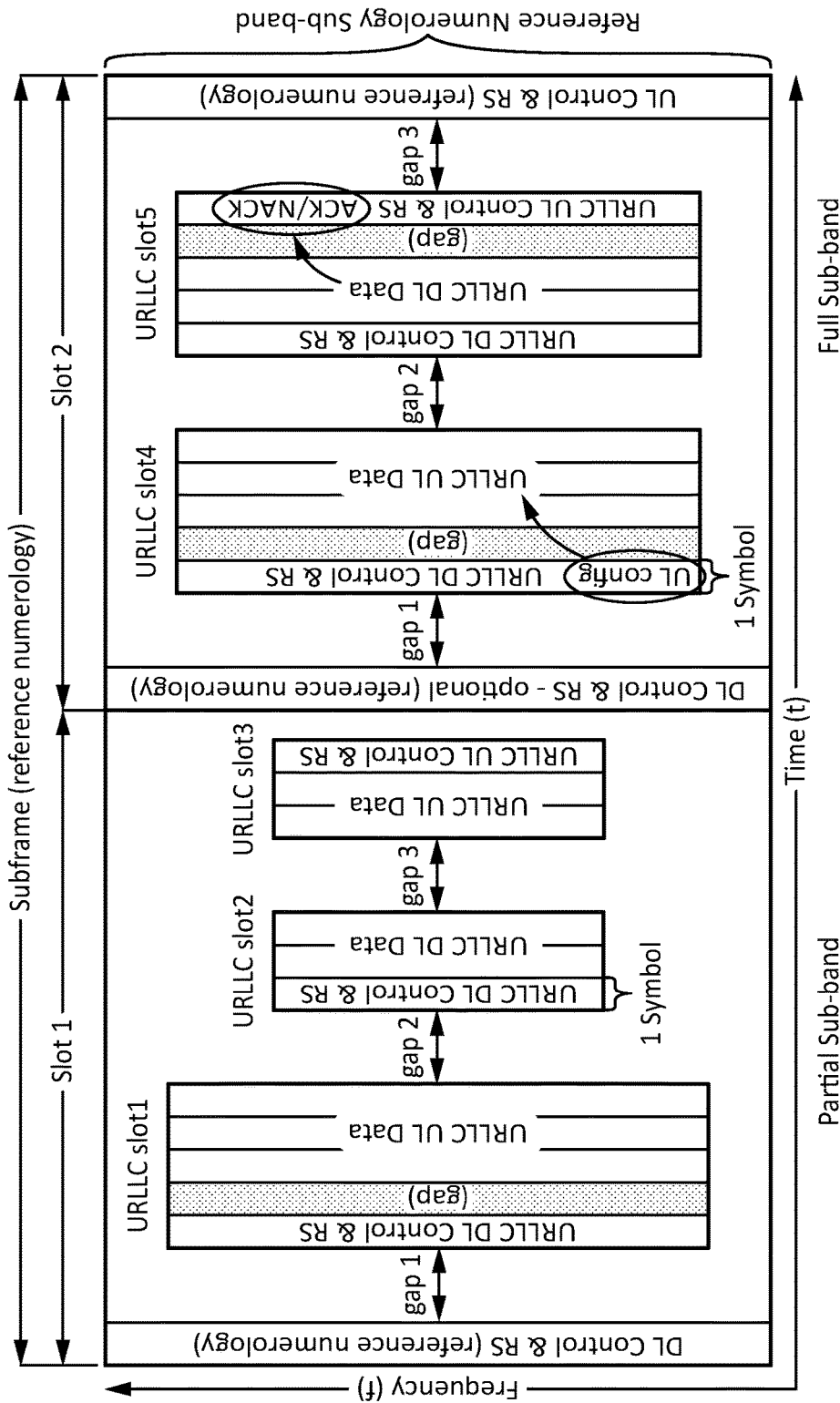
FIG. 53 shows an example of URLLC slot types for wide band.

Referring to FIG. 53, in accordance with the illustrated example, wide band URLLC slots are illustrated. Different partial sub-band mini-slots (e.g., URLLC slot 1, 2 and 3) are shown in Slot 1 of the reference numerology within the Subframe, and different full sub-band mini-slots (e.g., URLLC slot 4 and 5, are shown in Slot 2 of the reference numerology within the Subframe).

Referring to FIG. 54, in accordance with the illustrated example, narrow band mMTC slots are illustrated, where different mMTC Intervals (e.g., mMTC Interval 1 and 2 with aggregated mini-slots) and mMTC mini-slots (e.g., mMTC slot 3 and 4) are shown in a subframe of the reference numerology.

In some cases, the same or different types of mini-slots within a subframe may be for example: pre-defined or pre-configured by the system administration; statically or semi-statically configured by higher layer, such RRC signaling or MAC CEs; or dynamically signaled by the DCIs carried on DL Control Channel in Slot 1 and/or the Secondary DL Control channel (if applicable) in Slot 2.

Figure 56:
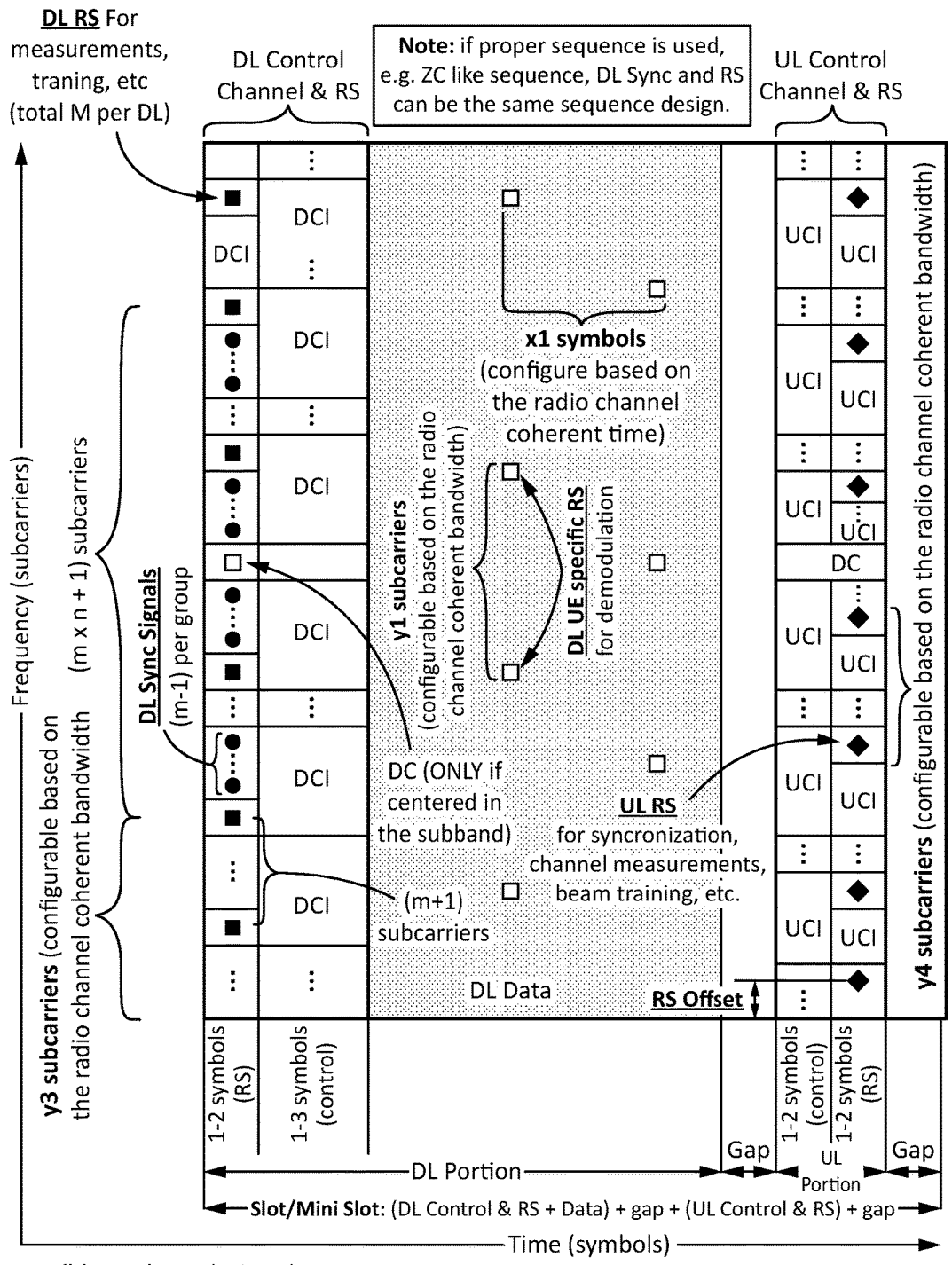
FIG. 56 shows an example of slot/mini-slots with control channel and reference signals for downlink (DL) data with interleaved RS and DCIs.
Figure 57:
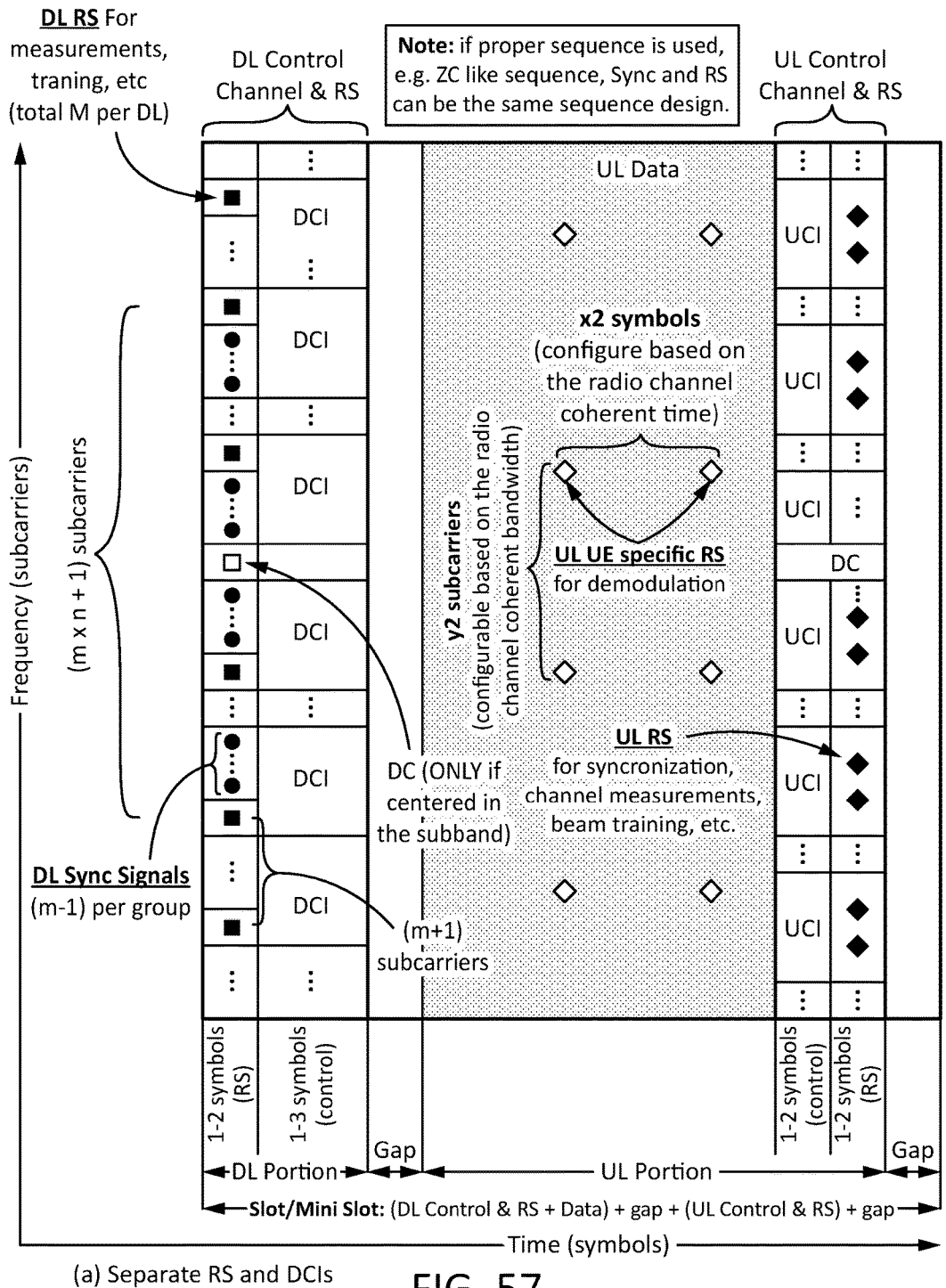
FIG. 57 shows an example of slot/mini-slots with control channel and reference signals for UL data, with separated RS and DCIs.
Figure 58:
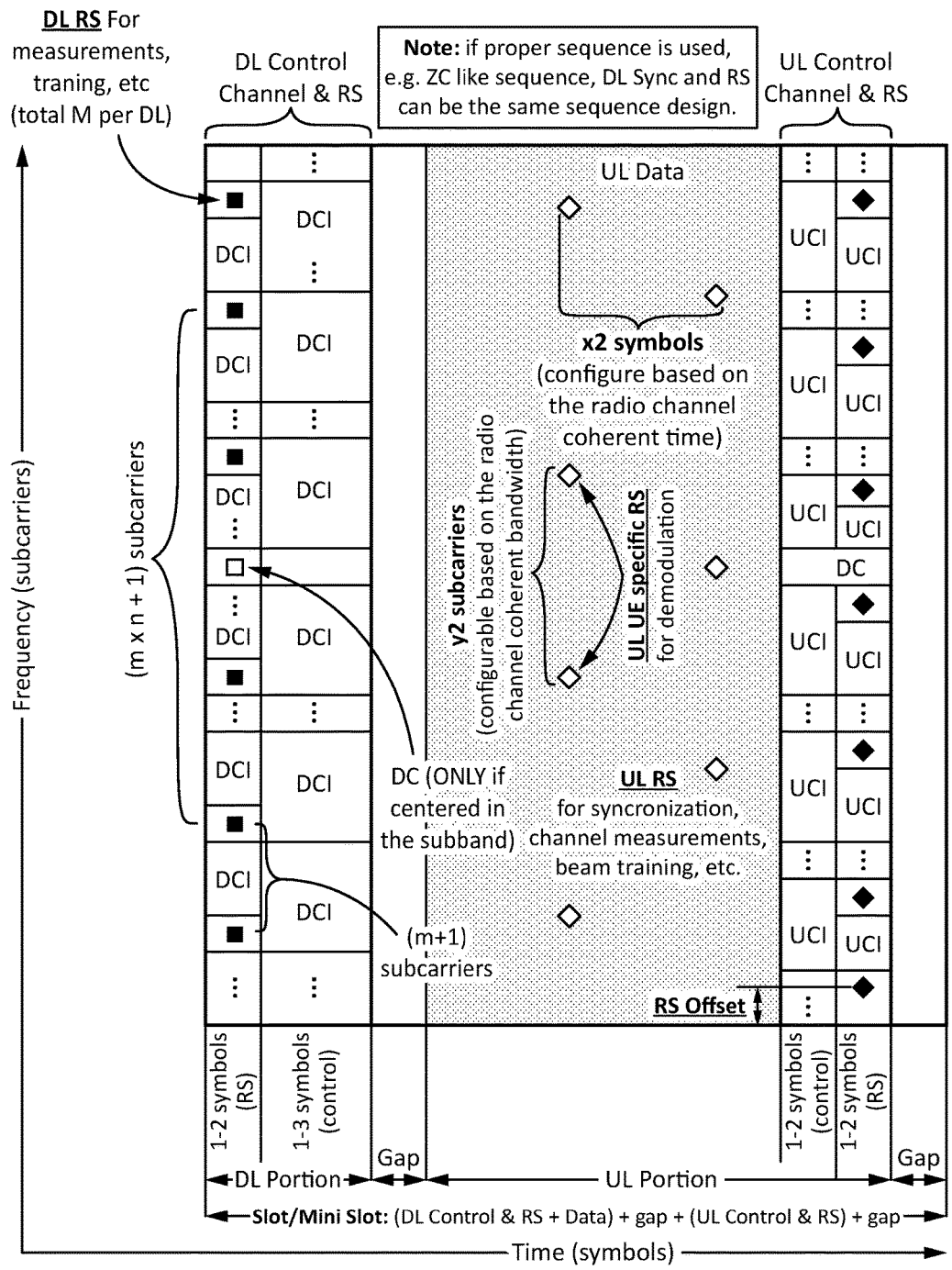
FIG. 58 shows an example of slot/mini-slots with control channel and reference signals for UL data, with interleaved RS and DCIs.

Example details of Slot/Mini-Slot with Control Channel and Reference Signal (RS) are illustrated in FIGS. 55 and 56 (with DL Data) and FIGS. 57 and 58 (with UL Data).

In some cases, a DL Reference Signal (RS) may be allocated at the first symbol of a slot or mini slot with the Synchronization signal either interleaved with the DCI or not, as illustrated in FIGS. 68-71. If proper sequence is used, such as a ZC-like sequence for example, then the DL RS may be used for a synchronization purpose also, which may eliminate the synchronization signal inserted at the 1st symbol, as shown in FIG. 58 (DL RS interleaved with the DCI) as an example. If interleaved with the DCI, for example, the DL RS spacing in subcarriers may be defined per the following example equation with different numerologies (e.g., different subcarrier spacing):

$$y \text{ subcarriers} = <\text{integer } [(\text{channel coherent bandwidth}/\text{subcarrier spacing})/j]$$

where j=1, 2, 3, or 4.

In some cases, the UL Reference Signal (RS) may be allocated at the last symbol of a slot or mini-slot either interleaved with the UCI or not, as illustrated in FIGS. 12 and 13. If interleaved with the UCI, for example, the UL RS spacing in subcarriers may be defined per the following example equation with different numerologies (e.g., different subcarrier spacing).

$$y \text{ subcarriers} = <\text{integer } [(\text{channel coherent bandwidth}/\text{subcarrier spacing})/j]$$

where j=1, 2, 3, or 4.

Thus, DL and UL UE Specific Reference Signals (RS) may be distributed with UE data in different patterns, for example as illustrated in FIGS. 12 and 13. The RS spacing in time and frequency may be defined per the following example equations with different numerologies (e.g., different symbol length and subcarrier spacing).

$$X \text{ symbols} = <\text{integer } [(\text{channel coherent time/symbol length})/i]$$

where i=1, 2, 3, or 4, or $$y \text{ subcarriers} = <\text{integer } [(\text{channel coherent bandwidth}/\text{subcarrier spacing})/j]$$

where j=1, 2, 3, or 4.

In some cases, the UE RS may be configured based on the channel coherent time and bandwidth for the transmission numerology for optimized utilization of the system resources, as well as for insuring the quality of demodulation.

Turning now to improving reliability by enhancing the transmission chain, in one example, the TB may be split into multiple CBs and each CB can be encoded with different code rates. For example, the CBs can have unequal error protection. Each CB can have a different MCS.

Figure 59:
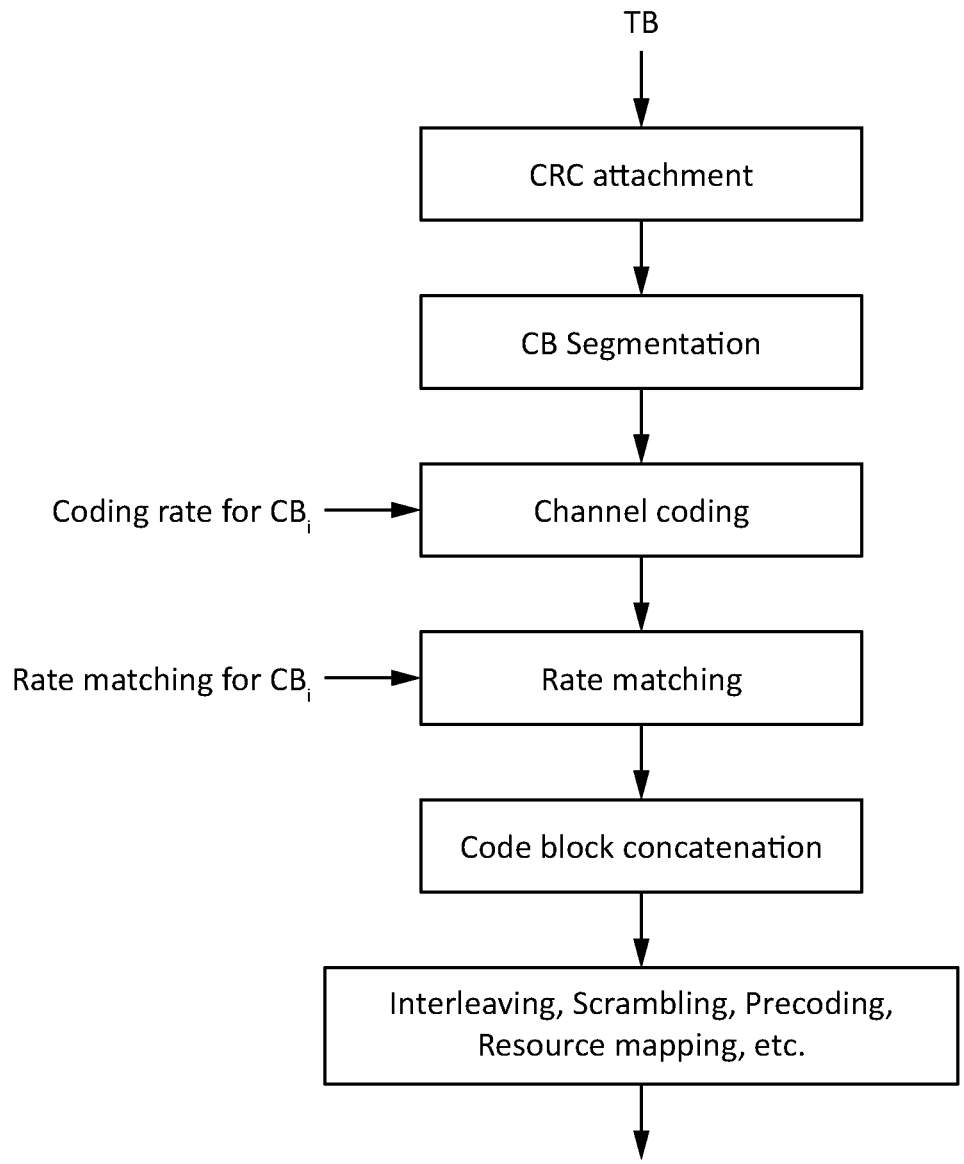
FIG. 59 shows an example of providing unequal error protection to CBs in a TB.

FIG. 59 shows an example of the transmission chain in which the coding rate and rate matching functions can be adjusted for each CB. Parts of the payload that require additional reliability may be encoded with lower rate codes. For example, CBs with MAC CEs may be provided additional protection. Additionally REs carrying codewords requiring more reliability may be modulated with lower order modulation.

Unlike LTE, NR may support more flexible code block segmentation to support unequal error protection. In LTE, only TBs carrying more than 6144 bits are segmented into CBs. For example, an option may be used to segment any TB size into CBs of variable and/or unequal sizes according to the application, so that parts of the payload can receive additional protection.

The NR-DCI may indicate the configuration for unequal error protection by indicating the presence of unequally protected payload, the corresponding MCS, and information on the relative location of the different types of payload. To keep the control signaling overhead within bounds, the configuration may be indicated as an index into a list of predefined payload configurations. Alternatively, bits that require additional reliability may be transmitted separately in a TB. For example, MAC CEs may be transmitted in separate TBs without being multiplexed with data. If the payload in a TB is small (i.e., less than 40 bits), LTE uses filler bits as it supports a minimum TB size of 40 bits and applies a 24-bit CRC to the TB. For example, in NR a smaller CRC size (e.g., smaller than 24 bits) may be provided to support smaller TB sizes. When a TB is segmented into CBs, different CBs may be encoded with CRCs of different lengths depending on the payload size.

To provide higher error protection for UL data such as control signaling, ultra reliable data, etc., in NR a high reliability UL grant (HR-UL grant) may be used. For example, a lower MCS would be used for an HR-UL grant than what would typically be used based on the reported CQI. For example, an MCS that would allow for a BLER<1% rather than <10%.

Figure 60:
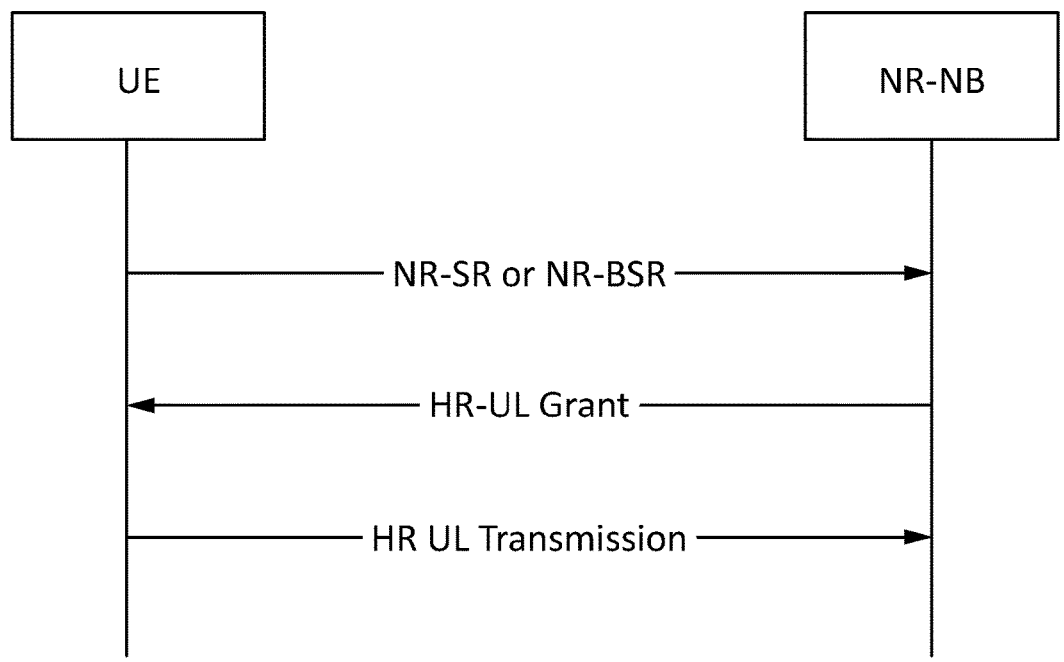
FIG. 60 shows an example of a request for NR-UL grant.

In some cases, the UE may request an HR-UL grant using an enhanced Scheduling Request (SR) or enhanced Buffer Status Report (BSR) as shown in FIG. 60. Herein, the enhanced SR and the enhanced BSR may be referred to as an NR-SR and an NR-BSR, respectively. The NR-SR may be signaled on the PUCCH when the UE does not have PUSCH resources scheduled, and the NR-BSR may be signaled on the PUSCH when the UE is already scheduled. Alternatively, HR-UL grants may be used exclusively based on the UE device type, service requested, etc. For example, a UR/LL device may always receive HR-UL grants in accordance with one example.

In LTE, PUCCH Format 1 can be used to signal an SR. When using PUCCH Format 1, the SR uses the same constellation point as for a negative acknowledgement. For the NR-SR, a request for a regular UL grant using the same constellation point as for a negative acknowledgement and a request for an HR-UL grant using the same constellation point as for a positive acknowledgement may be signaled. The SR resource is modulated to indicate the type of scheduling request; i.e. regular or high reliability. Therefore, the HARQ acknowledgement cannot be multiplexed onto the resource that is used for the NR-SR, as it is in LTE for scenarios when an ACK/NACK and an SR are simultaneously transmitted.

In LTE, PUCCH Format 3 can also be used to signal an SR. When using PUCCH Format 3, the SR bit, if present, is concatenated with acknowledgements. For NR, when requesting a regular UL grant, the SR bit may be set to '0' and when requesting an HR-UL grant, the SR bit is set to "1".

Figure 61:
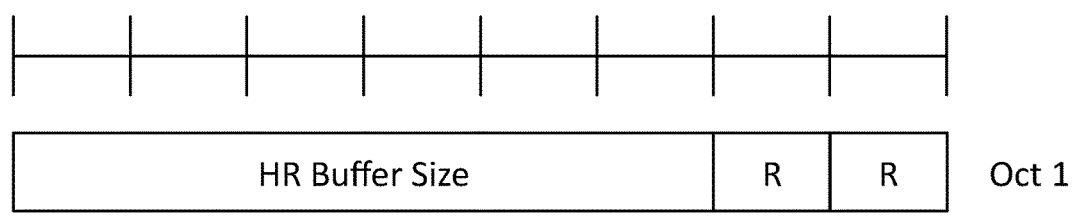
FIG. 61 shows an example of a short HR-BSR MAC CE.
Figure 62:
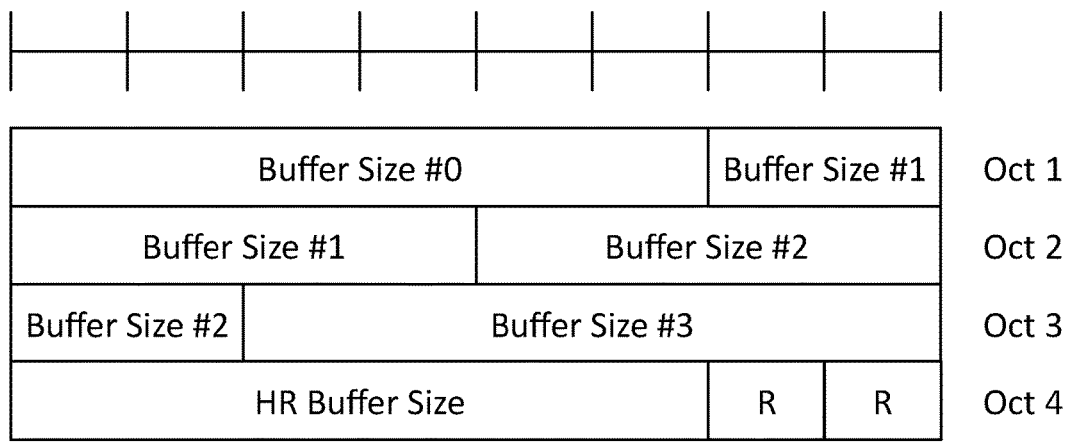
FIG. 62 shows an example of a NR long BSR MAC CE.

To request an HR-UL grant when the UE is already scheduled with a regular UL grant, a High Reliability BSR (HR-BSR) may be used. An exemplary Short HR-BSR MAC CE is shown in FIG. 61. The HR Buffer Size field in the Short HR-BSR indicates the amount of HR data that needs to be transmitted, including an MAC CEs that need to be transmitted with a higher reliability; e.g. MAC CEs used for beam/mobility management, state transitions, etc. Alternatively, the legacy Long BSR MAC CE could be extended to include the HR buffer size as shown in FIG. 62.

Figure 63:
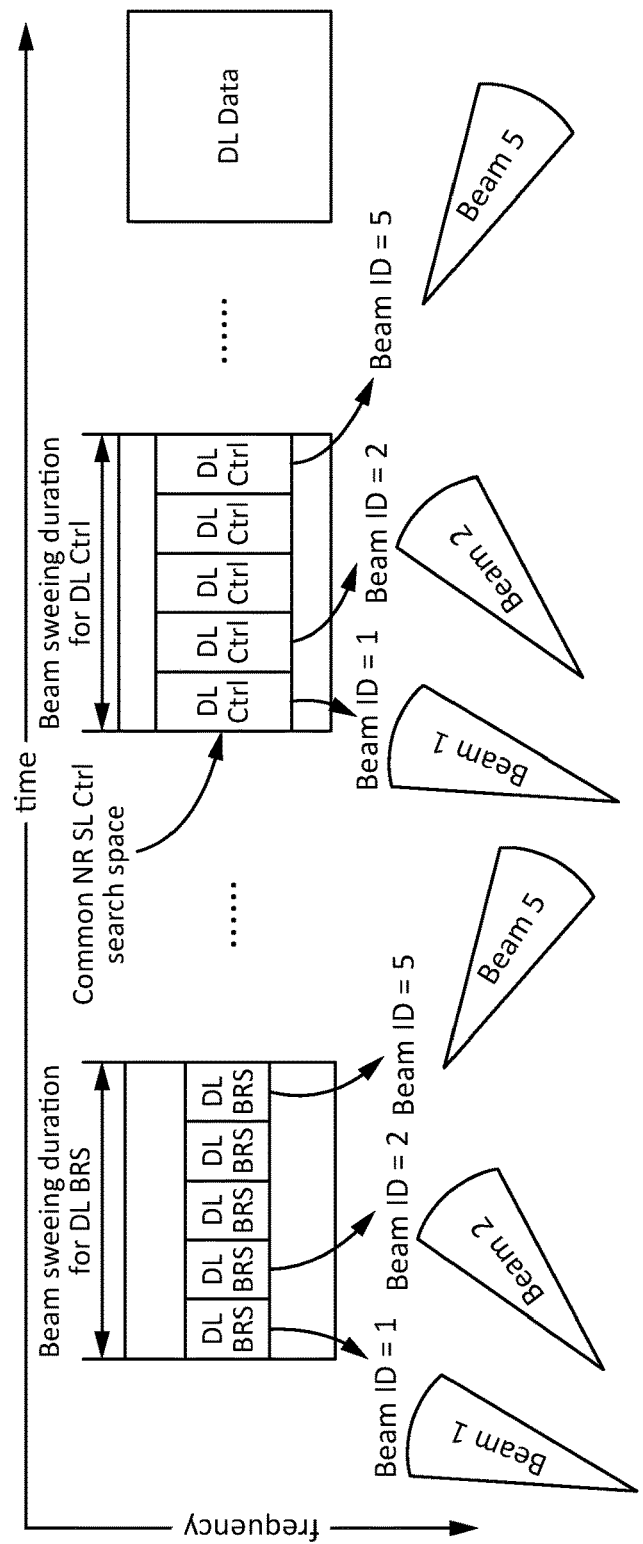
FIG. 63 shows an example of a NR DL control search space with beam sweeping.

Turning now to a Beamformed NR DL Control Channel, an NR DL control channel can be applied with beamforming. In the initial access stage, the resource allocation for beam sweeping subframes can be predetermined with fixed or pre-determined resources for synchronization channel, beam sweeping RS and primary broadcast channels. In this way, UE can find the best Tx beams during the Tx beam sweeping. In case of common NR DL control being needed, NR-node TX-beam sweeping based transmission can be used for supporting same coverage with the synchronization channel, beam sweeping RS and primary broadcast channels. Those common NR DL control channel search space can be applied with the same beams used in the beam sweeping for synchronization channel, beam sweeping RS and primary broadcast channels. Referring to FIG. 63, it shows the common NR DL control share the same beams setup as DL beam sweeping RS. The beam sweeping RS can be used for demodulation of common NR DL control channels.

Figure 64:
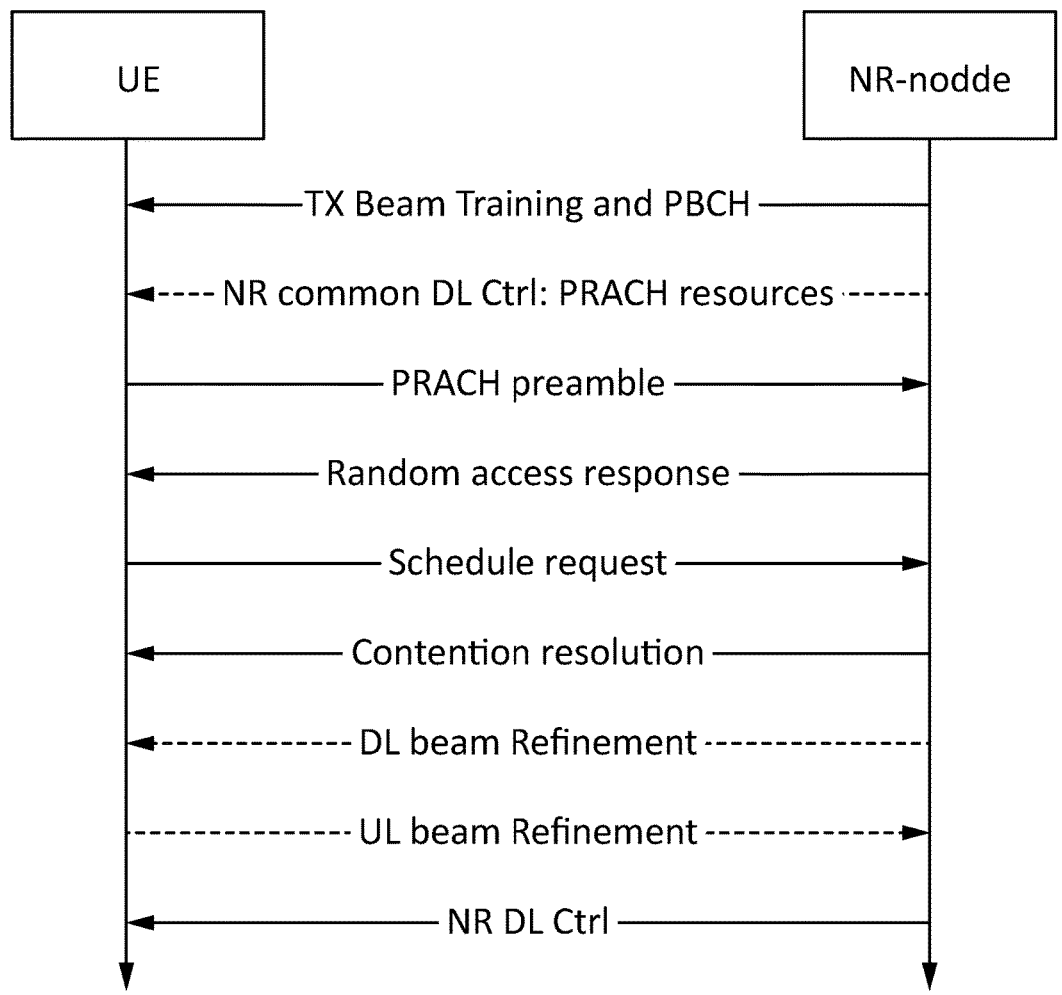
FIG. 64 shows an example of a UE method for NR DL control channel.

In an example, another on-demand beam formed NR DL control channel (ue-specific) can use the best Tx beams agreed in the initial access, or the beam refinement stage. By way of example, the PRACH preamble resource (grids, preamble ID and length) can be indicated by the detected best Tx beams/beam IDs transmitting from a single or multiple TR-nodes. If there is transmitting common DL control then it may provide PRACH resource information for UL PRACH preamble transmission either with best beam or UL beam sweeping operation. If there is no common DL control information then UE may still be able to derive the PRACH resources from the detected beam information. Since the allocated PRACH resource can be used as an implicit indication of the best transmit direction beam. A NR-node can detect the beam formed PRACH preamble indicated by the pre-allocated PRACH resource. Therefore, NR node can use this beamforming information for transmitting the random access response (RAR). Once the UE detect random access response, UE can form the received beamforming for the reception of the NR DL control channel. If there is a beam refinement method being performed before the transmission of the (ue-specific) NR DL control channel then the UE can use the refinement beams for NR DL control reception. An example UE method for beam formed DL control channel is depicted in FIG. 64. In FIG. 64, the dash-line can be treated as an optional method. For example, if there is no common NR DL control channel available then the UE is still able to derive the PRACH resources from the beam training stages.

Figure 65:
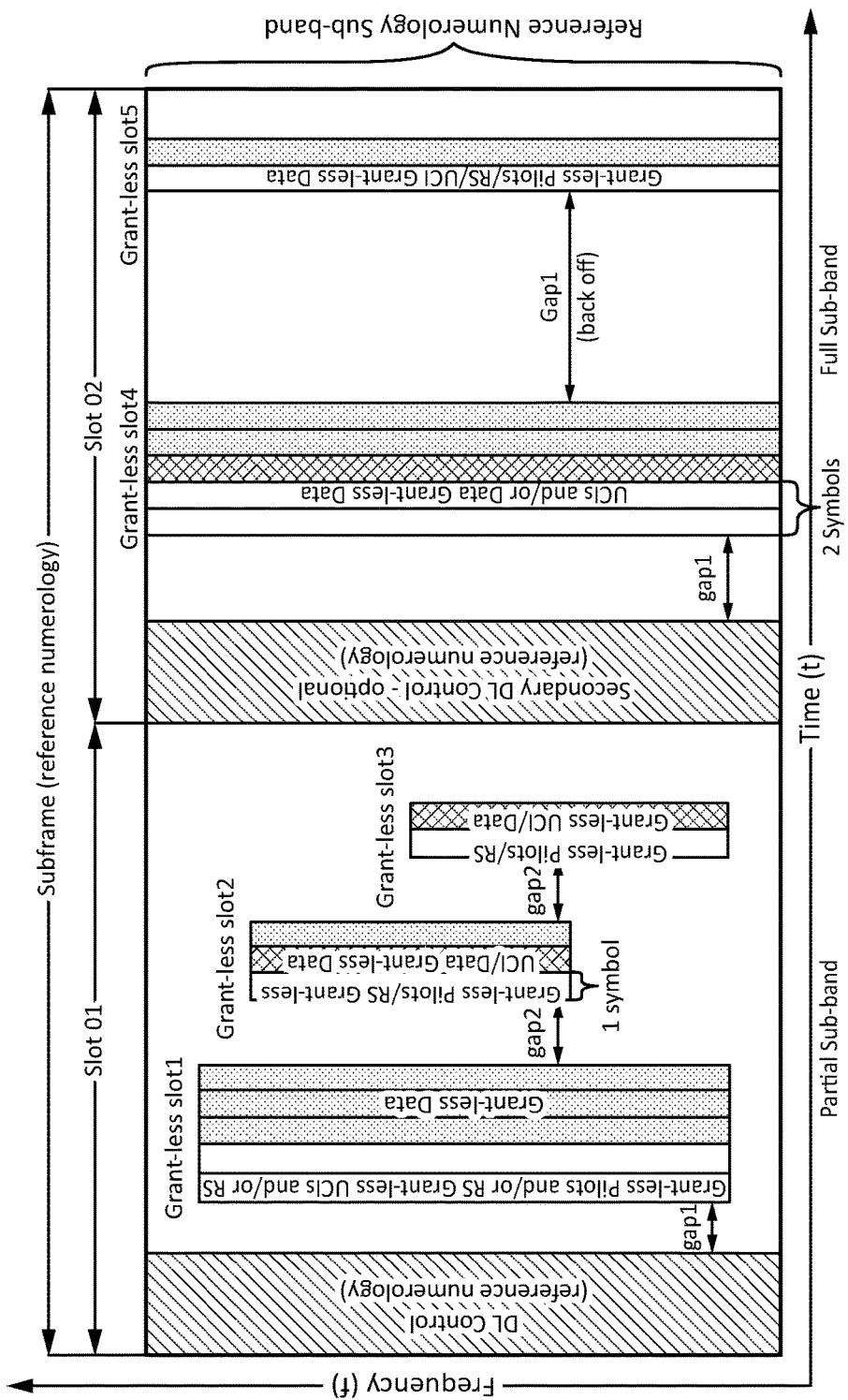
FIG. 65 shows an example of grant-less Slot Types (wide band).

Turning now to Grant-less UL Transmissions in a Subframe, in a subframe of a reference numerology, different kinds of grant-less slots may be allocated differently. Example side band Grant-less Slots are illustrated in FIG. 65. Different partial sub-band Grant-less Slots are shown in Slot 1 of the reference numerology within the Subframe and different full sub-band Grant-less Slots are shown in Slot 2 of the reference numerology within the Subframe.

Figure 66:
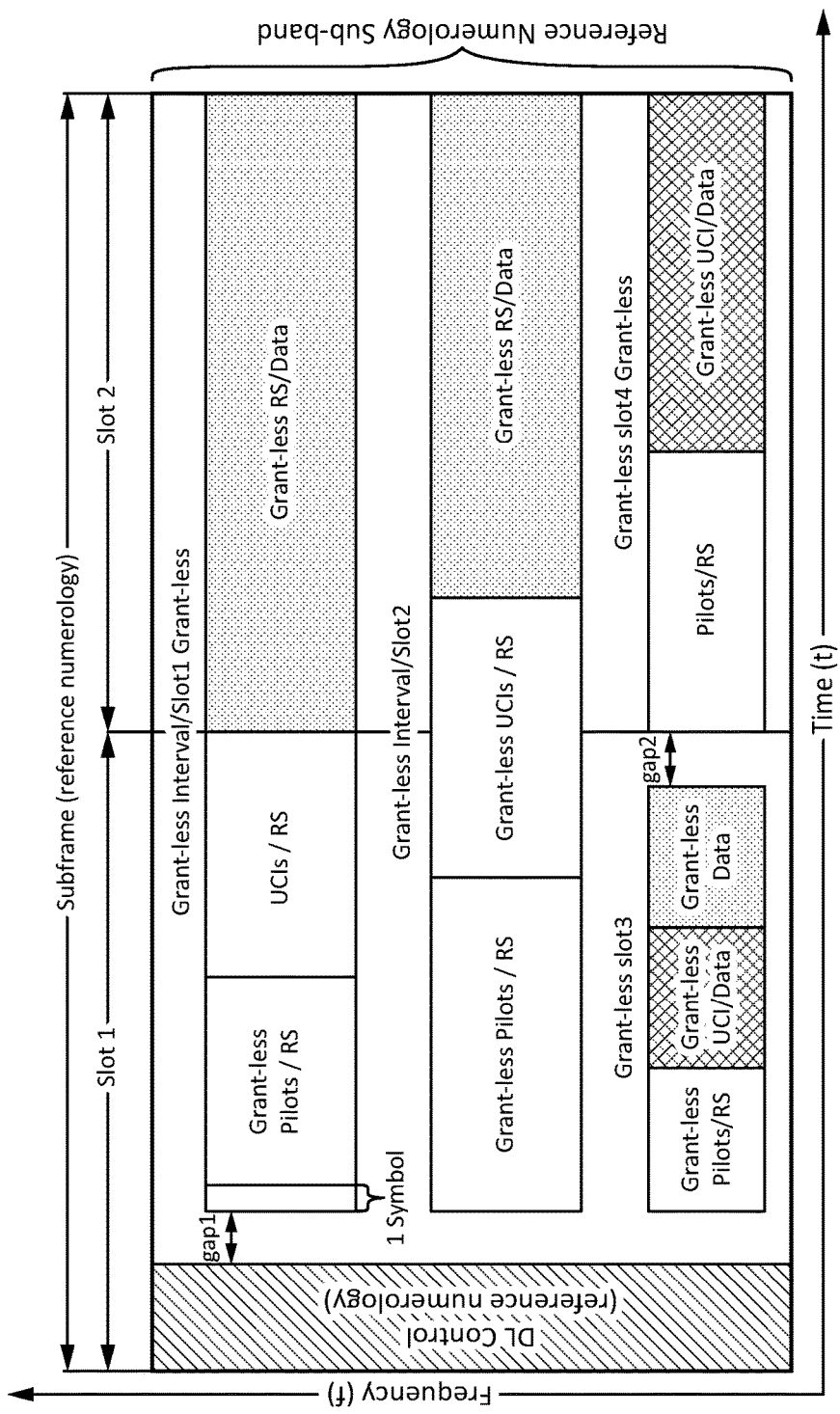
FIG. 66 shows an example of grant-less Interval/Slot Types (narrow band).

Example narrow band Grant-less Slots are illustrated in FIG. 66. Different Grant-less Intervals or Slots are shown in a subframe of the reference numerology. The Grant-less Slots may be: pre-defined or pre-configured by the system administration; statically or semi-statically configured by higher layer, such RRC signaling or MAC Ces; or dynamically signaled by the Grant-less DCIs carried on DL Control Channel and/or the Secondary DL Control channel if applicable.

Figure 67:
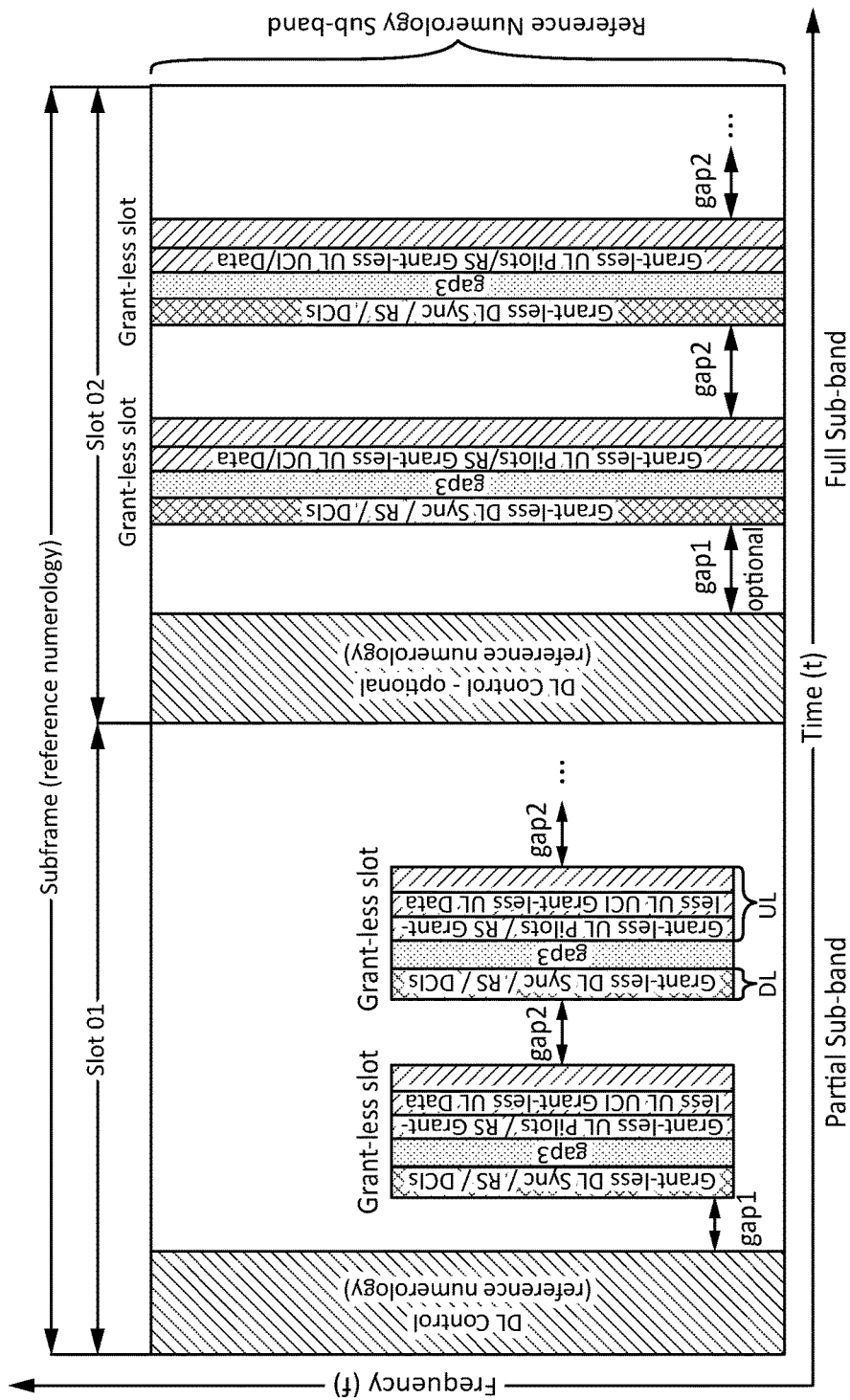
FIG. 67 shows an example of a grant-less Slot configuration (wide band).
Figure 68:
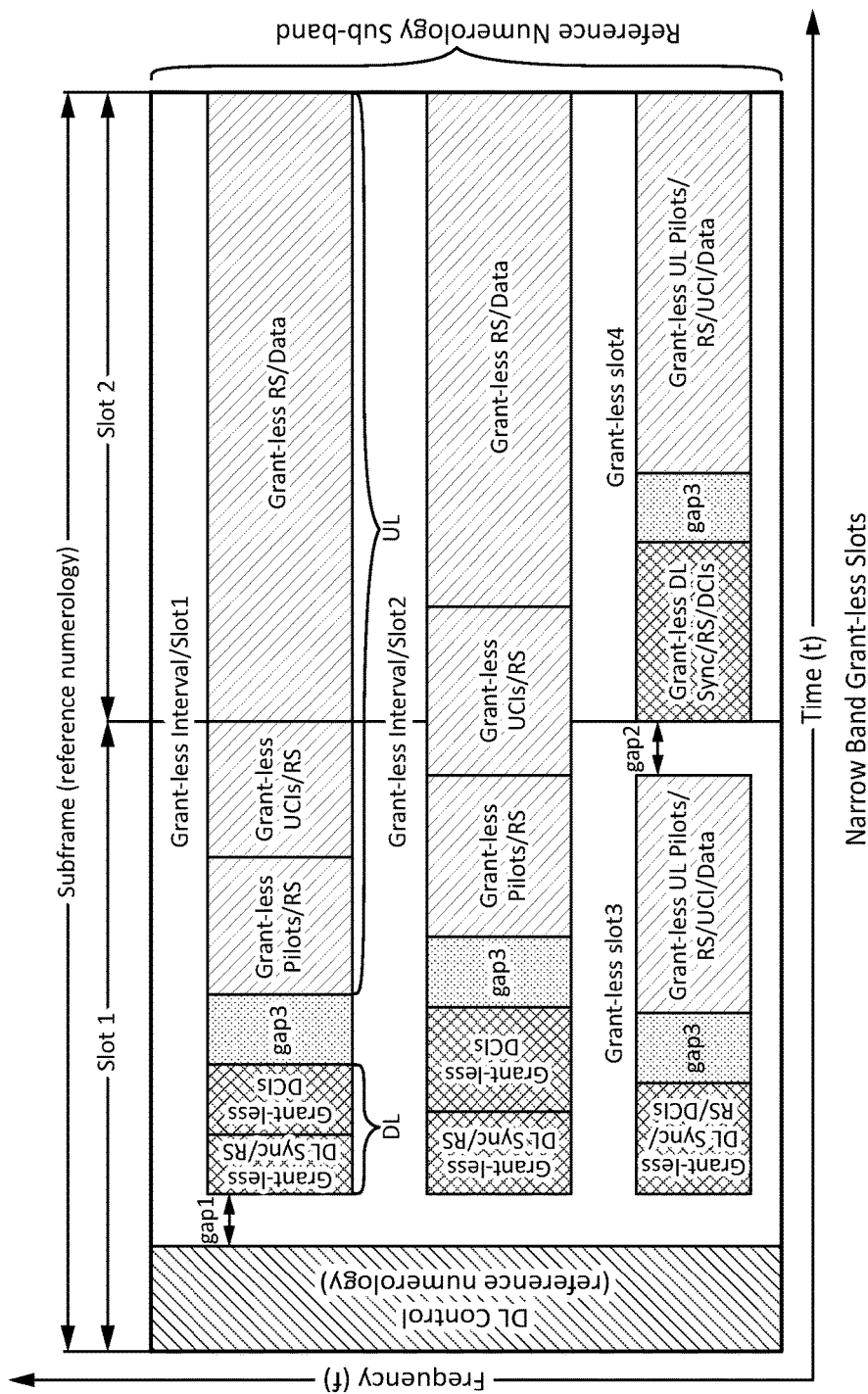
FIG. 68 shows an example of a grant-less Slot configuration (narrow band).

Examples of Grant-less Slot configurations, containing both Grant-less DL Signals and/or Control Info (i.e. DCIs) and Grant-less UL Pilots/Preambles, Control Info (i.e. UCI), and Data are illustrated in FIG. 67 and FIG. 68.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 69:
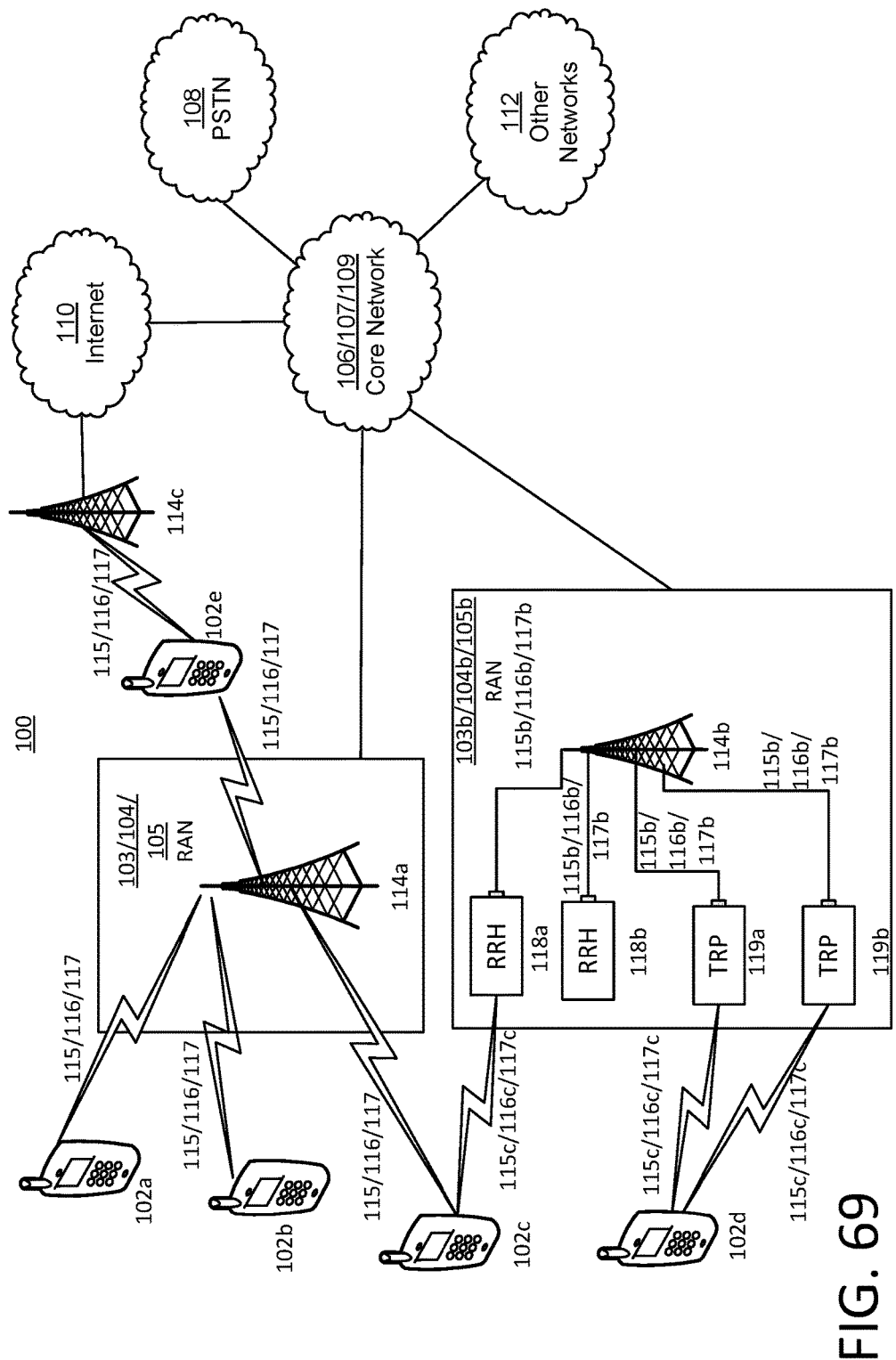
FIG. 69 illustrates an example communications system.

FIG. 69 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 69-73 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 69 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 69, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 69, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 69 may be configured to communicate with the base station 114a, which may employ a cellular-based radio technology, and with the base station 114c, which may employ an IEEE 802 radio technology.

Figure 70:
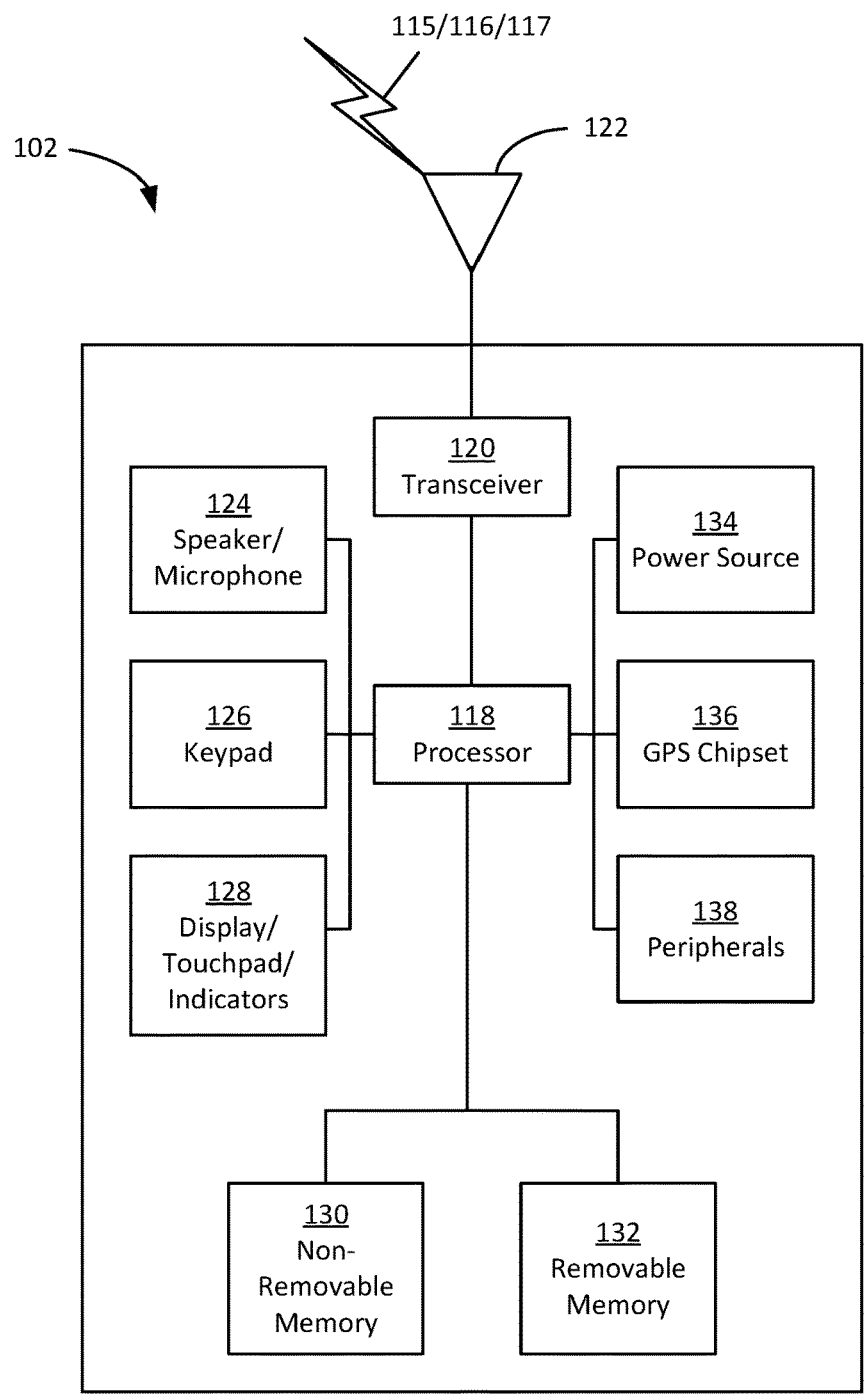
FIG. 70 is a block diagram of an example apparatus or device configured for wireless communications such as, for example, a wireless transmit/receive unit (WTRU).

FIG. 70 is a block diagram of an example apparatus or device configured for wireless communications in accordance with the embodiments illustrated herein, such as for example, a WTRU 102. As shown in FIG. 70, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 70 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 70 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 69, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 69 may be configured to communicate with the base station 114a, which may employ a cellular-based radio technology, and with the base station 114b, which may employ an IEEE 802 radio technology.

FIG. 70 is a block diagram of an example apparatus or device configured for wireless communications in accordance with the embodiments illustrated herein, such as for example, a WTRU 102. As shown in FIG. 70, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 70 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 70 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 70 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 71:
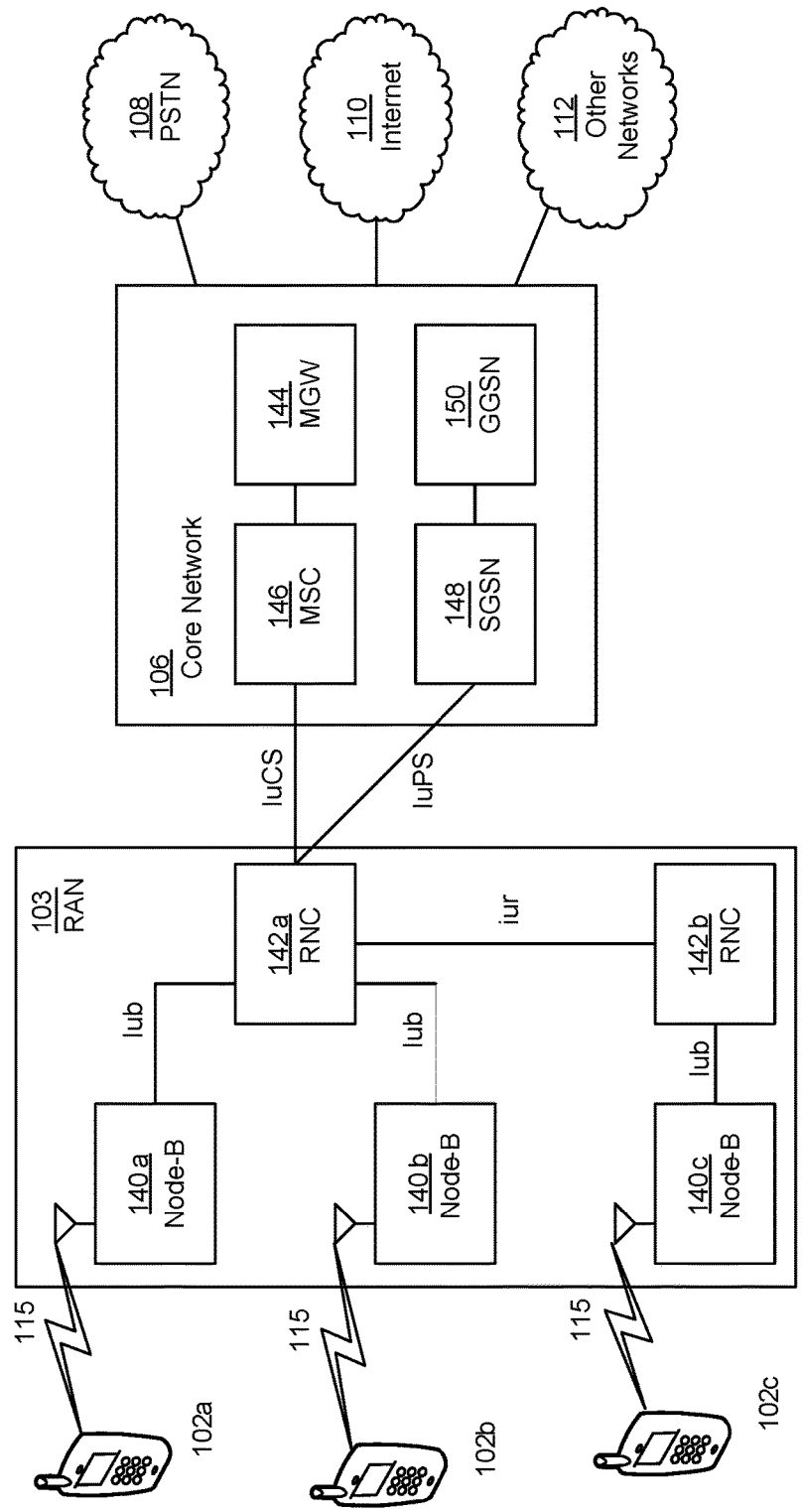
FIG. 71 is a system diagram of a first example radio access network (RAN) and core network.

FIG. 71 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 71, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 71, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 71 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 72:
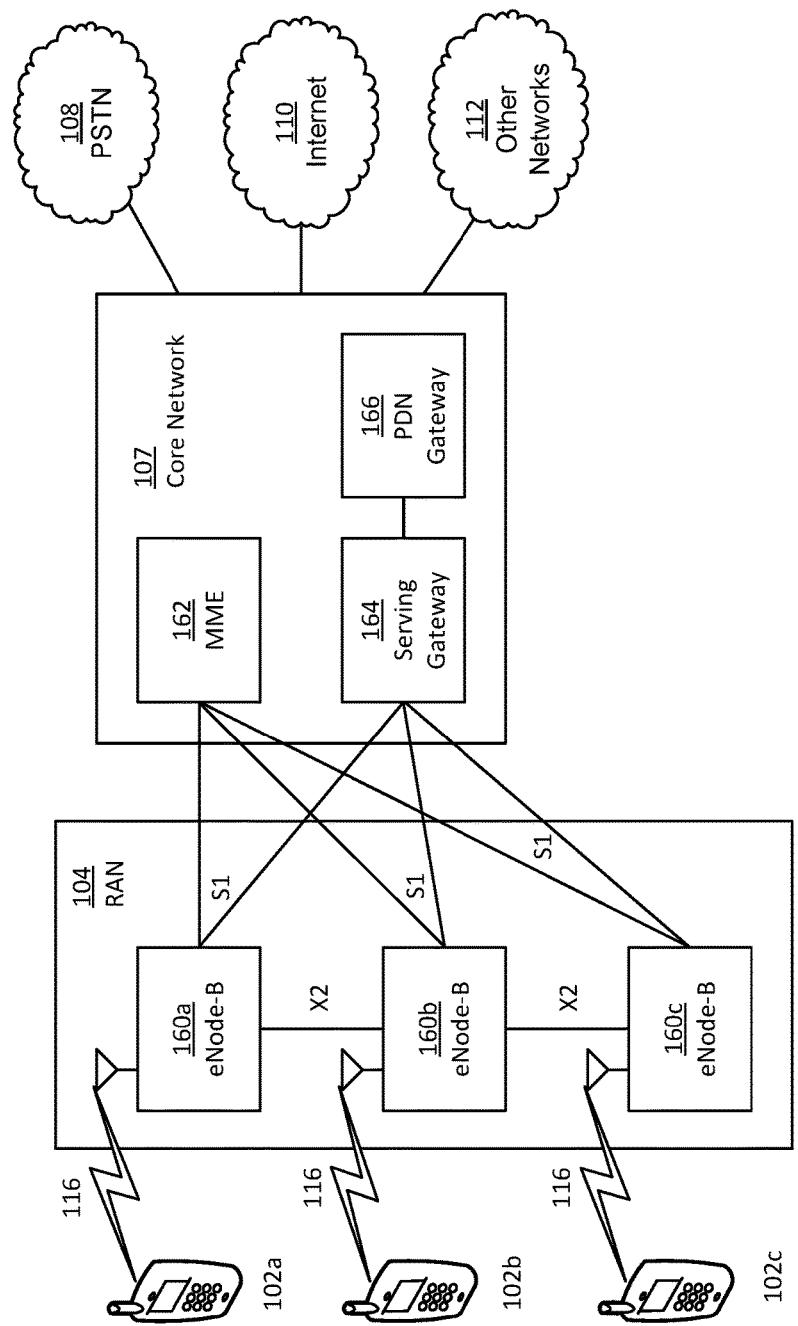
FIG. 72 is a system diagram of a second example radio access network (RAN) and core network.

FIG. 72 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 72, the eNode-Bs 160a, 160b, 160c may communicate with one another over an X2 interface.

The core network 107 shown in FIG. 72 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 73:
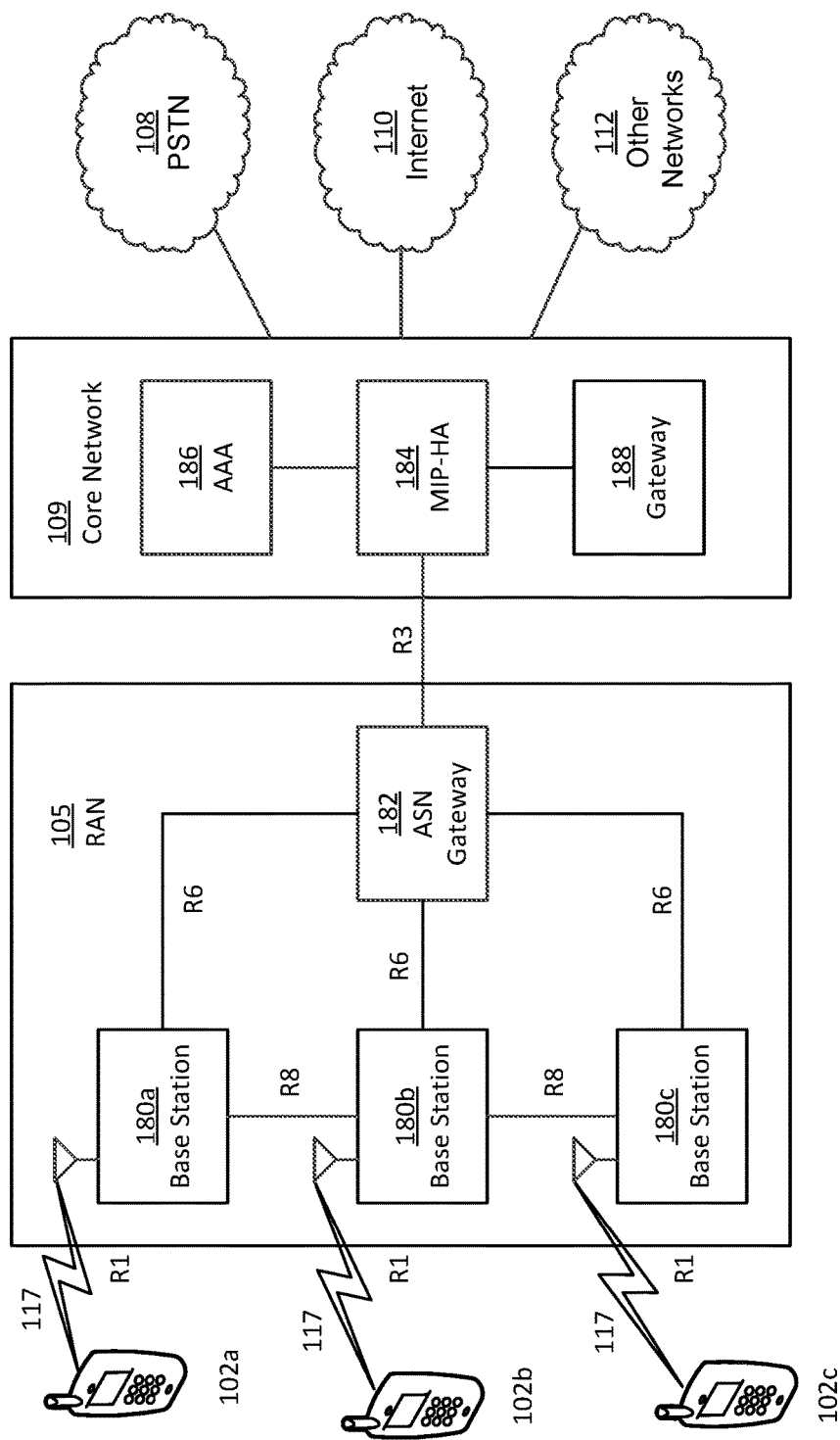
FIG. 73 is a system diagram of a third example radio access network (RAN) and core network.

FIG. 73 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 73, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 73, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 73, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 69-73 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 69-73 are provided by way of example only, and it is understood that the subject matter disclosed and claimed herein may be embodied or implemented in any similar communication system, whether presently defined or defined in the future.

Figure 74:
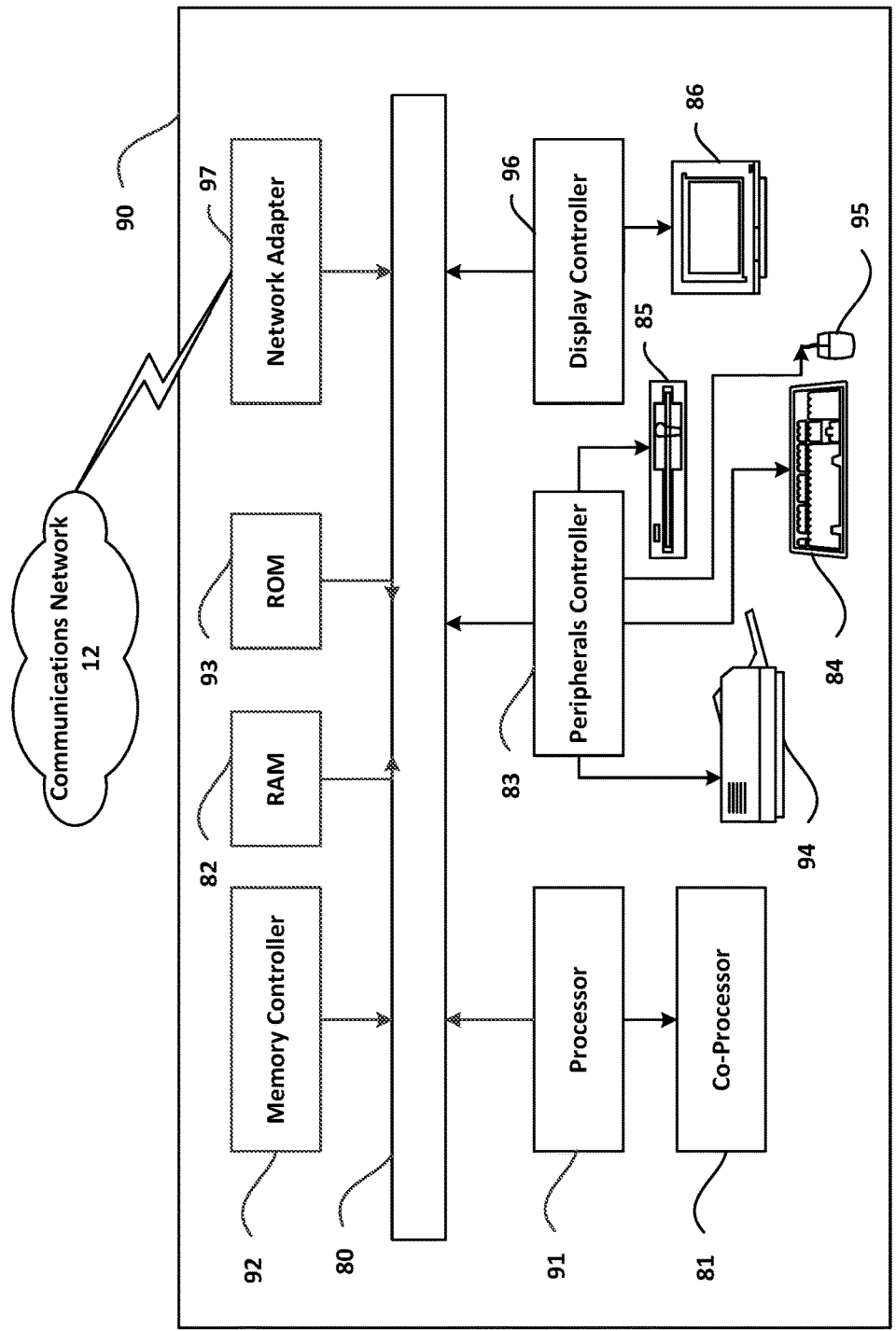
FIG. 74 is a block diagram of an exemplary computing system in which one or more apparatuses of communications networks may be embodied, such as certain nodes or functional entities in the RAN, core network, public switched telephone network (PSTN), Internet, or other networks.

FIG. 74 is a block diagram of an exemplary computing system 90 in which one or more apparatuses of the communications networks illustrated in FIGS. 69-70 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 69-73, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

What is claimed:

1. An apparatus comprising a processor, a memory, and communication circuitry, the apparatus being connected to a communications network via the communication circuitry, the apparatus further comprising computer-executable instructions stored in the memory of the apparatus which, when executed by the processor of the apparatus, cause the apparatus to:
   determine a first configuration, the first configuration pertaining to a first container within a time-frequency resource grid, the first configuration comprising an allocation for each of uplink control information, downlink data, related reference signals, and uplink ACK/NACK; and
   transmit a configuration of the first container through radio resource control, medium access control element updates, or downlink control information.

2. The apparatus of claim 1, wherein the downlink control information in the first configuration further indicates resources for multiple subsequent containers.

3. The apparatus of claim 2, wherein one or more of the subsequent containers provide for a multiplexing of uplink control information for multiple user equipments through time, frequency, or code-division multiplexing.

4. The apparatus of claim 1, wherein the first configuration provides for a multiplexing of uplink control information for multiple user equipments through time, frequency, or code-division multiplexing.

5. The apparatus of claim 1, wherein the first configuration further comprises support for frequency hopping of the uplink control information and a reference signal.

6. The apparatus of claim 1, wherein the first container further comprises a reference signal mapping adjacent to the uplink control information to provide high quality detection of the uplink control information.

7. The apparatus of claim 1, wherein the computer-executable instructions further cause the apparatus to jointly encode uplink control information associated with channel quality estimation, implicit modulation, or coding derivation.

8. The apparatus of claim 1, wherein the first configuration comprises a provision for multiple uplink or downlink transmission time intervals of variable duration.

9. The apparatus of claim 2, wherein multiple configurations of multiple subsequent containers are configured identically with the first configuration.

10. An apparatus comprising a processor, a memory, and communication circuitry, the apparatus being connected to a communications network via the communication circuitry, the apparatus further comprising computer-executable instructions stored in the memory of the apparatus which, when executed by the processor of the apparatus, cause the apparatus to:
    receive, via radio resource control, medium access control element updates, or downlink control information, a first configuration, the first configuration pertaining to a first container within a time-frequency resource grid, the first configuration comprising an allocation for each of uplink control information, downlink data, related reference signals, and uplink ACK/NACK, the first container further comprising support from frequency hopping of the uplink control information; and
    communicate via the communication circuitry within the first container according to the first configuration.

11. The apparatus of claim 10, wherein the first configuration further comprises information for multiple subsequent containers.

12. The apparatus of claim 11, wherein multiple configurations of the multiple subsequent containers are configured identically with the first configuration of the first container.

13. The apparatus of claim 10, wherein the first configuration comprises a provision for multiple uplink or downlink transmissions of variable length.

14. The apparatus of claim 10, wherein one or more of the subsequent containers provides for a multiplexing of uplink for multiple user equipments through time, frequency, or code-division multiplexing.

15. The apparatus of claim 10, wherein the first configuration further comprises a reference signal mapping adjacent to the uplink control information to provide high quality detection of the uplink control information.

16. The apparatus of claim 10, wherein the computer-executable instructions further cause the apparatus to jointly encode uplink control information associated with channel quality estimation, implicit modulation, or coding derivation.

17. An apparatus comprising a processor, a memory, and communication circuitry, the apparatus being connected to a communications network via the communication circuitry, the apparatus further comprising computer-executable instructions stored in the memory of the apparatus which, when executed by the processor of the apparatus, cause the apparatus to:
    determine a first configuration, the first configuration pertaining to a first container within a time-frequency resource grid, the first configuration comprising an allocation for each of uplink control information, downlink data, related reference signals, and uplink ACK/NACK, the first container further comprising support from frequency hopping of the uplink control information; and
    transmit a configuration of the first container through radio resource control, medium access control element updates, or downlink control information.

18. The apparatus of claim 17, wherein the first configuration comprises a provision for multiple uplink or downlink transmission time intervals of variable duration.

19. The apparatus of claim 17, wherein one or more of the subsequent containers provides for a multiplexing of uplink control information for multiple user equipments through time, frequency, or code-division multiplexing.

20. The apparatus of claim 17, wherein the computer-executable instructions further cause the apparatus to jointly encode uplink control information associated with channel quality estimation, implicit modulation, or coding derivation.

* * * * *